(12) United States Patent
Yaghi et al.

(10) Patent No.: US 10,821,417 B2
(45) Date of Patent: Nov. 3, 2020

(54) ZEOLITIC IMIDAZOLATE FRAMEWORKS

(71) Applicant: The Regents of the University of California, Oakland, CA (US)

(72) Inventors: Omar M. Yaghi, Berkeley, CA (US); Jingjing Yang, Berkeley, CA (US); Yuebiao Zhang, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/777,173

(22) PCT Filed: Nov. 23, 2016

(86) PCT No.: PCT/US2016/063685
§ 371 (c)(1),
(2) Date: May 17, 2018

(87) PCT Pub. No.: WO2017/091779
PCT Pub. Date: Jun. 1, 2017

(65) Prior Publication Data
US 2018/0326397 A1   Nov. 15, 2018

Related U.S. Application Data

(60) Provisional application No. 62/260,379, filed on Nov. 27, 2015.

(51) Int. Cl.
*B01J 20/22* (2006.01)
*B01J 20/28* (2006.01)
(Continued)

(52) U.S. Cl.
CPC ............ *B01J 20/226* (2013.01); *B01D 53/02* (2013.01); *B01D 53/1475* (2013.01); *B01J 20/28057* (2013.01); *B01J 20/3085* (2013.01); *B01J 31/1691* (2013.01); *C01B 37/00* (2013.01); *C01B 39/00* (2013.01); *F17C 11/00* (2013.01);
(Continued)

(58) Field of Classification Search
None
See application file for complete search history.

(56) References Cited

U.S. PATENT DOCUMENTS

| 4,532,225 A | 7/1985 | Tsao et al. |
| 5,160,500 A | 11/1992 | Chu et al. |

(Continued)

FOREIGN PATENT DOCUMENTS

| WO | 2006072573 A2 | 7/2006 |
| WO | 2006116340 A1 | 11/2006 |

(Continued)

OTHER PUBLICATIONS

Phan et al., "Synthesis, Structure, and Carbon Dioxide Capture Properties of Zeolitic Imidazolate Frameworks." Accounts of Chem. Res., vol. 43, No. 1 (Jan. 2010), pp. 58-67 (published online on Oct. 30, 2009).*

(Continued)

*Primary Examiner* — Daniel Berns
(74) *Attorney, Agent, or Firm* — Gavrilovitch, Dodd & Lindsey LLP

(57) ABSTRACT

The disclosure provides for multivariant zeolitic imidazolate frameworks (ZIFs), methods of making thereof, and methods of use therefrom.

20 Claims, 49 Drawing Sheets

(51) Int. Cl.

| | | |
|---|---|---|
| *B01J 20/30* | (2006.01) | |
| *B01J 31/16* | (2006.01) | |
| *F17C 11/00* | (2006.01) | |
| *B01D 53/02* | (2006.01) | |
| *B01D 53/04* | (2006.01) | |
| *B01D 53/14* | (2006.01) | |
| *B01D 69/14* | (2006.01) | |
| *C01B 37/00* | (2006.01) | |
| *C01B 39/00* | (2006.01) | |
| *F01N 3/08* | (2006.01) | |
| *B01D 53/047* | (2006.01) | |

(52) U.S. Cl.
CPC .......... *F17C 11/005* (2013.01); *F17C 11/007* (2013.01); *B01D 53/047* (2013.01); *B01D 69/147* (2013.01); *B01D 2253/108* (2013.01); *B01D 2257/502* (2013.01); *B01J 2231/625* (2013.01); *B01J 2531/0205* (2013.01); *B01J 2531/0216* (2013.01); *F01N 3/0857* (2013.01)

(56) References Cited

U.S. PATENT DOCUMENTS

| | | |
|---|---|---|
| 5,208,335 A | 5/1993 | Ramprasad et al. |
| 5,648,508 A | 7/1997 | Yaghi |
| 6,479,447 B2 | 11/2002 | Bijl et al. |
| 6,501,000 B1 | 12/2002 | Stibrany et al. |
| 6,617,467 B1 | 9/2003 | Mueller et al. |
| 6,624,318 B1 | 9/2003 | Mueller et al. |
| 6,893,564 B2 | 5/2005 | Mueller et al. |
| 6,929,679 B2 | 8/2005 | Mueller et al. |
| 6,930,193 B2 | 8/2005 | Yaghi et al. |
| 7,196,210 B2 | 3/2007 | Yaghi et al. |
| 7,202,385 B2 | 4/2007 | Mueller et al. |
| 7,279,517 B2 | 10/2007 | Mueller et al. |
| 7,309,380 B2 | 12/2007 | Mueller et al. |
| 7,343,747 B2 | 3/2008 | Mueller et al. |
| 7,411,081 B2 | 8/2008 | Mueller et al. |
| 7,524,444 B2 | 4/2009 | Hesse et al. |
| 7,582,798 B2 | 9/2009 | Yaghi et al. |
| 7,637,983 B1 | 12/2009 | Liu et al. |
| 8,343,260 B2 | 1/2013 | Omary et al. |
| 8,480,792 B2 | 7/2013 | Yaghi et al. |
| 8,480,955 B2 | 7/2013 | Yaghi et al. |
| 8,518,264 B2 | 8/2013 | Kiener et al. |
| 8,540,802 B2 | 9/2013 | Yaghi et al. |
| 8,709,134 B2 | 4/2014 | Yaghi et al. |
| 8,735,161 B2 | 5/2014 | Yaghi et al. |
| 8,742,152 B2 | 6/2014 | Yaghi et al. |
| 9,078,922 B2 | 7/2015 | Yaghi et al. |
| 9,512,145 B2 | 12/2016 | Yaghi et al. |
| 2003/0004364 A1 | 1/2003 | Yaghi et al. |
| 2003/0078311 A1 | 4/2003 | Muller et al. |
| 2003/0148165 A1 | 8/2003 | Muller et al. |
| 2003/0222023 A1 | 12/2003 | Mueller et al. |
| 2004/0081611 A1 | 4/2004 | Muller et al. |
| 2004/0225134 A1 | 11/2004 | Yaghi et al. |
| 2004/0249189 A1 | 12/2004 | Mueller et al. |
| 2004/0265670 A1 | 12/2004 | Muller et al. |
| 2005/0004404 A1 | 1/2005 | Muller et al. |
| 2005/0014371 A1 | 1/2005 | Tsapatsis et al. |
| 2005/0124819 A1 | 6/2005 | Yaghi et al. |
| 2005/0154222 A1 | 7/2005 | Muller et al. |
| 2005/0192175 A1 | 9/2005 | Yaghi et al. |
| 2006/0057057 A1 | 3/2006 | Muller et al. |
| 2006/0135824 A1 | 6/2006 | Mueller et al. |
| 2006/0154807 A1 | 7/2006 | Yaghi et al. |
| 2006/0185388 A1 | 8/2006 | Muller et al. |
| 2006/0252641 A1 | 11/2006 | Yaghi et al. |
| 2006/0252972 A1 | 11/2006 | Pilliod et al. |
| 2006/0287190 A1 | 12/2006 | Eddaoudi et al. |
| 2007/0068389 A1 | 3/2007 | Yaghi |
| 2007/0202038 A1 | 8/2007 | Yaghi et al. |
| 2007/0217982 A1 | 9/2007 | Wright et al. |
| 2007/0248575 A1 | 10/2007 | Connor et al. |
| 2008/0017036 A1 | 1/2008 | Schultink et al. |
| 2008/0184883 A1 | 8/2008 | Zhou et al. |
| 2008/0190289 A1 | 8/2008 | Muller et al. |
| 2009/0155588 A1 | 6/2009 | Hesse et al. |
| 2009/0183996 A1 | 7/2009 | Richter et al. |
| 2009/0216059 A1 | 8/2009 | Reyes et al. |
| 2009/0247654 A1 | 10/2009 | Rajendran et al. |
| 2010/0069234 A1 | 3/2010 | Willis et al. |
| 2010/0132549 A1 | 6/2010 | Yaghi et al. |
| 2010/0143693 A1 | 6/2010 | Yaghi et al. |
| 2010/0186588 A1 | 7/2010 | Yaghi et al. |
| 2010/0286022 A1 | 11/2010 | Yaghi et al. |
| 2011/0015388 A1 | 1/2011 | Youngblood et al. |
| 2011/0137025 A1 | 6/2011 | Yaghi et al. |
| 2011/0282067 A1 | 11/2011 | Li et al. |
| 2011/0282071 A1 | 11/2011 | Shi |
| 2011/0319630 A1 | 12/2011 | Yaghi et al. |
| 2012/0028846 A1 | 2/2012 | Yaghi et al. |
| 2012/0031268 A1 | 2/2012 | Yaghi et al. |
| 2012/0130113 A1 | 5/2012 | Yaghi et al. |
| 2012/0133939 A1 | 5/2012 | Yaghi et al. |
| 2012/0259117 A1 | 10/2012 | Yaghi et al. |
| 2013/0047849 A1 | 2/2013 | Zhang et al. |
| 2013/0096210 A1 | 4/2013 | Yaghi et al. |
| 2013/0131344 A1 | 5/2013 | Yaghi et al. |
| 2013/0295680 A1 | 11/2013 | Yaghi et al. |

FOREIGN PATENT DOCUMENTS

| | | |
|---|---|---|
| WO | 2007101241 A2 | 9/2007 |
| WO | 2007111739 A2 | 10/2007 |
| WO | 2008138989 A1 | 11/2008 |
| WO | 2009/020745 A2 | 2/2009 |
| WO | 2009042802 A1 | 4/2009 |
| WO | 2010078337 A1 | 7/2010 |
| WO | 2010080618 A1 | 7/2010 |
| WO | 2010083418 A1 | 7/2010 |
| WO | 2010088629 A1 | 8/2010 |
| WO | 2010090683 A1 | 8/2010 |
| WO | 2010148276 A3 | 12/2010 |
| WO | 2010148296 A3 | 12/2010 |
| WO | 2010148374 A3 | 12/2010 |
| WO | 2011014503 A1 | 2/2011 |
| WO | 2011038208 A2 | 3/2011 |

OTHER PUBLICATIONS

Banerjee et al., "High-Throughput Synthesis of Zeolitic Imidazolate Frameworks and Application to CO2 Capture," Science, vol. 319, pp. 939-943, Feb. 15, 2008.

Banerjee et al., "Control of Pore Size and Functionality in Isoreticular Zeolitic Imidazolate Frameworks and their Carbon Dioxide Selective Capture Properties," J. Am. Chem. Soc., vol. 131, No. 11, pp. 3875-3877, Mar. 25, 2009.

Bhattacharjee et al., "Zeolitic Imidazolate Frameworks: Synthesis, Functionalization, and Catalytic/Adsorption Applications," Catal. Surv. Asia, vol. 18, No. 4, pp. 101-127, Aug. 20, 2014.

Chen et al., "Zeolitic imidazolate framework materials: recent progress in synthesis and applications," J. of Mater. Chem. A, vol. 2, No. 40, pp. 16811-16831, Jul. 17, 2014.

Huang et al., "Carbon dioxide selective adsoption within a highly stable mixed-ligand Zeolitic Imidazolate Framework," Inorg. Chem. Commun., vol. 46, pp. 9-12, May 6, 2014.

Pimentel et al., "Zeolitic Imidazolate Framworks: Next-Generation Materials for Energy-Efficient Gas Separations," ChemSusChem, vol. 7, No. 12, pp. 3202-3240, Dec. 31, 2014.

Lekahena, Clifford, International Search Report & Written Opinion, PCT/US2016/063685, European Patent Office, dated Feb. 2, 2017.

Nickitas-Etienne, Athina, International Preliminary Report on Patentability and Written Opinion, PCT/US2016/063685, The International Bureau of WIPO, dated Jun. 7, 2018.

Crees et al., "Synthesis of a Zinc(II) Imidazolium Dicarboxylate Logand Metal-Organic Framework (MOF): a Potential Precursor to MOF-Tethered N-Heterocyclic Carbene Compounds," Inorganic Chemistry, 2010, pp. 1712-1719, vol. 49, No. 4.

(56) References Cited

OTHER PUBLICATIONS

Fei et al., "A Nearly Planar Water Sheet Sandwiched between Strontium-Imidazolium Carboxylate Coordination Polymers," Inorg. Chem., 2005, pp. 5200-5202, vol. 44.
Hayashi et al., "Zeolite A Imidazolate Frameworks," Nature Materials 6:501-506 (2007).
Huang et al., 'Ligand-Directed Strategy for Zeolite-Type Metal—Organic Frameworks: Zinc(ii) Imidazolates with Unusual Zeolitic Topologies,' Angew. Chem. Int. Ed. 45:1557-1559 (2006).
Morris et al., 'NMR and X-ray Study Revealing the Rigidity of Zeolitic Imidazolate Frameworks,' J. Phys. Chem. 116 (24):13307-13312 (Jun. 1, 2012).
Morris et al., "Crystals as Molecules: Postsynthesis Covalent Functionalization of Zeolitic Imidazolate Frameworks," J. Am. Chem. Soc. 130:12626-12627 (2008).
Morris et al., "A Combined Experimental-Computational Investigation of Carbon Dioxide Capture in a Series of Isoreticular Zeolitic Imidazolate Frameworks," J. Am. Chem. Soc. 132:11006-11008 (2010).
O'Keefe et al., "Germanate Zeolites: Contrasting the Behavior of Germanate and Silicate Structures Built from Cubic T8O20 units (T=Si or Ge)," Chem. Eur. J. 5:2796-2801 (1999).
Park, Kyo Sung et al., "Exceptional chemical and thermal stability of zeolitic imidazolate frameworks," Proc. Natl. Acad. Sci., Jul. 5, 2006, pp. 10186-10191, vol. 103, No. 27.
Wang et al., "Colossal Cages in Zeolitic Imidazolate Frameworks as Selective Carbon Dioxide Reservoirs," Nature 453:207-211 (2008).
Zhang et al., 'Crystal engineering of binary metal imidazolate and triazolate frameworks,' Chem. Comm. 1689-1699 (2006).

\* cited by examiner

FIG. 1 (continued)

ZEOLITIC IMIDAZOLATE FRAMEWORKS

CROSS REFERENCE TO RELATED APPLICATIONS

This application is a U.S. National Stage Application filed under 35 U.S.C. § 371 and claims priority from International Application No. PCT/US2016/063685, filed Nov. 23, 2016, which application claims priority under 35 U.S.C. § 119 from Provisional Application Ser. No. 62/260,379, filed Nov. 27, 2015, the disclosures of which are incorporated herein by reference.

TECHNICAL FIELD

The disclosure provides for multivariant zeolitic imidazolate frameworks (ZIFs), methods of making thereof, and methods of use therefrom.

BACKGROUND

Although over five million structures have been predicted for porous inorganic crystals such as zeolites, only a small subset (ca. 230) of these has been made. The recently discovered porous metal-organic analogues, zeolitic imidazolate frameworks (ZIFs), also largely fall within this subset, thus the need arises for a synthetic strategy to tap into the vast number of predicted structures.

SUMMARY

The disclosure provides a general strategy to make exceptional zeolitic imidazolate frameworks (ZIFs) and ZIFs made therefrom. The strategy is a based on utilizing multivariate imidazolate linkers with different functionalities especially, the functionality at the 2-positions (2R-Im) or not (2H-Im). Reported herein these functionalities could 'code' hexagonal prism or cube SBUs in the resultant ZIF structures. These SBUs are widely observed in important zeolite structures of high industrial interests, such as FAU NaY, widely used in oil cracking; and LTA zeolite A, widely used in gas drying and separation, etc.). Indeed, ZIFs constructed of the hexagonal prism SBUs form when a combination of 2H-IM and 2R-Im is used, and other ZIFs of the cube SBUs form with 2H-Im. The disclosure therefore has addressed the challenge of making specific and exceptional structures out of millions of potential ones, which was demonstrated by the fourteen ZIFs made herein (ZIF-128, -412, -413, -414, -418, -516, -585, -636, -640, -723, -725, -726, -740 and -813), based on zeolites with hexagonal prisms (GME, ZIF-418, -640; CHA, ZIF-585; KFI, ZIF-725, -726; AFX, ZIF-636), zeolites with cubes (LTA, ZIF-813) and zeolites of first instance (barn, ZIF0740; ucb, ZIF-412, -413, and -414) with hexagonal prism and cube SBUs. The ZIFs belonging to barn and ucb topologies show the largest pore opening of any ZIF (24-membered ring opening of 22.5 Å in diameter for ZIF-740) and one of the largest unit cells ever reported (cell length and volume of 7 nm and over 376,000 Å³, respectively for ZIF-412). Furthermore, ZIF0412 shows a hierarchal pore systems, with the largest cage of 33.4 Å of accessible diameter and large 12-membered ring opening. The extra-large crystal structures of ZIF-412 allowed for the mapping of the gas uptake behavior in hierarchical pore systems, which have heretofore remained unknown, allowing for the discovery of an unprecedented sequential gas filing mechanism. Property exploration of these ZIFs show the potential, one of ucb ZIFs (ZIF-413) shows a $CO_2$ uptake of 2.2 mmol/g at 273 K (760 torr), and that AFX (ZIF-636) shows even higher CO2 uptake of up to 2.7 mmol/g, with a high $CO_2/CH_4$ and $CO_2/N_2$ of up to 9.4 and 42.9, respectively; nearly four times that observed for the state-of-art BPL carbon (11.1 and 2.5, respectively), making them among the best ZIF materials for $CO_2$ storage and separation. The ZIFs disclosed herein are ideally suited for applications such as sensoring, fluid separation and storage (e.g., energy gases, such as $H_2$, $CH_4$; harmful gases such as CO, and $CO_2$; and oil spill cleanup), catalysis (e.g., as a catalyst or a catalyst support), component of composite materials or host-guest materials, and mimic enzymes, etc.

In a particular embodiment, the disclosure provides for a zeoltic imidazolate framework (ZIF) comprising interconnected prism and/or cube SBUs having the having the general formula M-N-L such that the structures formed are selected from:

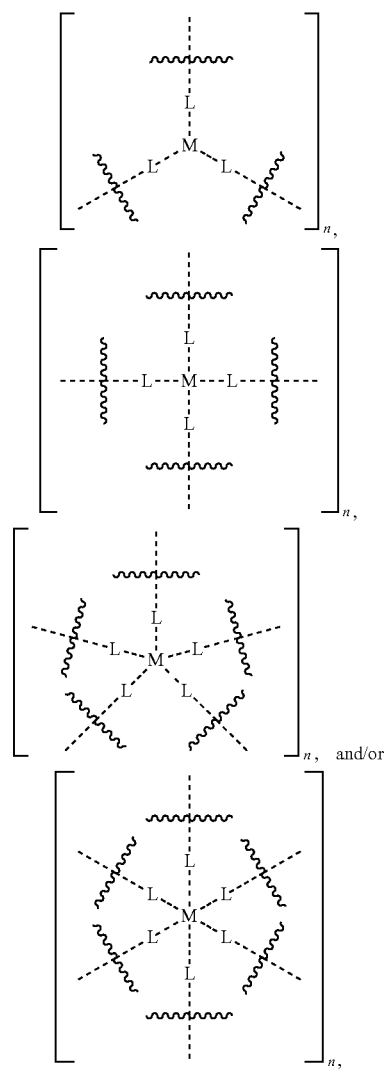

wherein M comprises a metal, metal ion, or metal complex, N is a nitrogen atom, and L is an imidazolate based organic linker, wherein the ZIF comprises a plurality of L's obtained from an imidazolate based organic linker having the structure of Formula I, and a plurality of structures of Formula II and/or Formula III:

Formula (I)

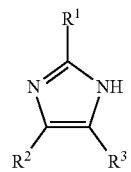

Formula (II)

Formula (III)

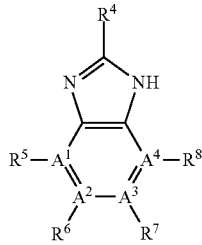

wherein, $A^1$-$A^4$ are each independently C or N; $R^1$ is an optionally substituted ($C_1$-$C_6$)alkyl, an optionally substituted ($C_1$-$C_6$)alkenyl, an optionally substituted ($C_1$-$C_6$)alkynyl, halo, nitro, aldehyde, carboxylic acid, amine, amide, cyano, ester, ketone, thiol, alkoxy, hydroxyl; $R^4$-$R^8$ are each independently selected from H, an optionally substituted ($C_1$-$C_6$)alkyl, an optionally substituted ($C_1$-$C_6$)alkenyl, an optionally substituted ($C_1$-$C_6$)alkynyl, halo, nitro, aldehyde, carboxylic acid, amine, amide, cyano, ester, ketone, thiol, alkoxy, and hydroxyl; wherein any of $R^5$-$R^8$ are absent if bound to A that is a N. In a further embodiment, the ZIF comprises a plurality of L having the structure of Formula (I) and a plurality of L having the structure of Formula (II). In an alternate embodiment, the ZIF comprises a plurality of L having the structure of Formula (I) and a plurality of L having the structure of Formula (III). In yet another alternate embodiment, the ZIF comprises a plurality of L having the structure of Formula (I), a plurality of L having the structure of Formula (II), and a plurality of L having the structure of Formula (III).

In a certain embodiment, the disclosure also provides for a zeoltic imidazolate framework (ZIF) comprising interconnected prism and/or cube SBUs having the general structure of M-N-L, wherein M comprises a metal, metal ion, or metal complex, N is a nitrogen atom, and L is an imidazolate based organic linker, wherein the ZIF comprises a plurality of L derived from an imidazolate based linker of Formula I(a), and a plurality of structure of Formula II and/or Formula III(a):

Formula I(a)

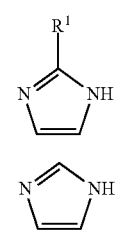

Formula (II)

Formula III(a)

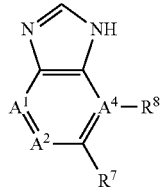

wherein, $A^1$, $A^2$, and $A^4$ are each independently C or N; $R^1$ is an optionally substituted ($C_1$-$C_3$)alkyl, halo, nitro, aldehyde, amine, cyano, thiol, hydroxyl; $R^7$-$R^8$ are each independently selected from H, an optionally substituted ($C_1$-$C_3$)alkyl, halo, nitro, aldehyde, carboxylic acid, amine, amide, cyano, ester, ketone, thiol, alkoxy, and hydroxyl; wherein $R^8$ is absent if $A^4$ that is a N. In another embodiment, the ZIF comprises a plurality of L having the structure of Formula I(a) and a plurality of L having the structure of Formula (II). In an alternate embodiment, the ZIF comprises a plurality of L having the structure of Formula I(a) and a plurality of L having the structure of Formula III(a). In yet another alternate embodiment, the ZIF comprises a plurality of L having the structure of Formula I(a), a plurality of L having the structure of Formula (II), and a plurality of L having the structure of Formula III(a).

In a particular embodiment, a ZIF disclosed herein comprises a metal or metal ion selected from $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $Nb^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, Cr, $Mo^{6+}$, $Mo^{5+}$, $Mo^{4+}$, $Mo^{3+}$, $Mo^{2+}$, $Mo^+$, Mo, $W^{6+}$, $W^{5+}$, $W^{4+}$, $W^{3+}$, $W^{2+}$, $W^+$, W, $Mn^{7+}$, $Mn^{6+}$, $Mn^{5+}$, $Mn^{4+}$, $Mn^{3+}$, $Mn^{2+}$, $Mn^+$, $Re^{7+}$, $Re^{6+}$, $Re^{5+}$, $Re^{4+}$, $Re^{3+}$, $Re^{2+}$, $Re^+$, Re, $Fe^{6+}$, $Fe^{4+}$, $Fe^{3+}$, $Fe^{2+}$, $Fe^+$, Fe, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $Os^{4+}$, $Os^{3+}$, $Os^{2+}$, $Os^+$, Os, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^+$, Ir, $Ni^{3+}$, $Ni^{2+}$, $Ni^+$, Ni, $Pd^{6+}$, $Pd^{4+}$, $Pd^{2+}$, $Pd^+$, Pd, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au^+$, $Zn^{2+}$, $Zn^+$, Zn, $Cd^{2+}$, $Cd^+$, $Hg^{4+}$, $Hg^{2+}$, $Hg^+$, $B^{3+}$, $B^{2+}$, $B^+$, $Al^{3+}$, $Al^{2+}$, $Al^+$, $Ga^{3+}$, $Ga^{2+}$, $Ga^+$, $In^{3+}$, $In^{2+}$, $In^{1+}$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, Ge, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $Db^{3+}$, $Db^{2+}$, $Ho^{3+}$, $Er^{3+}$, $Tm^{4+}$, $Tm^{3+}$, $Tm^{2+}$, $Yb^{3+}$, $Yb^{2+}$, $Lu^{3+}$, $La^{3+}$, $La^{2+}$, $La^+$, and combinations thereof, including any complexes which contain the metals or metal ions, as well as any corresponding metal salt counter-anions. In another embodiment, the ZIF comprises one or more divalent metal ions selected from: $Be^{2+}$, $Mg^{2+}$, $Ca^{2+}$, $Sr^{2+}$, $Ba^{2+}$, $Sc^{2+}$, $Y^{2+}$, $Ti^{2+}$, $Zr^{2+}$, $V^{2+}$, $Nb^{2+}$, $Ta^{2+}$, $Cr^{2+}$, $Mo^{2+}$, $W^{2+}$, $Mn^{2+}$, $Re^{2+}$, $Fe^{2+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Ag^{2+}$, $Au^{2+}$, $Zn^{2+}$, $Cd^{2+}$, $Hg^{2+}$, $B^{2+}$, $Al^{2+}$, $Ga^{2+}$, $In^{2+}$, $Si^{2+}$, $Ge^{2+}$, $Sn^{2+}$, $Pb^{2+}$, $As^{2+}$, $Te^{2+}$, $La^{2+}$, $Ce^{2+}$, $Pr^{2+}$, $Nd^{2+}$, $Sm^{2+}$, $Eu^{2+}$, $Gd^{2+}$, $Tb^{2+}$, $Db^{2+}$, $Tm^{2+}$, $Yb^{2+}$, and $La^{2+}$, including any complexes which contain the metal ions, as well as any corresponding metal salt counter-anions. In yet another embodiment, the ZIF comprises a plurality of $Zn^{2+}$ metal ions.

In a certain embodiment, a ZIF disclosed herein comprises a topology selected from GME, CHA, KFI, AFX, LTA, bam, and ucb. In a further embodiment, the ZIF has a topology of bam or ucb. In a particular embodiment, the ZIF is selected from the group consisting of ZIF-418, ZIF-640, ZIF-585, ZIF-725, ZIF-726, ZEF-636, ZIF-813, ZIF-740, ZIF-412, ZIF-413, and ZIF-414. In a further embodiment, the ZIF is selected from ZIF-740 or ZIF-412.

In another embodiment, the disclosure provides for a ZIF that is reacted with one or more post framework reactants. In a further embodiment, the one or more post framework reactants adds at least one effect to the ZIF selected from the group consisting of: modulates the gas storage ability of the ZIF; modulates the sorption properties of the ZIF; modulates the pore size of the ZIF; modulates the catalytic activity of the ZIF; modulates the conductivity of the ZIF; and modulates the sensitivity of the ZIF to the presence of an analyte of interest. In yet another embodiment, a ZIF disclosed herein comprises one or more guest species. In a further embodiment, a ZIF disclosed herein further comprises one or more absorbed or adsorbed chemical species. Examples of adsorbed or absorbed chemical species includes, but is not limited to, argon, ammonia, carbon dioxide, carbon monoxide, hydrogen, amines, oxygen, ozone, nitrogen, nitrous oxide, organic dyes, polycyclic organic molecules, hydrogen sulfide, carbonyl sulfide, carbon disulfide, mercaptans, hydrocarbons, formaldehyde, diisocyanates, trichloroethylene, fluorocarbons, and combinations thereof.

In a certain embodiment, the disclosure further provides a method to separate or store one or more gases from a mixed gas mixture comprising contacting the gas mixture with a ZIF of the disclosure. In a further embodiment, the one or more gases that are separated and stored is $CO_2$. In another embodiment, the disclosure provides a method to separate or store $CO_2$ from a fuel gas stream or natural gas stream comprising contacting the fuel gas stream or natural gas stream with a ZIF disclosed herein. In another embodiment, a method to separate or store one or more gases from the exhaust of a combustion engine comprises contacting the exhaust with a ZIF of the disclosure.

In a particular embodiment, the disclosure also provides a gas storage, gas detector or gas separation device which comprises a ZIF disclosed herein. In a further embodiment, the gas storage, gas detector or gas separation device is selected from purifiers, filters, scrubbers, pressure swing adsorption devices, molecular sieves, hollow fiber membranes, ceramic membranes, cryogenic air separation devices, carbon monoxide detector, car emissions detector and hybrid gas separation devices.

In a certain embodiment, the disclosure provides a catalyst comprising a ZIF disclosed herein. In an alternate embodiment, the disclosure also provides a chemical sensor comprising a ZIF disclosed herein.

DETAILED DESCRIPTION

Figure 1:
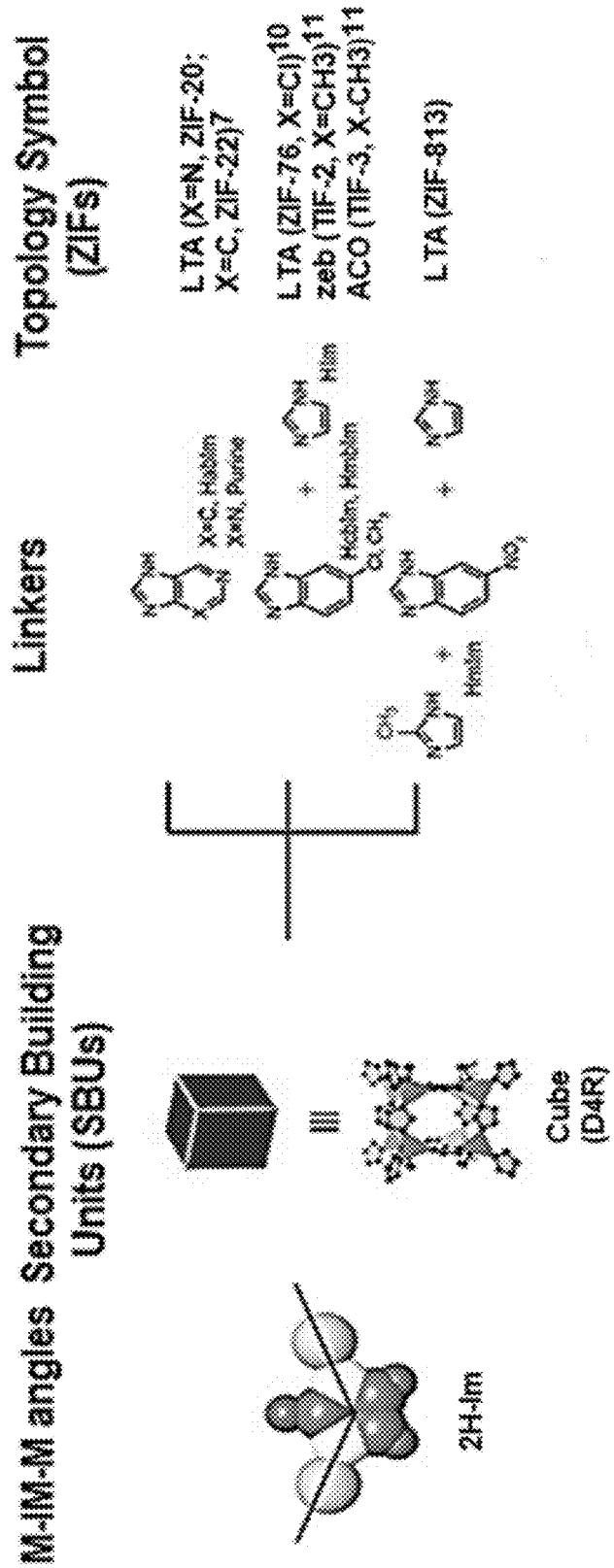
FIG. 1 presents a scheme that summarizes the Im linkers used herein and further presents the crystal structures of the ZIFs of the disclosure including their topologies. The metal-imidazolate-metal (M-Im-M) angles of 2H-Im and 2R-Im, without and with functionality, respectively, at the 2-position are shown in left column. Construction of cube (double 4-ring, D4R) and hexagonal-prism SBU (double 6-ring, D6R) by bridging the tetrahedral units $Zn^{II}$ ($ZnN_4$, tetrahedra; 2H-Im, pentagons; 2R-IM, pentagon) and the linker combinations used in realizing zeolitic frameworks are shown in the middle columns. Resultant zeolitic frameworks with topologies denoted with three-letter symbol (capitalized for known zeolites; bold low-cased for predicted zeolites) and corresponding names of ZIFs are shown in the right column.
Figure 1:

As used herein and in the appended claims, the singular forms "a," "an," and "the" include plural referents unless the context clearly dictates otherwise. Thus, for example, reference to "a DYRK2 inhibitor" includes a plurality of such DYRK2 inhibitors and reference to "the proteasome inhibitor" includes reference to one or more proteasome inhibitors or equivalents thereof known to those skilled in the art, and so forth.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Unless defined otherwise, all technical and scientific terms used herein have the same meaning as commonly understood by one of ordinary skill in the art to which this disclosure belongs. Although many methods and reagents similar to or equivalent to those described herein can be used in the practice of the disclosed methods and compositions, the exemplary methods and materials are now described.

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure.

The term "cluster" refers to identifiable associations of 2 or more atoms. Such associations are typically established by some type of bond-ionic, covalent, Van der Waal, coordinate and the like.

The term "framework" as used herein, refers to a highly ordered structure comprised of secondary building units (SBUs) that can be linked together in defined, repeated and controllable manner, such that the resulting structure is characterized as being porous, periodic and crystalline. Typically, "frameworks" are two dimensional (2D) or three dimensional (3D) structures. Examples of "frameworks" include, but are not limited to, "metal-organic frameworks" or "MOFs", "zeolitic imidazolate frameworks" or "ZIFs", or "covalent organic frameworks" or "COFs". While MOFs and ZIFs comprise SBUs of metals or metal ions linked together by forming covalent bonds with linking clusters on organic linking moieties, COFs are comprised of SBUs of organic linking moieties that are linked together by forming covalent bonds via linking clusters. As used herein, "framework" does not refer to coordination complexes or metal complexes. Coordination complexes or metal complexes are comprised of a relatively few number of centrally coordinated metal ions (i.e., less than 4 central ions) that are coordinately bonded to molecules or ions, also known as ligands or complexing agents. By contrast, "frameworks" are highly ordered and extended structures that are not based upon a centrally coordinated ion, but involve many repeated secondary building units (SBUs) linked together (e.g., >10, >100, >1000, >10,000, etc). Accordingly, "frameworks" are orders of magnitude much larger than coordination complexes and have different structural and chemical properties due to the framework's open and ordered structure.

The term "linking cluster" refers to one or more atoms capable of forming an association, e.g. covalent bond, polar covalent bond, ionic bond, and Van Der Waal interactions, with one or more atoms of another linking moiety, and/or one or more metal or metal ions. A linking cluster can be part of the parent chain itself, e.g. the nitrogen atoms in imidazole, and/or additionally can arise from functionalizing the parent chain, e.g. adding carboxylic acid groups to the imidazole-based parent chain. For example, a linking cluster can comprise $NN(H)N$, $N(H)NN$, $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_4$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, $CH(SH)_2$, $C(SH)_3$, $CH(NH_2)_2$, $C(NH_2)_3$, $CH(OH)_2$, $C(OH)_3$, $CH(CN)_2$, and $C(CN)_3$, wherein R is an alkyl group having from 1 to 5 carbon atoms, or an aryl group comprising 1 to 2 phenyl rings and $CH(SH)_2$, $C(SH)_3$, $CH(NH_2)_2$, $C(NH_2)_3$, $CH(OH)_2$, $C(OH)_3$, $CH(CN)_2$, and $C(CN)_3$. Generally for a metal triazolate framework disclosed herein, the linking cluster(s) that bind one or metal or metal ions and/or associate with one or more atoms of another linking moiety comprise at least one, two, or all three nitrogen atoms of the imidazole-based parent chain. But, the imidazole-based parent chain may be further substituted with one or more linking clusters and can therefore form associations with one or more metal or metal ions and/or one or more atoms of another linking moiety in addition to, or alternatively to, the nitrogen atom-based linking cluster(s) of the imidazole-based parent chain. Generally, the linking clusters disclosed herein are Lewis bases, and therefore have lone pair electrons available and/or can be deprotonated to form stronger Lewis bases. The deprotonated version of the linking clusters, therefore, are encompassed by the disclosure and anywhere a linking cluster that is depicted in a non-deprotonated form, the de-protonated form should be presumed to be included, unless stated otherwise. For example, although the structural Formulas presented herein are illustrated as having either an amine, for the purposes of this disclosure, these illustrated structures should be interpreted as including both the amine and the de-protonated amine.

A "metal" refers to a solid material that is typically hard, shiny, malleable, fusible, and ductile, with good electrical and thermal conductivity. "Metals" used herein refer to metals selected from alkali metals, alkaline earth metals, lanthanides, actinides, transition metals, and post transition metals.

A "metal ion" refers to an ion of a metal. Metal ions are generally Lewis Acids and can form coordination complexes. Typically, the metal ions used for forming a coordination complex in a framework are ions of transition metals.

The term "post framework reactants" refers to all known substances that are directly involved in a chemical reaction. Post framework reactants typically are substances, either elemental or metals, which have not reached the optimum number of electrons in their outer valence levels, and/or have not reached the most favorable energetic state due to ring strain, bond length, low bond dissociation energy, and the like. Some examples of post framework reactants include, but are not limited to:

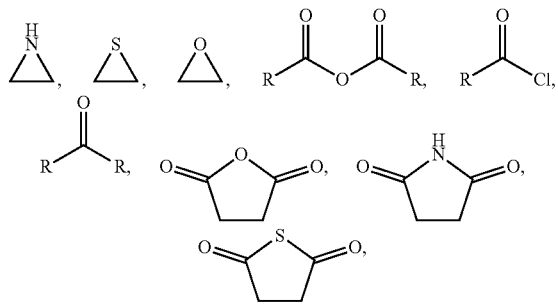

I-R, Br—R, CR$_3$—Mg—Br, CH$_2$R—Li, CR$_3$, Na—R, and K—R; and wherein each R is independently selected from the group comprising: H, sulfonates, tosylates, azides, triflates, ylides, alkyl, aryl, OH, alkoxy, alkenes, alkynes, phenyl and substitutions of the foregoing, sulfur-containing groups (e.g., thioalkoxy, thionyl chloride), silicon-containing groups, nitrogen-containing groups (e.g., amides and amines), oxygen-containing groups (e.g., ketones, carbonates, aldehydes, esters, ethers, and anhydrides), halogen, nitro, nitrile, nitrate, nitroso, amino, cyano, ureas, boron-containing groups (e.g., sodium borohydride, and catecholborane), phosphorus-containing groups (e.g., phosphorous tribromide), and aluminum-containing groups (e.g., lithium aluminum hydride).

The term "substantially" as used to modify a term means that the modified term includes minor variations in size, purity, structure and the like by only a minor amount. Accordingly, "substantially homogenous in size" means that the material does not vary by more than 1%, 5%, 10%, 20% or 30% (or any value there between) in size from an average size. Thus, MOF nanocrystals do not vary in size by more than 30% from an average size.

The term "substituted" with respect to hydrocarbons, heterocycles, and the like, refers to structures wherein the parent chain contains one or more substituents.

The term "substituent" refers to an atom or group of atoms substituted in place of a hydrogen atom. For purposes of this disclosure, a substituent would include deuterium atoms.

The term "unsubstituted" with respect to hydrocarbons, heterocycles, and the like, refers to structures wherein the parent chain contains no substituents.

"Zeolitic imidazolate frameworks" or "ZIFs" are porous crystalline materials that are constructed by the linkage of inorganic metal clusters called secondary building units (SBUs) with organic linking moieties via linking clusters. These materials have very large surface areas and pore volumes. Therefore, ZIFs are ideally suited for use in gas sorption and/or gas separation. ZIFs have been shown to have tremendous utility in the separation of various hydrocarbon mixtures, including ethane/ethylene, propane/propylene, and $C_5$ alkane mixtures, among many others.

As used herein, a wavy line intersecting another line that is connected to an atom indicates that this atom is covalently bonded to another entity that is present but not being depicted in the structure. A wavy line that does not intersect a line but is connected to an atom indicates that this atom is interacting with another atom by a bond or some other type of identifiable association.

A bond indicated by a straight line and a dashed line indicates a bond that may be a single covalent bond or alternatively a double covalent bond. But in the case where an atom's maximum valence would be exceeded by forming a double covalent bond, then the bond would be a single covalent bond.

Almost all zeolites and ZIFs, are based on nearly two-dozen secondary building units (SBUs, see examples in FIG. 1), but many attempts to use these in making the predicted zeolitic frameworks have been unsuccessful. The disclosure addresses this challenge by using imidazolate with no functionality at the 2-position (2H-Im) and with functionality (2R-Im) to make new ZIFs of known and predicted zeolites (See FIG. 1), all of which are based on the hexagonal prism and the cube SBUs. The disclosure further shows that multivariate imidazolates (multiply functionalized combinations) are ideally suited for accessing members of the library of predicted structures, and describe fourteen new ZIFs based on zeolites (GME, ZIF-418, 640; CHA, ZIF-585; KFI, ZIF-725, 726; AFX, ZIF-636; LTA, ZIF-813) and others (bam, ZIF-740; ucb, ZIF-412, 413, 414, 516; hyk, ZIF-128; cjk48, ZIF-723). The ZIFs belonging to bam and ucb topologies show the largest pore opening of any ZIF (24-membered ring opening of 22.5 Å in diameter for ZIF-740) and one of the largest unit cells ever reported (cell length and volume of 7 nm and over 376,000 Å$^3$ for ZIF-412). The extra-large crystal structure of ZIF-412 allowed mapping the gas distribution within its pores as a function of pressure using small angle X-ray scattering techniques and uncover an unprecedented sequential gas filling mechanism.

Initially, the synthesis of ZIFs was observed to be sensitive to whether 2H-Im or 2R-Im linker is used. ZIFs constructed of the hexagonal prism SBUs form when a combination of 2H-Im and 2R-Im is employed, and other ZIFs of the cube SBUs form with 2H-Im (See FIG. 1). Thus, the ZIFs disclosed herein were prepared from a mixture of the corresponding imidazoles and a zinc (II) salt in either N,N-dimethylformamide (DMF) or N,N-diethylformamide (DEF), where the metal-to-imidazole mole ratios were varied from about 1:2 to 1:12. This reaction mixture was heated to a temperature range of about 65 to 130° C. for 36 hours to 12 days to obtain the crystalline ZIFs. The structures of all ZIFs were determined by single-crystal X-ray diffraction and, with the exception of ZIF-813, 516, their chemical composition was determined by elemental analysis and $^1$H-NMR spectroscopy of digested solutions of evacuated samples.

Figures 2A, 2B, 2C, 2D, 2E:
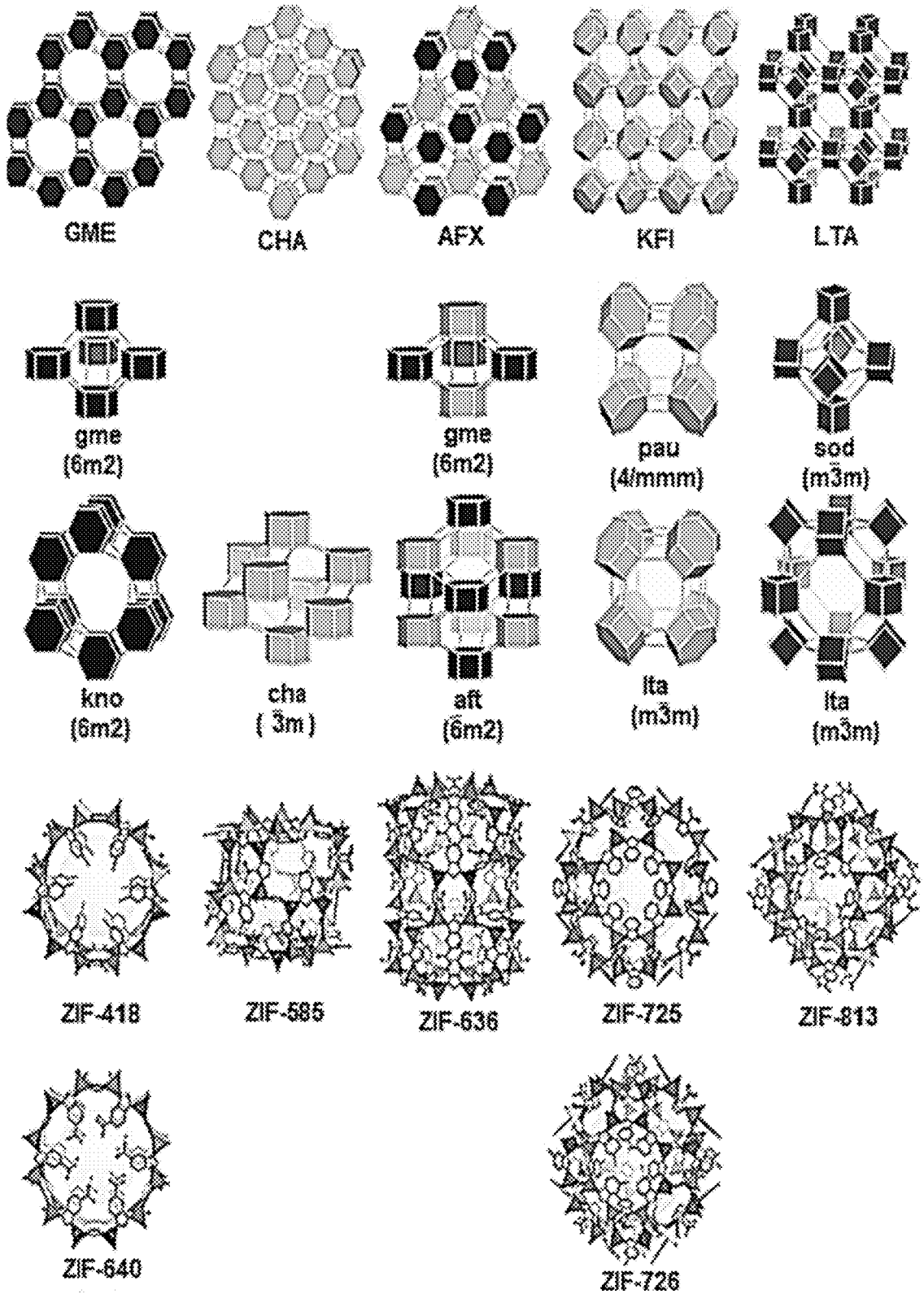
FIG. 2A-E shows the underlying zeolite topologies, natural tilling and representative cages in the obtained ZIFs. Top down, zeolite topologies (A-E) constructed from the hexagonal-prism or cube SBUs. Each hexagonal prism is connected to six adjacent ones through three alternate edges of each hexagon face. In different topologies, eclipsed (with $C_{3h}$ symmetry) and staggered (with $S_6$ symmetry) extension fashion were observed for hexagonal prisms related to the imidazolate distribution inside SBU. Each cube is connected to eight adjacent one. Natural tillings (denoted with three italic letters) are shown with encapsulation of hexagonal-prism and cube SBUs. Characteristic cages of ZIFs are shown with ball-and-stick for linkers (N, C, O, Cl, H is omitted for clarity) and tetrahedron for $ZnN_4$ motifs.
Figures 3A, 3B:
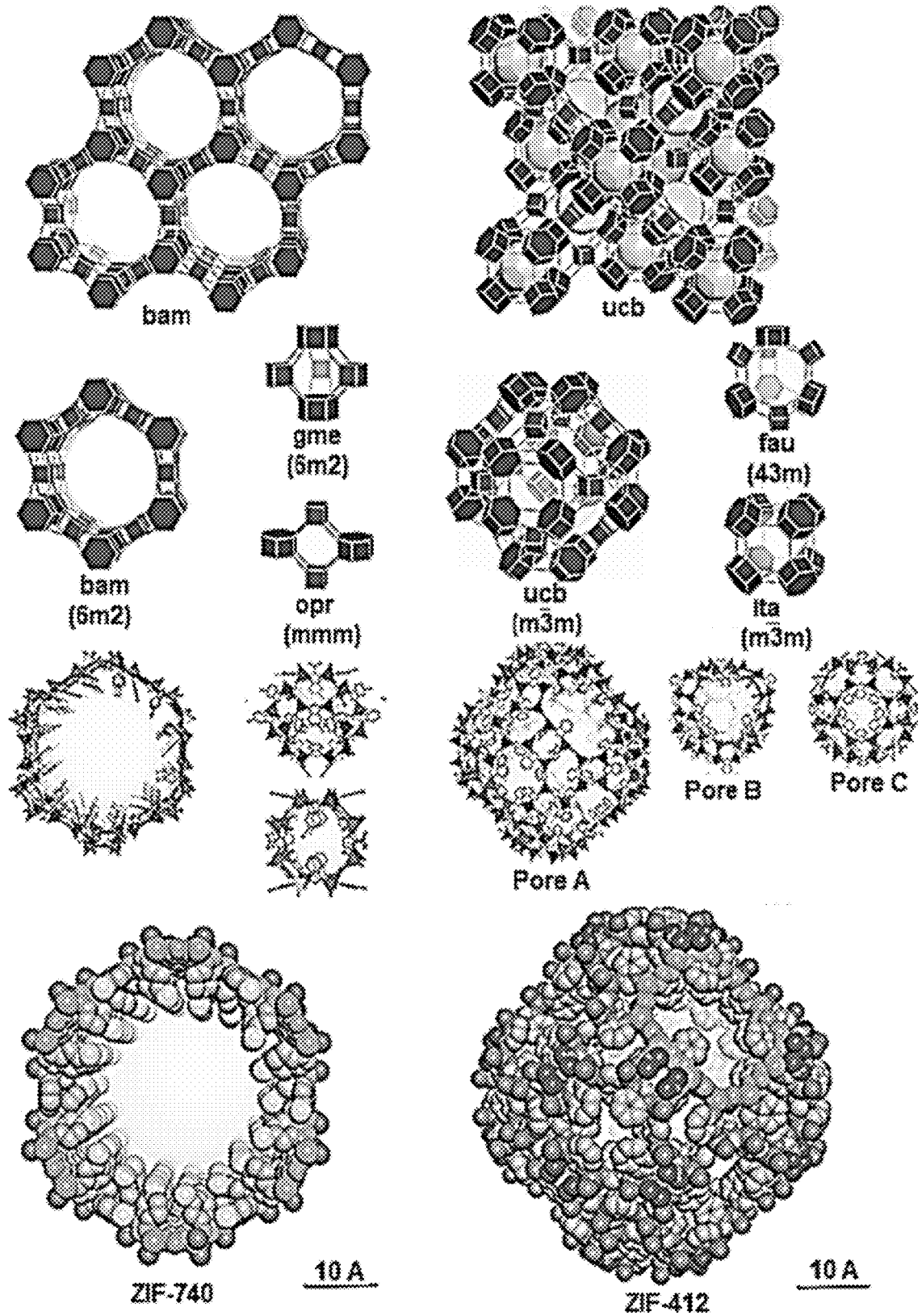
FIG. 3A-B shows the underlying zeolitic topologies, natural tilling and representative cages and channel for bam and ucb ZIFs. Top down, the zeolitic frameworks (A and B) are denoted with three-bold-letter symbol and their characteristic tiles are denoted with three-italic-letter symbol. ZIF cages and channel are shown in ball-and-stick for imidazolates (N, C, O, Br, H is omitted for clarity) and tetrahedra for $ZnN_4$ motif. Space filling views are shown for the channel of bam ZIF (ZIF-740) with the 24-MR aperture highlighted and the largest cages of ucb ZIFs (illustrated by ZIF-412) with the 12-MR opening highlighted.

Among the fourteen ZIFs described herein, seven are based on topologies found in zeolites (GME, CHA, AFX, KFI, and LTA) (FIG. 1A-E), in which AFX and KFI were achieved here in metal-organic composition for the first time, while the remaining four are based on topologies that have only been predicted for zeolites (bam and ucb) (see FIG. 3A-B). The Im linkers used and the crystal structures of the ZIFs including their topologies are summarized in FIG. 1 and shown in FIGS. 2 and 3. The GME, CHA, KFI, and AFX are all based on linking solely hexagonal prisms, while LTA is based on linking cubes, and the bam and ucb are based on linking a combination of hexagonal prisms and cubes.

Consideration of the already known ZIFs in terms of their underlying topological transitivity reveals that they belong to only twelve zeolite types (ABW, ANA, BCT, GIS, GME, DFT, LTA, MER, ACO, RHO, SOD, CHA), and that these are all vertex-transitive (one unique vertex, uninodal). It is worth noting that only 22 of the 231 recognized topologies of all zeolites are uninodal with the rest of these having two or more topologically distinct vertices (i.e. binodal, trinodal, and so on). This is also the case for the great majority (>99%) of the predicted structures. Members of the new ZIF family are based on uninodal (GME, CHA, KFI) and binodal (AFX) zeolite structures, and more importantly, binodal (bam) and trinodal (ucb) predicted zeolite structures.

Table N highlights several points pertaining to the use of functionality in coding for specific structures of ZIFs. The plot is of the angles found in ZIFs (including the ones reported herein) and their corresponding topologies divided in terms of the geometry of the SBUs they are composed of, and color-coded (red and blue) for whether 2H-Im or 2R-Im was used. Three major points can be made based on this plot. Firstly, 2H-Im has smaller M-Im-M angles than 2R-Im and that this difference is decisive in coding for cube rather than hexagonal prism SBUs. When 2R-Im is introduced into LTA ZIF-813 instead of being incorporated within the cube, it appears outside the cubes as a connector; thus strengthening the point concerning 2H-Im coding for the cube. Secondly, using 2R-Im alone does not produce the hexagonal prism because the steric constraint of the functionalities on adjacent linkers, thus by introducing 2H-Im, the scrambling of the two different linkers space away these functionalities. Thirdly, it is clear that a certain range of angles is found for 2H-Im and 2R-Im and that the combined spread of angles is characteristic of a given topology. This is highlighted by topologies such as CHA, bam, and ucb, where a spread of M-Im-M angles over 135-149°, 134-146°, 133-146°, respectively, is found. Indeed, it is for this reason that the use of multivariate Im linkers was essential to stabilize the cube and the hexagonal prism SBUs.

The crystal structures of this family of ZIFs show that the space enclosed by the SBUs provides for interconnected cage systems with large openings. The representative cages of these ZIFs are illustrated in FIGS. 2 and 3. Five hexagonal prisms in three adjacent layers along the c axis enclose the gme cages, while six hexagonal prisms with a 12-membered ring (12-MR) opening surround the kno channels in GME ZIF-418 and 640 (see FIG. 2A). Eight hexagonal prisms from four adjacent layers enclose the cha cage in CHA ZIF-585 (see FIG. 2B), and five hexagonal prisms encapsulate the gme cages in AFX ZIF-636 (see FIG. 2C). In addition, a large ellipsoid aft cage is formed with eleven hexagonal prisms in five adjacent layers. For KFI ZIF-725 and 726, the lta cages are capped by eight hexagonal prisms located at the corners with the hexagonal face pointing to the center, while eight hexagonal prisms at the corners have the square face pointing to the center of pau cages (see FIG. 2D). In the LTA ZIF-813, six cubes surround the truncated cuboctahedron sod cage, and twelve cubes surround the lta cage (see FIG. 2E).

The bam ZIF-740 (see FIG. 3A) is constructed by alternately linking hexagonal prism with cube in a 2:3 ratio forming a cylinder with a giant opening of 24-MR (96 ring atoms) and a pore aperture of 22.5 Å, which is the largest among all ZIFs, exceeding the previous record held by 12-MR in GME ZIFs. The walls of these channels also have gme cages consisting of two hexagonal prism and three cubes, as well as an octagonal prism cage (opr) of two hexagonal prism and two cubes.

The ucb ZIF-412, 413, 414, 516 (see, e.g., FIG. 3B) are composed of hexagonal prisms and cubes with a ratio of 3:10, where a cube is connected to four hexagonal prisms and each hexagonal prism is connected to three cubes and three other hexagonal prisms. The interconnection of hexagonal prisms forms lta cages similar to those of KFI ZIF-725 and 726. Furthermore, four hexagonal prisms (with the hexagonal face pointing to the center) at the corners and six cubes at the edges, with a tetrahedral shape, form a fau cage. More interestingly, 24 hexagonal prisms and 12 cubes form a giant truncated cuboctahedral cage denoted as ucb cage. All these ucb ZIFs crystallize in the high-symmetry cubic system (space group Fm3̄m) with the cell length longer than 72 Å and the cell volume exceeding 376,000 Å$^3$, as one of the largest unit cells ever reported for synthetic crystals. For instance, the ZIF-412 has the ucb cage with an internal size and outer size of 33.4 Å and 64 Å, comprising 4752 atoms (144Zn, 1944C, 1512H, 864N and 288O), which is 14 times larger in accessible volume compared to the super cage in benchmark FAU zeolite.

Porosity of the ZIFs was evaluated by comparison of framework density, defined as the number of tetrahedral vertices per unit volume (T/V), which is used for examining the porosity of zeolites. The present ZIFs are highly porous having T/V in the range of 1.53 to 2.20 nm$^{-3}$ (see Table N), making them much lighter than those of zeolites (12 to 20 nm$^{-3}$) and outperforming most of the prior reported ZIFs (1.29 to 7.05 nm$^{-3}$). The activated ZIFs exhibit permanent porosity as confirmed by gas adsorption experiments ($N_2$ at 77 K or Ar at 87 K), having Langmuir surface areas of 890-2500 m$^2$/g and BET the surface areas of 740 to 1520 m$^2$/g (see Table N). Type I isotherms, characteristic of microporous materials, were observed for ZIF-418, 585, 636, 640, 725, and 726, while multiple step isotherms were observed for ZIF-412, 413, 414, and 740 indicating a micro to mesoporous behavior.

Figure 4A:
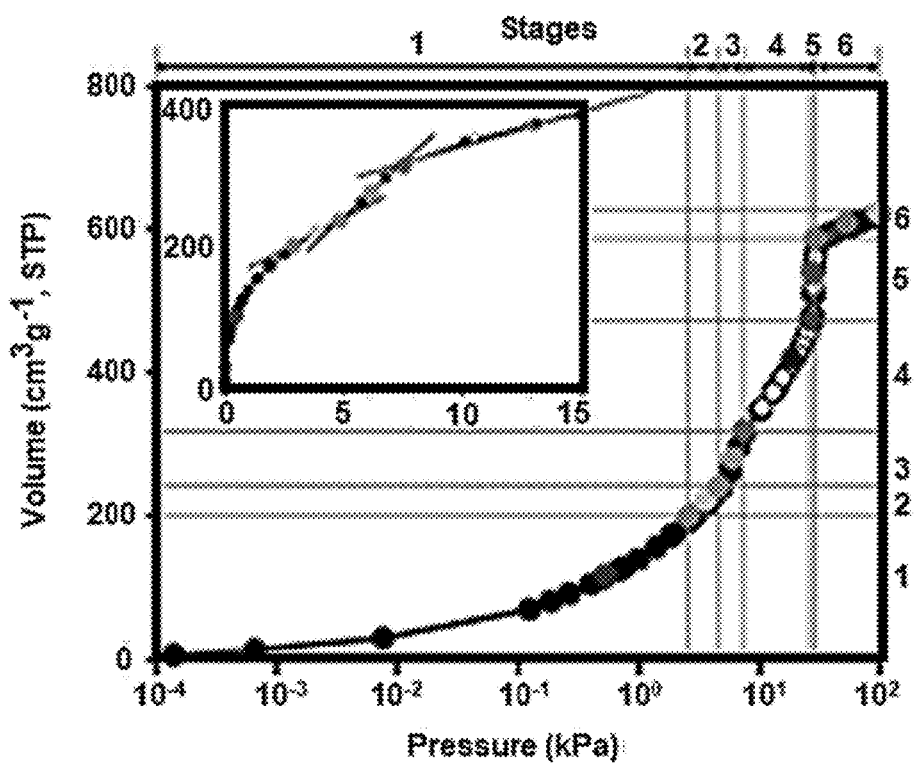
FIG. 4A-D shows the in situ SAXS analysis correlated with adsorption isotherm of ZIF-412 for mapping argon distribution in the pores. (A) Ar adsorption isotherm (log scale for pressure) at 87 K for ZIF-412 with a inset for zooming in the 0 to 15 kPa region. The isotherm can be described in six stages (1-6) based on the slope and adsorption behavior (discussion below). (B) The in situ SAXS patterns collected at different pressures. (C) The unit cell lengths dependent on the pressure determined by indexing the SAXS patterns. (D) Electron density maps (density increase from dark to light) of (110)section of ZIF-412 for mapping argon distribution in the pores at different pressure and stages.
Figure 4B:
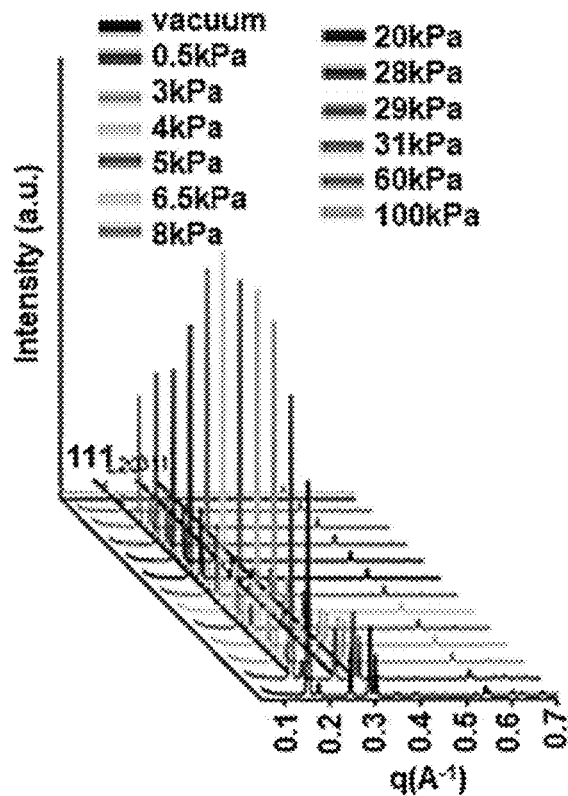
Figure 4C:
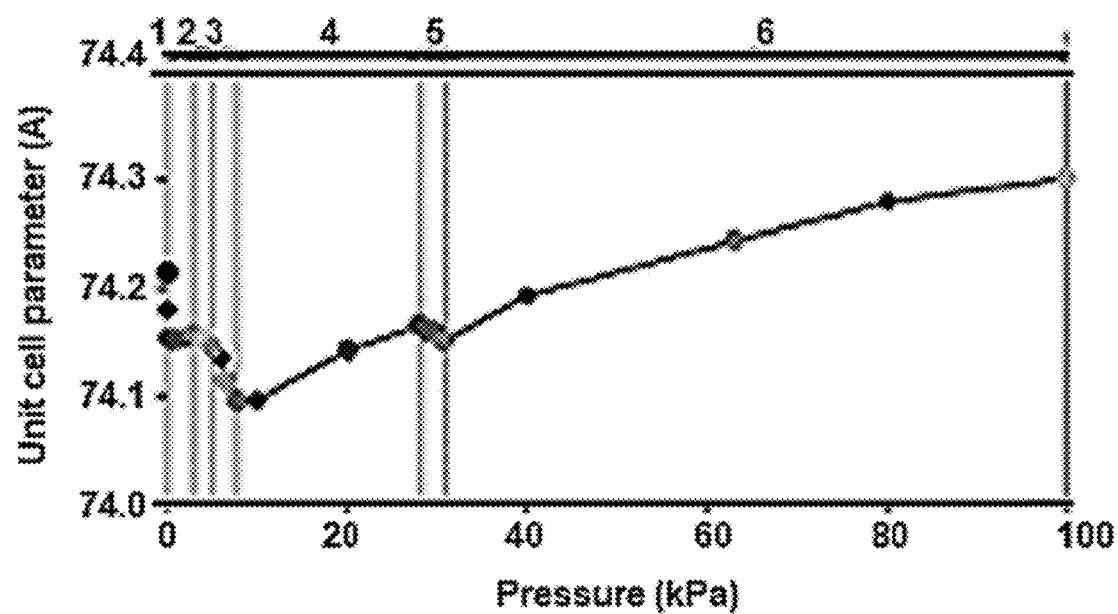
Figure 4D:
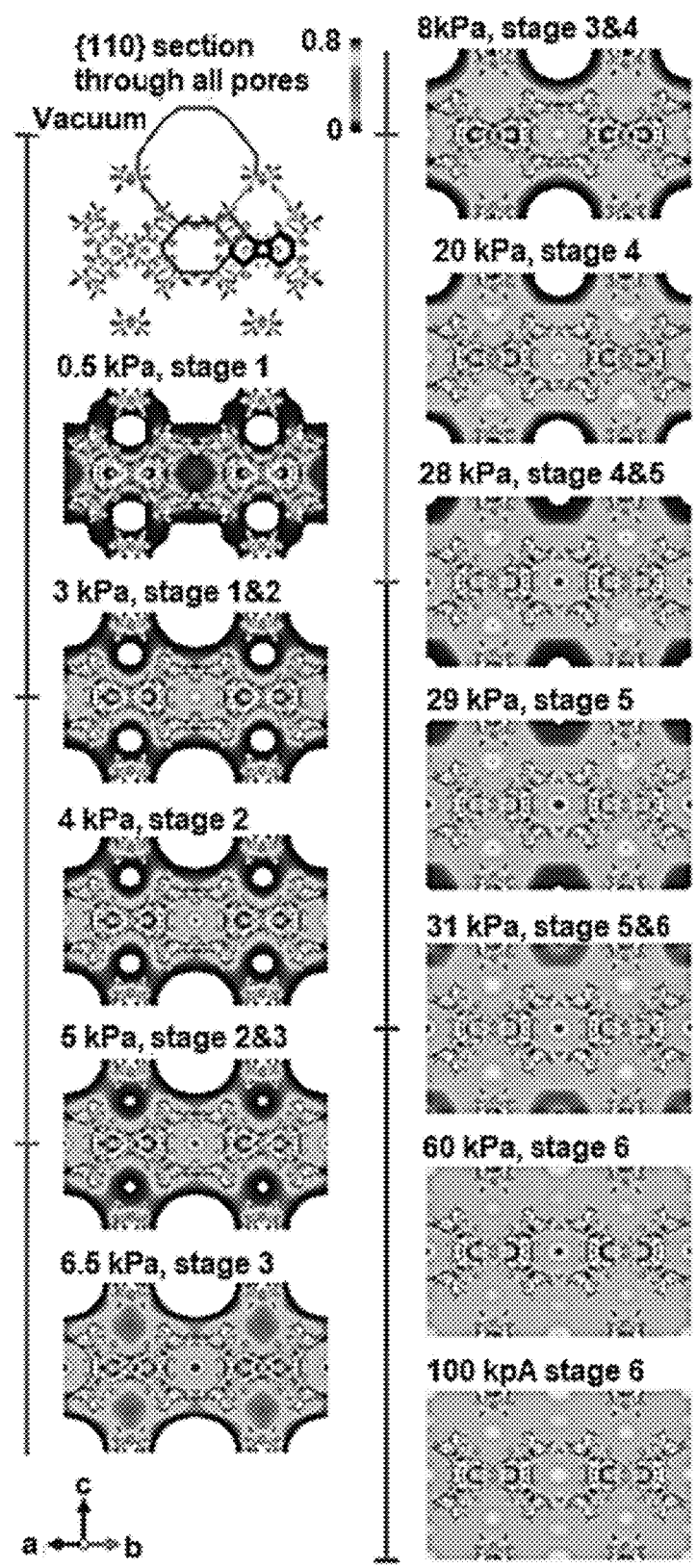
Figure 5:
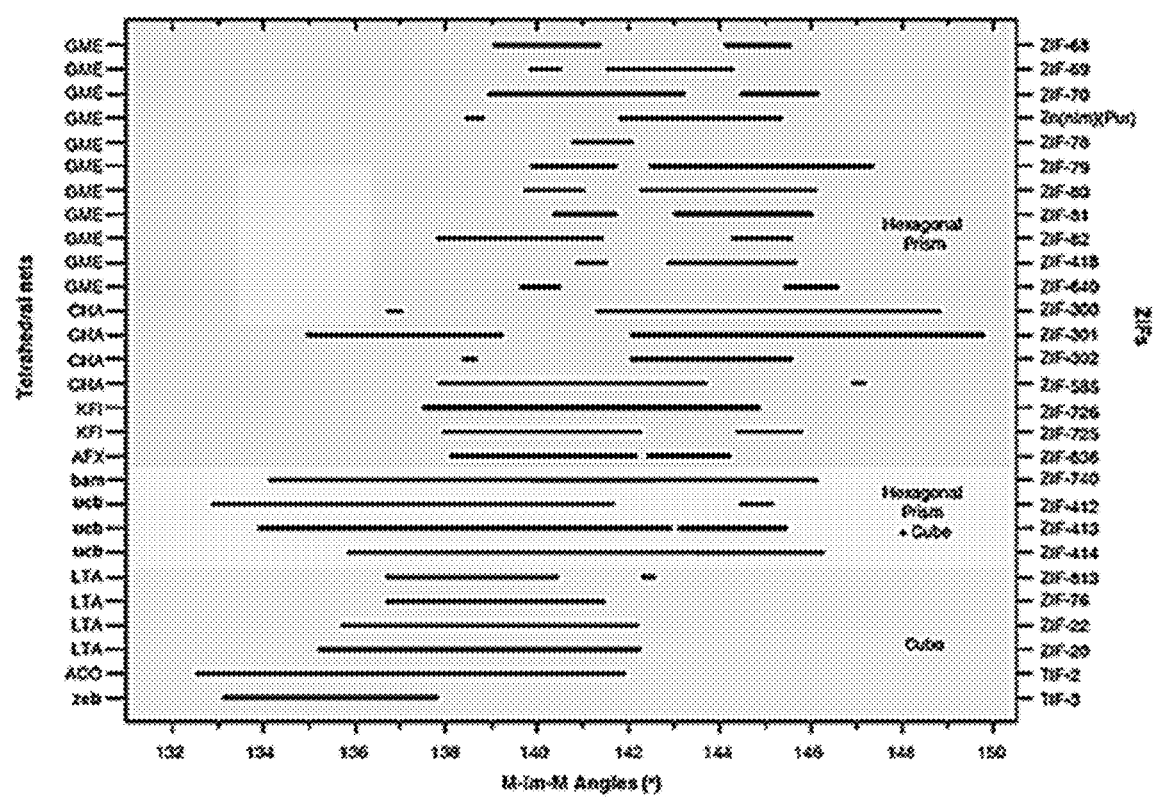
FIG. 5 shows M-Im-M angle range observed in ZIFs having hexagonal prism and cube SBUs correlated with imidazolate types (2H-Im and 2R-Im) and ZIF topologies. M-Im-M angles of 28 ZIFs (axis on right) representing 9 topologies (axis on left) composed of hexagonal prism and cube SBUs are shown. Line segments represent the angle range of 2H-Im and of 2R-Im, respectively.
Figure 6:
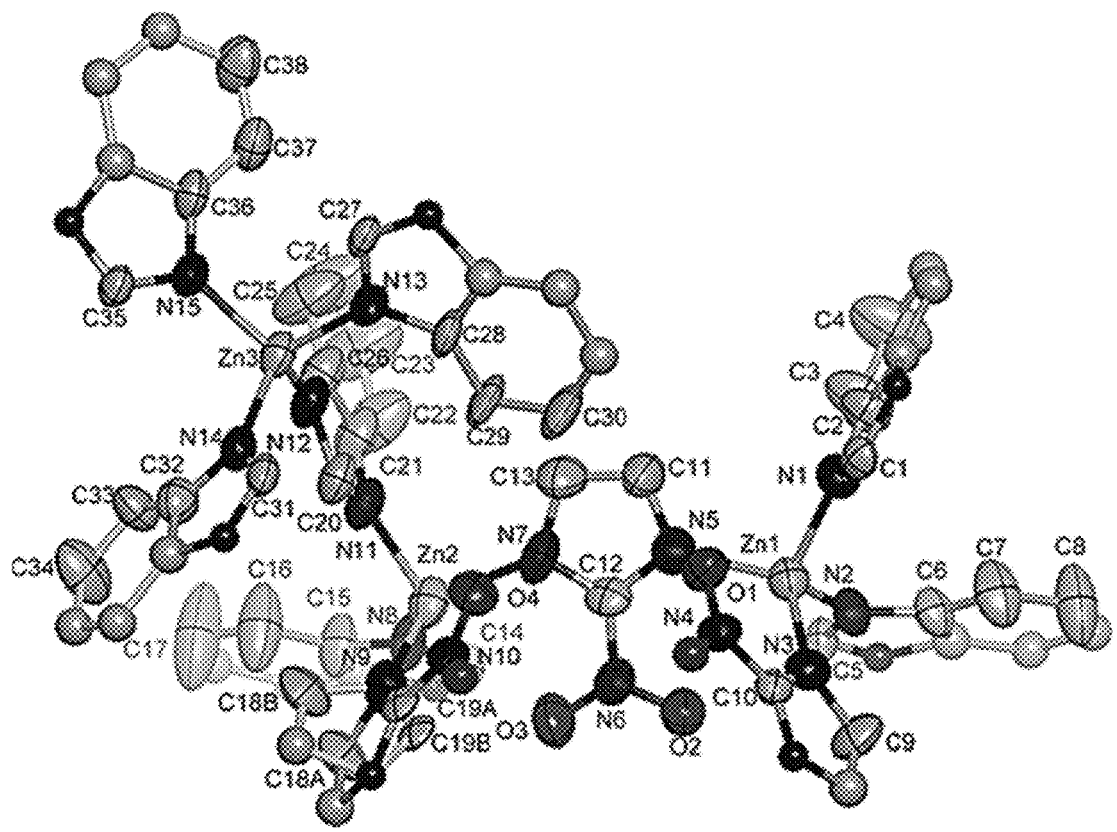
FIG. 6 presents a model of an asymmetric unit in the single crystal structure of ZIF-412 (thermal ellipsoids with 30% probability). Hydrogen atoms are omitted for clarity; orange bonds represent the disordering of bIm and Im. Symmetry-related atoms are not labeled and represented as spheres.
Figure 7:
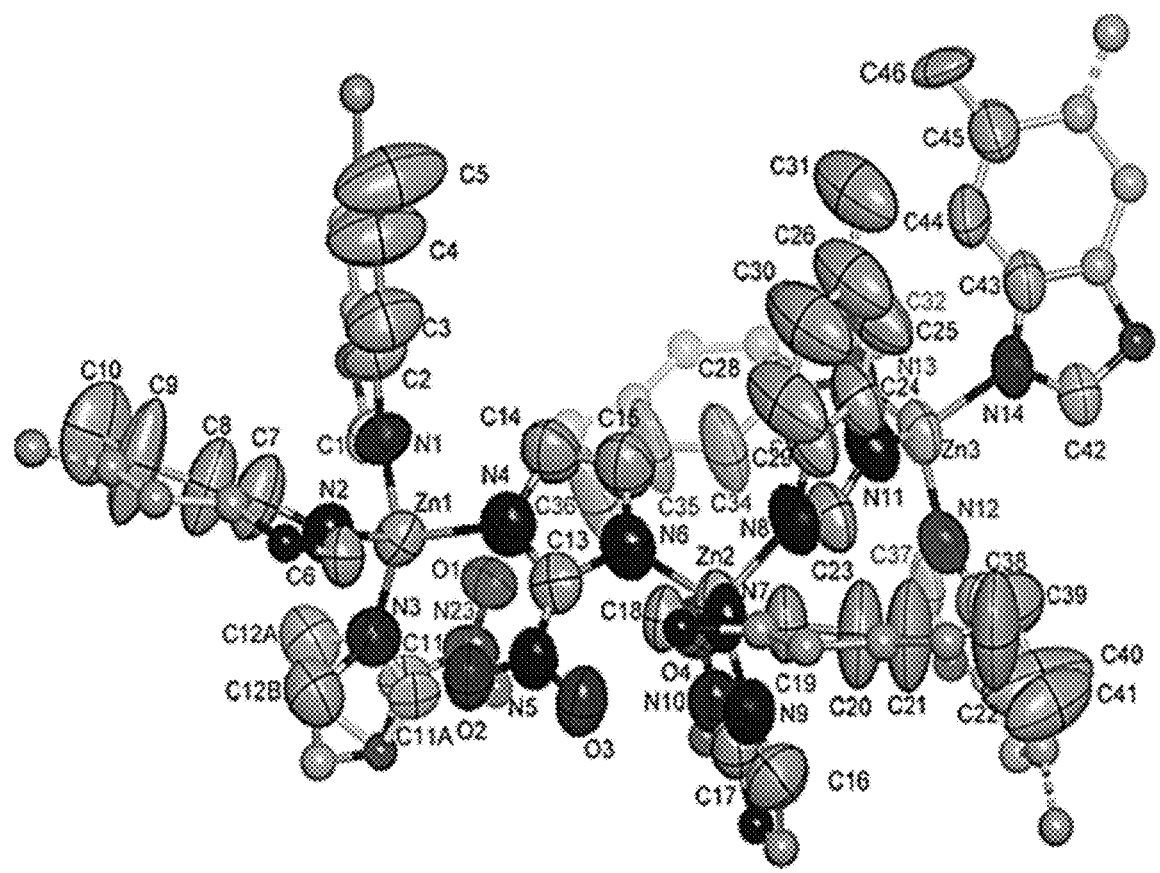
FIG. 7 presents a model of an asymmetric unit in the single crystal structure of ZIF-413 (thermal ellipsoids with 30% probability). Hydrogen atoms are omitted for clarity; orange bonds represent the disordering of mbIm and Im and dashed bonds represent the disordering of the —$CH_3$ group. Symmetry-related atoms are not labeled and represented as spheres.
Figure 8:
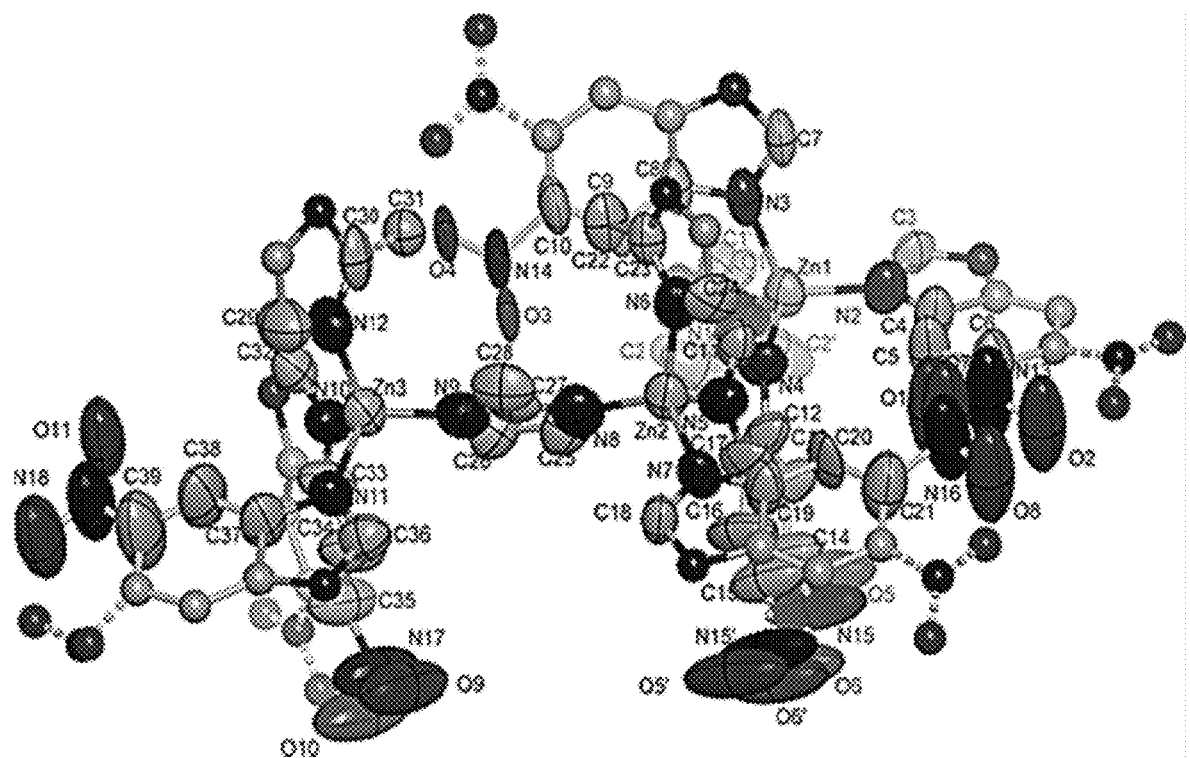
FIG. 8 presents a model of an asymmetric unit in the single-crystal structure of ZIF-414 (thermal ellipsoids with 15% probability). Hydrogen atoms are omitted for clarity; orange bonds represent the disordering of nbIm and Im and dashed bonds represent the disordering of the —$NO_2$ group. Symmetry-related atoms are not labeled and represented as spheres.
Figure 9:
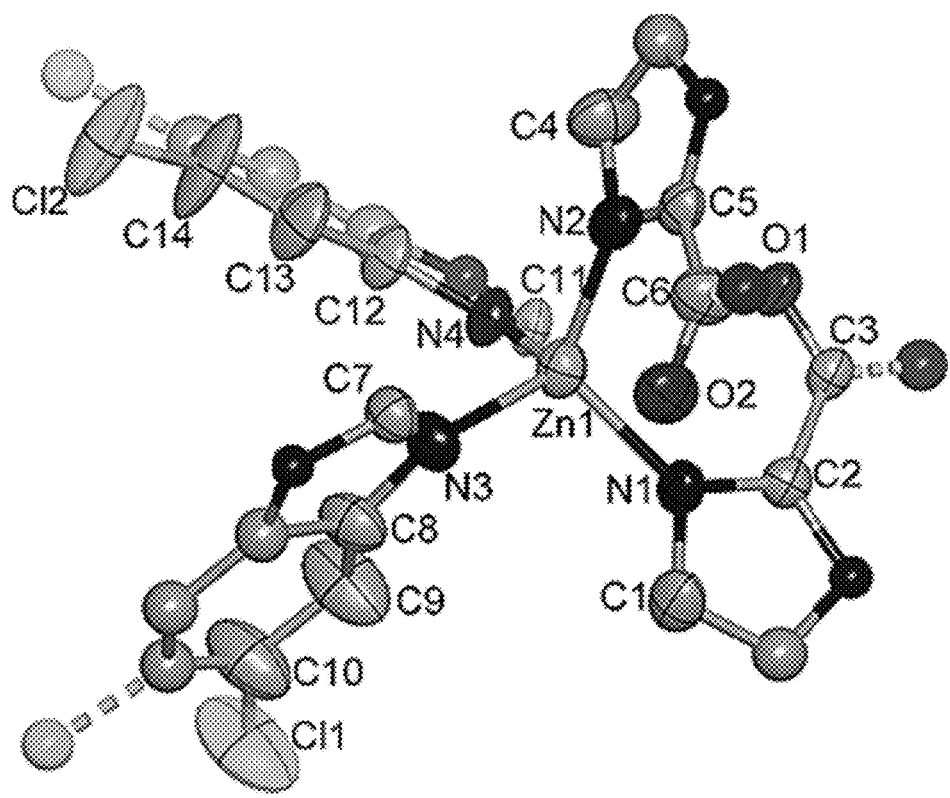
FIG. 9 presents a model of an asymmetric unit in the single crystal structure of ZIF-418 (thermal ellipsoids with 15% probability). Hydrogen atoms are omitted for clarity; the dashed bonds represent the disordering of the —Cl group and the disordering of O on the —CHO group of the aIm. Symmetry-related atoms are not labeled and represented as spheres.
Figure 10:
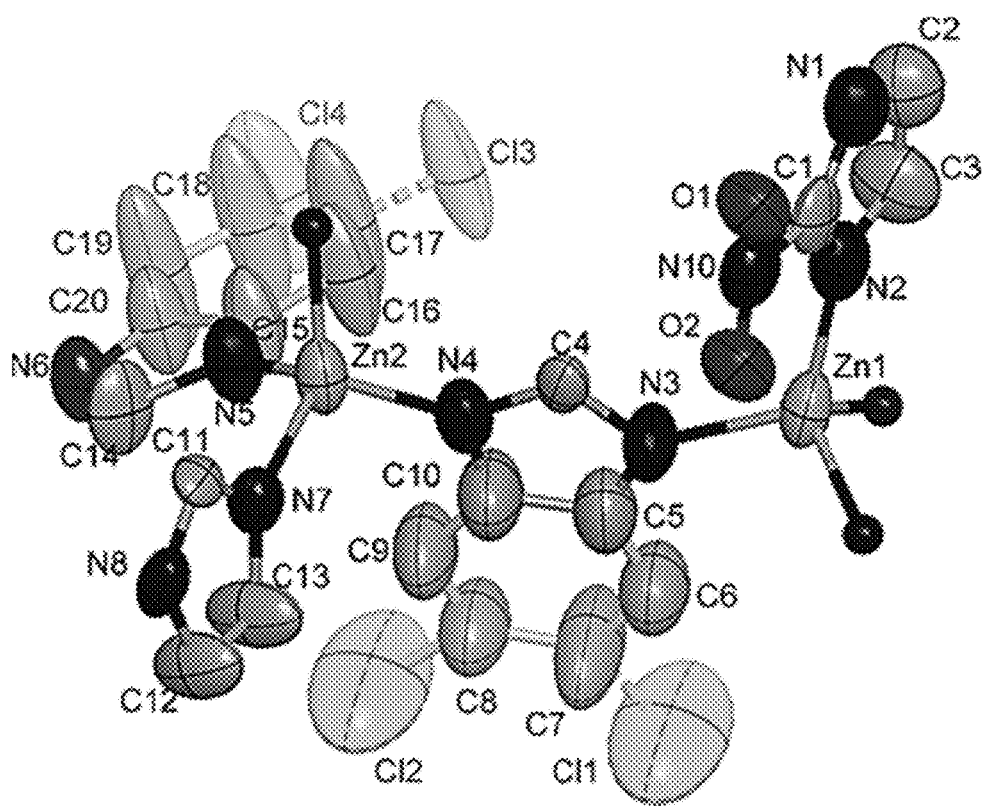
FIG. 10 presents a model of an asymmetric unit in the single-crystal structure of ZIF-585 (thermal ellipsoids with 30% probability). Hydrogen atoms are omitted for clarity; orange bonds represent the disordering of cbIm and Im and dashed bonds represent the disordering of the —Cl group. Symmetry-related atoms are not labeled and represented as spheres.
Figure 11:
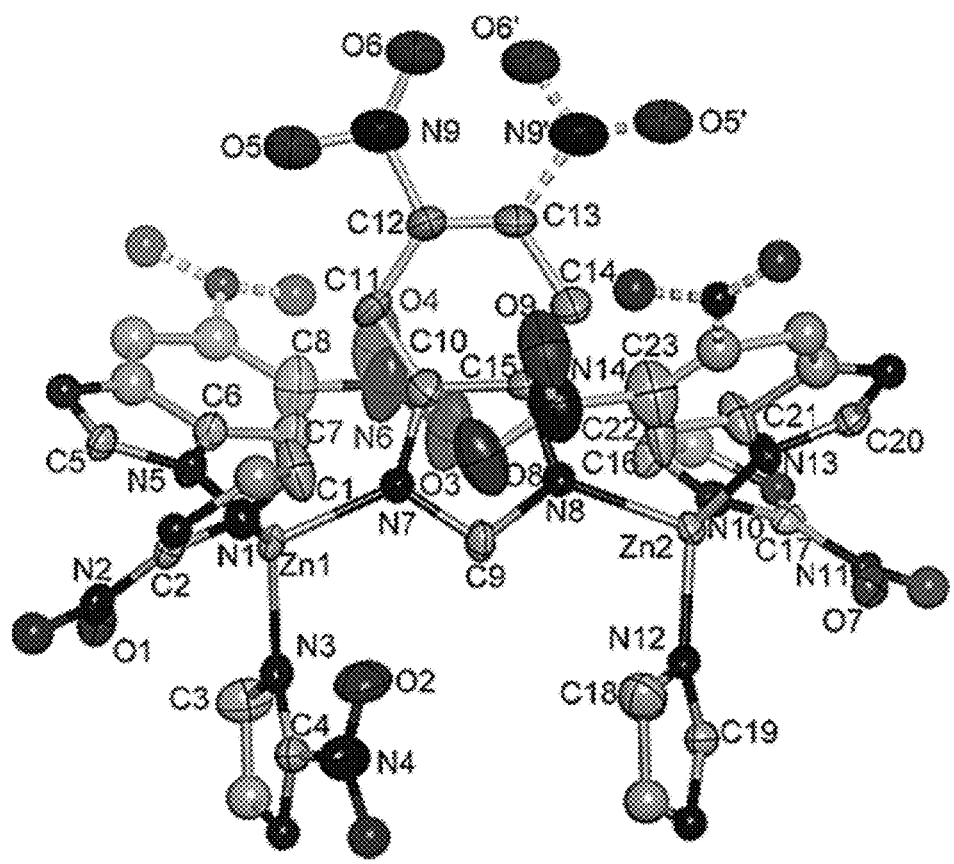
FIG. 11 presents a model of an asymmetric unit in the single-crystal structure of ZIF-636 (thermal ellipsoids with 15% probability). Hydrogen atoms are omitted for clarity; orange bonds represent the disordering of nbIm and Im and dashed bonds represent the disordering of the —$NO_2$ group. Symmetry-related atoms are not labeled and represented as spheres.
Figure 12:
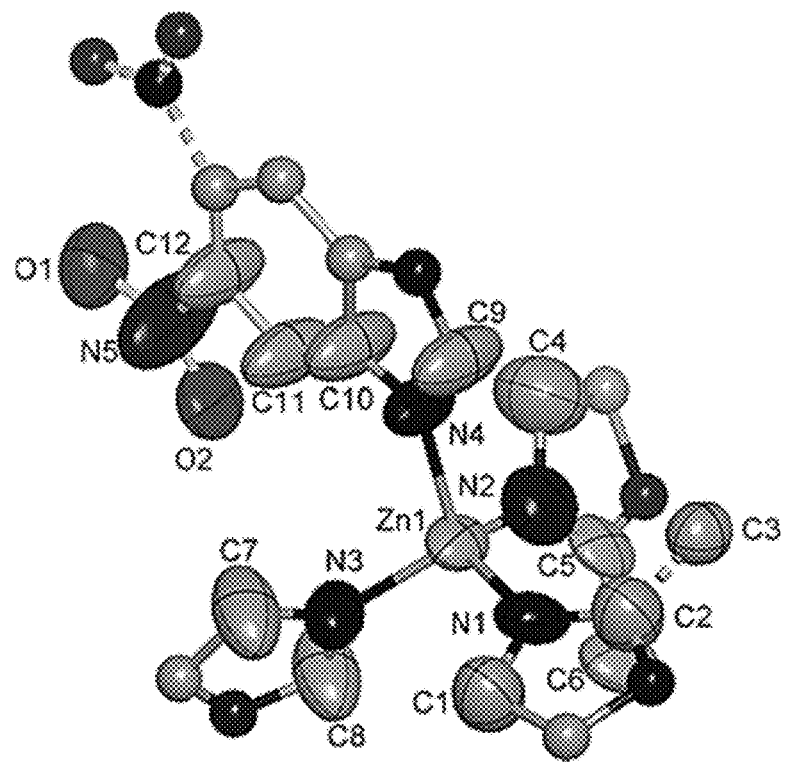
FIG. 12 presents a model of an asymmetric unit in the single-crystal structure of ZIF-640 (thermal ellipsoids with 30% probability). Hydrogen atoms are omitted for clarity; orange bonds represent the disordering of nbIm and Im and dashed bonds represent the disordering of the —$NO_2$ group. Symmetry-related atoms are not labeled and represented as spheres.
Figure 13:
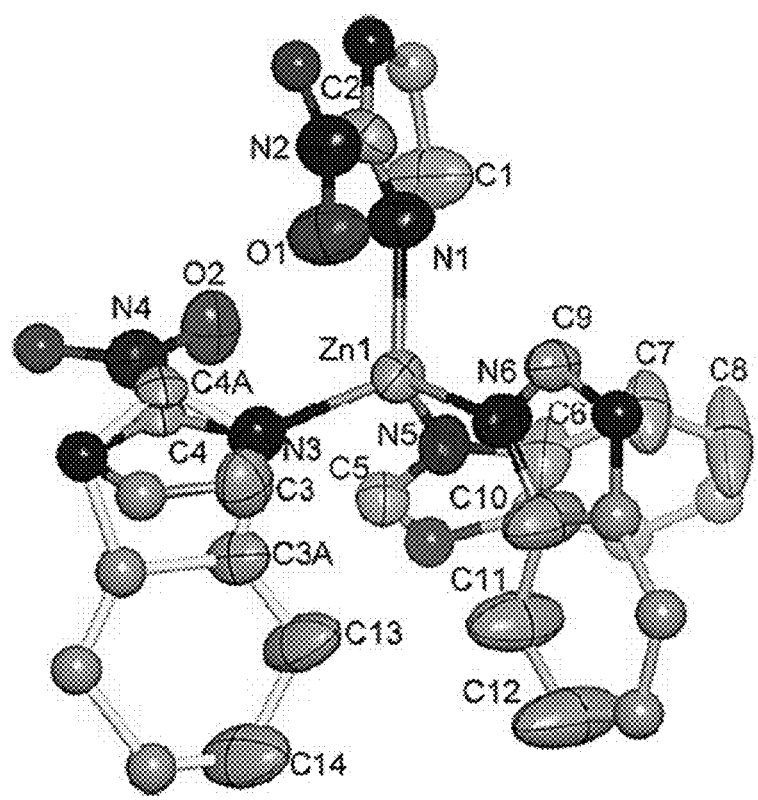
FIG. 13 presents a model of an asymmetric unit in the single-crystal structure of ZIF-725 (thermal ellipsoids with 30% probability). Hydrogen atoms are omitted for clarity; orange bonds represent the disordering of bIm and Im. Symmetry-related atoms are not labeled and represented as spheres.
Figure 14:
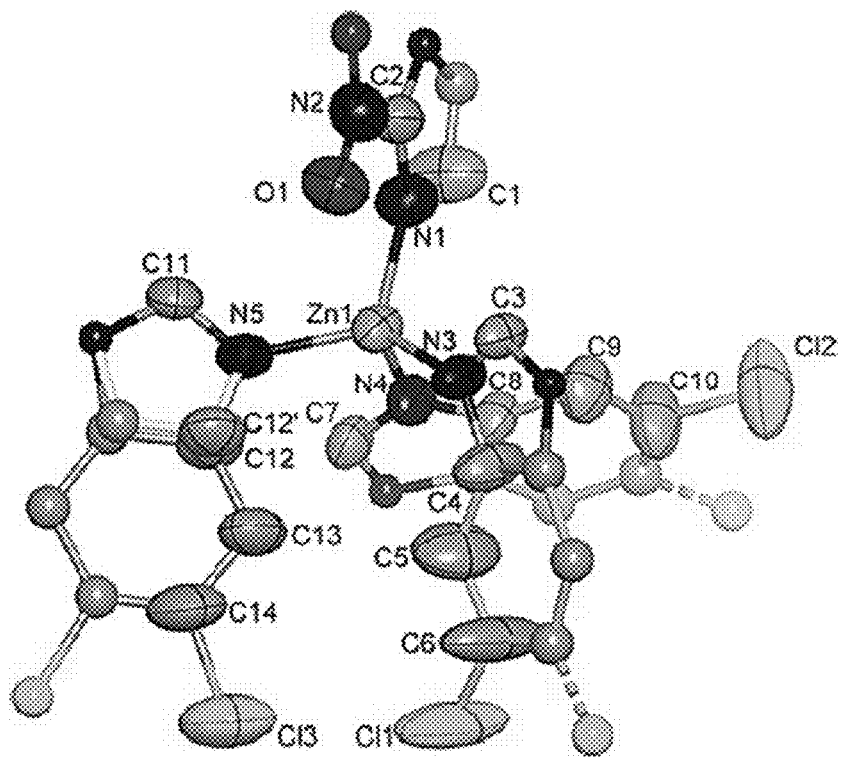
FIG. 14 presents a model of an asymmetric unit in the single-crystal structure of ZIF-726 (thermal ellipsoids with 30% probability). Hydrogen atoms are omitted for clarity; orange bonds represent the disordering of cbIm and Im and dashed bonds represent the disordering of the —Cl group. Symmetry-related atoms are not labeled and represented as spheres.
Figure 15:
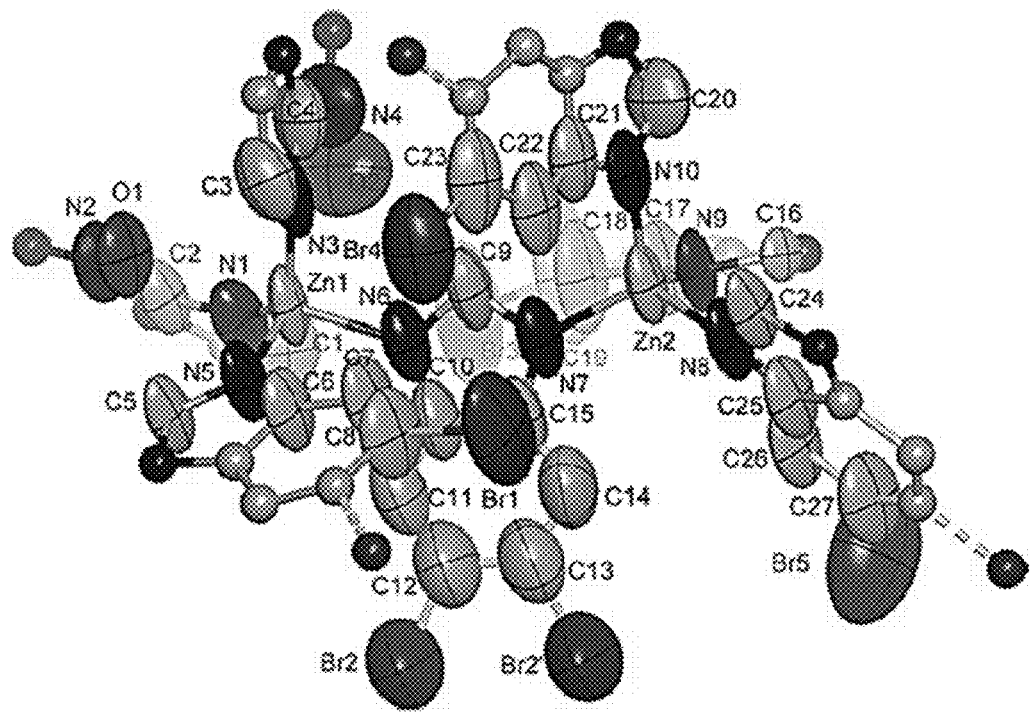
FIG. 15 presents a model of an asymmetric unit in the single-crystal structure of ZIF-740 (thermal ellipsoids with 30% probability). Hydrogen atoms are omitted for clarity; orange bonds represent the disordering of bbIm and Im and dashed bonds represent the disordering of the —Br group. Symmetry-related atoms are not labeled and represented as spheres.
Figure 16A:
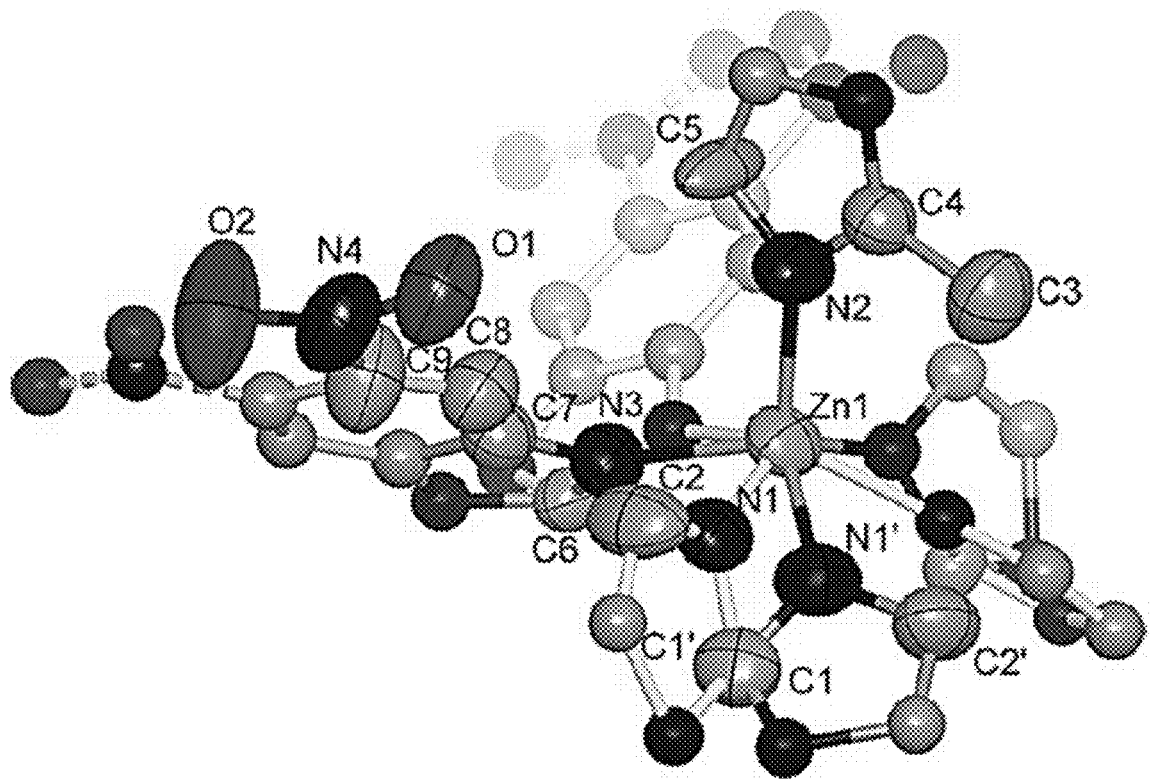
FIG. 16A-C presents (A) a model of an asymmetric unit in the single-crystal structure of ZIF-813 (thermal ellipsoids with 30% probability). Hydrogen atoms are omitted for clarity; orange bonds represent the disordering of nbIm and Im and dashed bonds represent the disordering of the —$NO_2$ group. The dashed double-colored sets represent the disordering of Im and nbIm. Symmetry-related atoms are not labeled and represented as spheres; (B) a model of an asymmetric unit in the single crystal structure of ZIF-723 (thermal ellipsoids with 15% probability). Hydrogen atoms are omitted for clarity; bonds represent the disordering of mbIm and bbIm. Symmetry-related atoms are represented as spheres; (C) a model of an asymmetric unit in the single crystal structure of ZIF-128 (thermal ellipsoids with 15% probability). Hydrogen atoms are omitted for clarity; bonds represent the disordering of 4-nIm. Symmetry-related atoms are not labeled and represented as spheres.
Figure 16B:
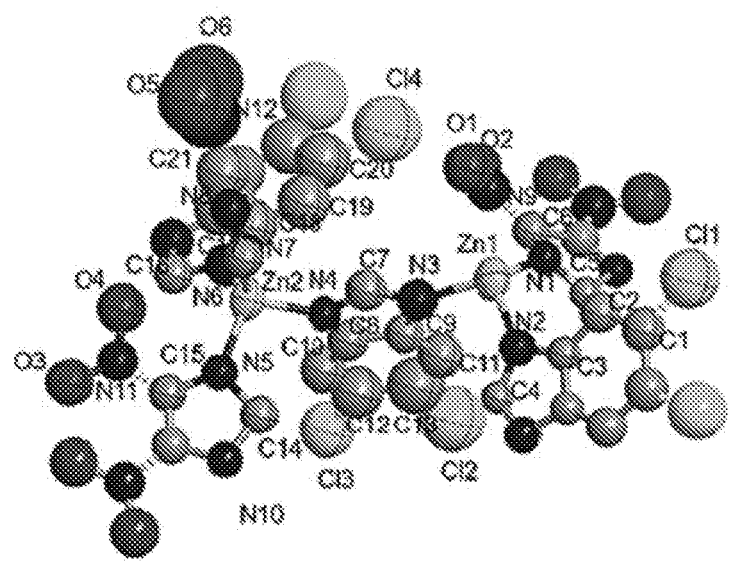
Figure 16C:
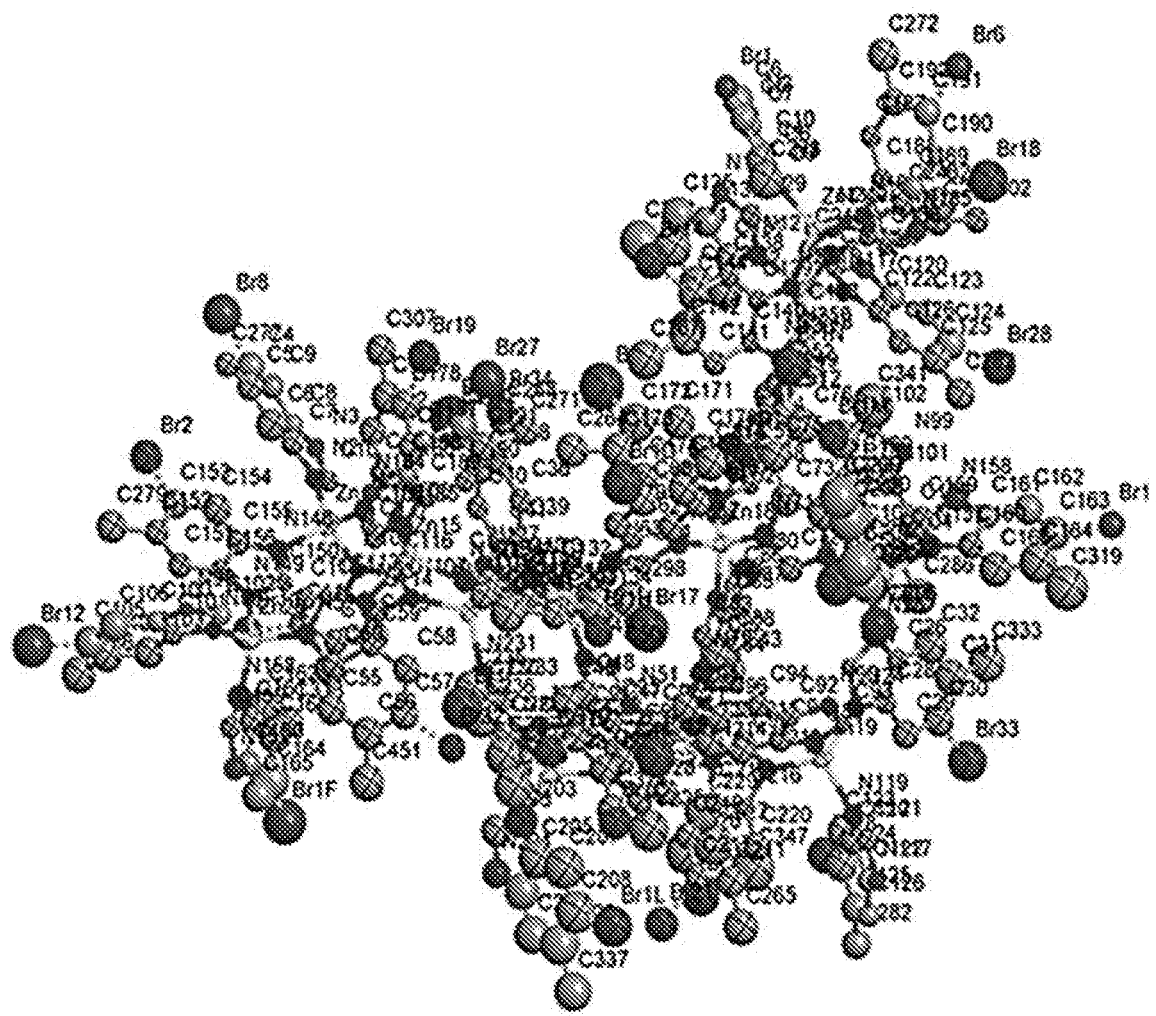
Figure 17:
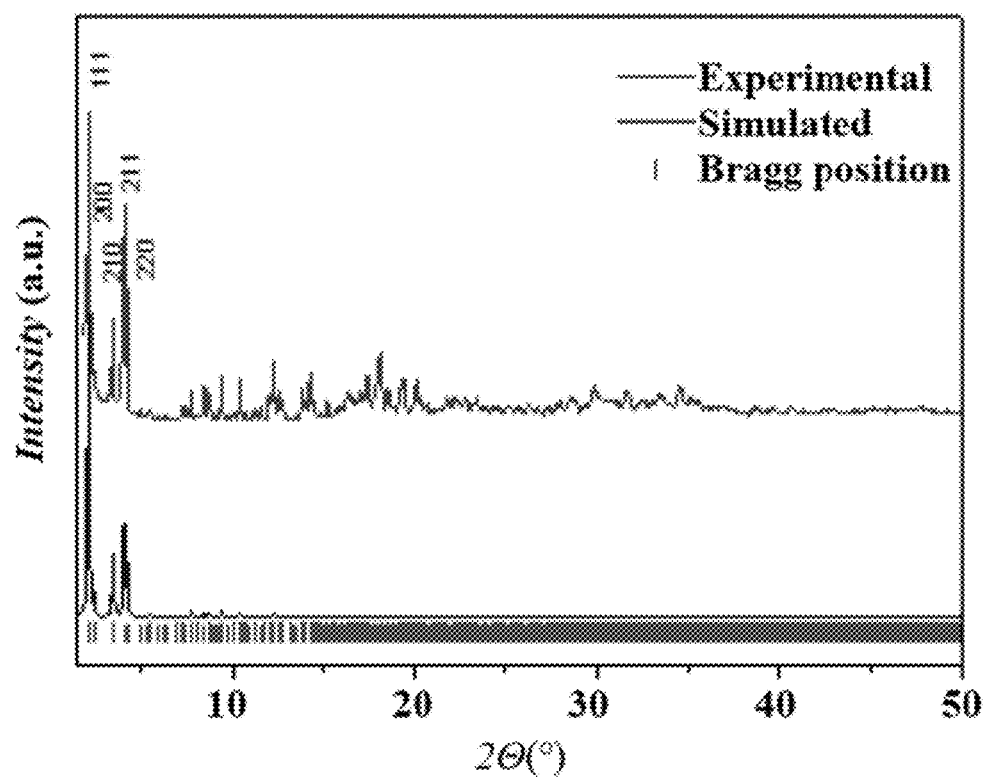
FIG. 17 provides a comparison of the experimental powder x-ray diffraction (PXRD) patterns of ZIF-412: activated (top) and simulated pattern (bottom) from single crystal X-ray data.
Figure 18:
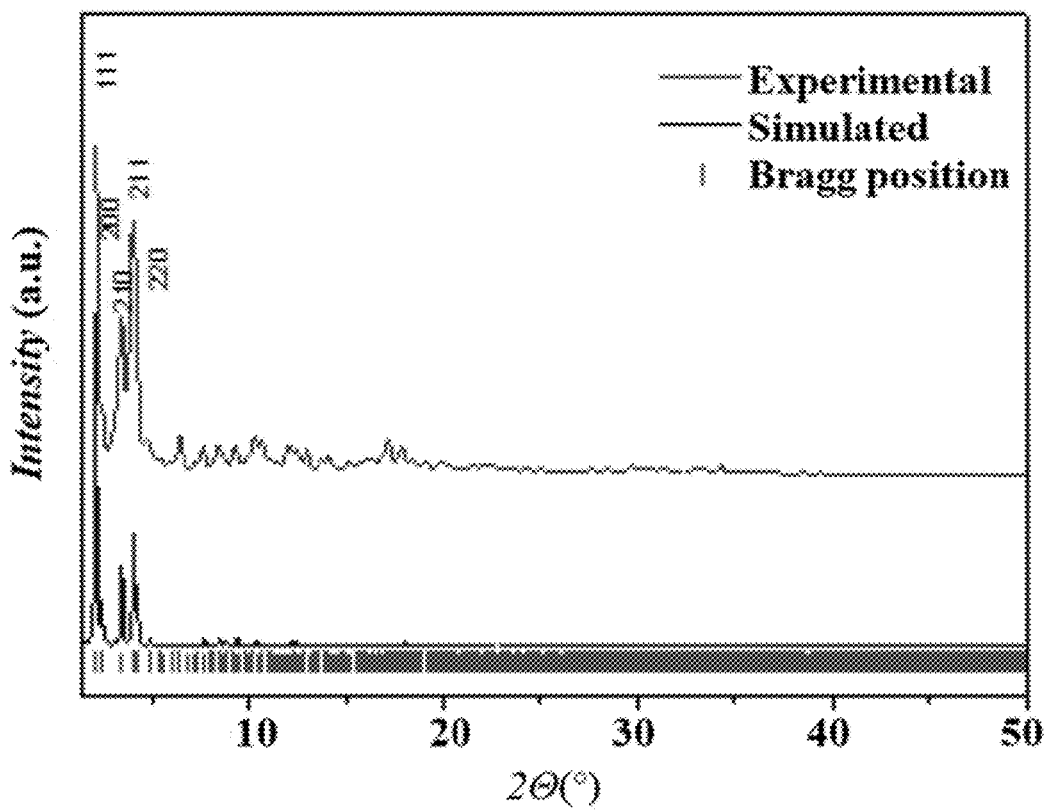
FIG. 18 provides a comparison of the experimental PXRD patterns of ZIF-413: activated (top) and simulated pattern (bottom) from single crystal X-ray data.
Figure 19:
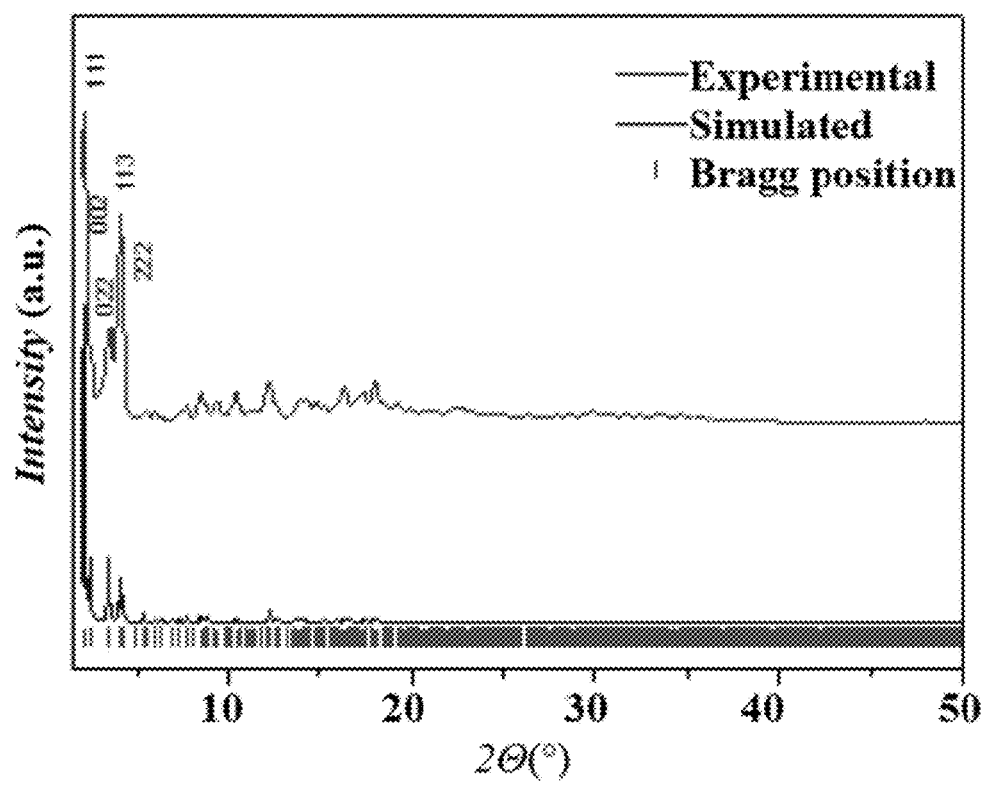
FIG. 19 provides a comparison of the experimental PXRD patterns of ZIF-414: activated (top) and simulated pattern (bottom) from single crystal X-ray data.
Figure 20:
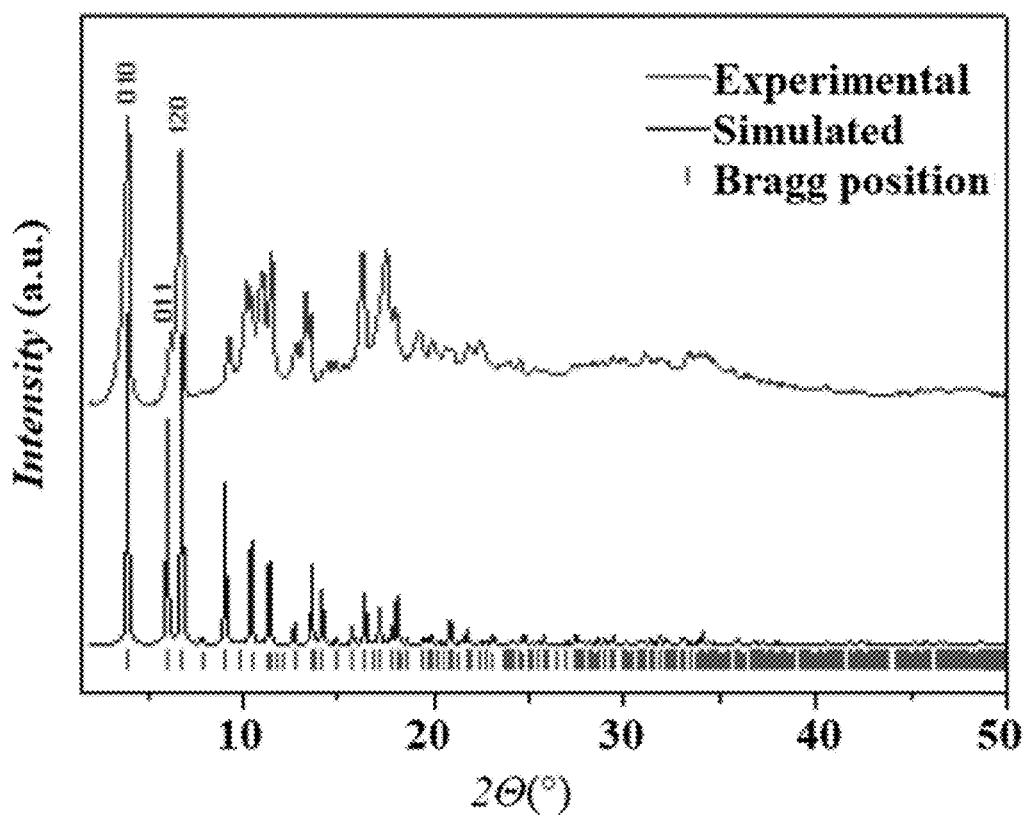
FIG. 20 provides a comparison of the experimental PXRD patterns of ZIF-418: activated (top) and simulated pattern (bottom) from single crystal X-ray data.
Figure 21:
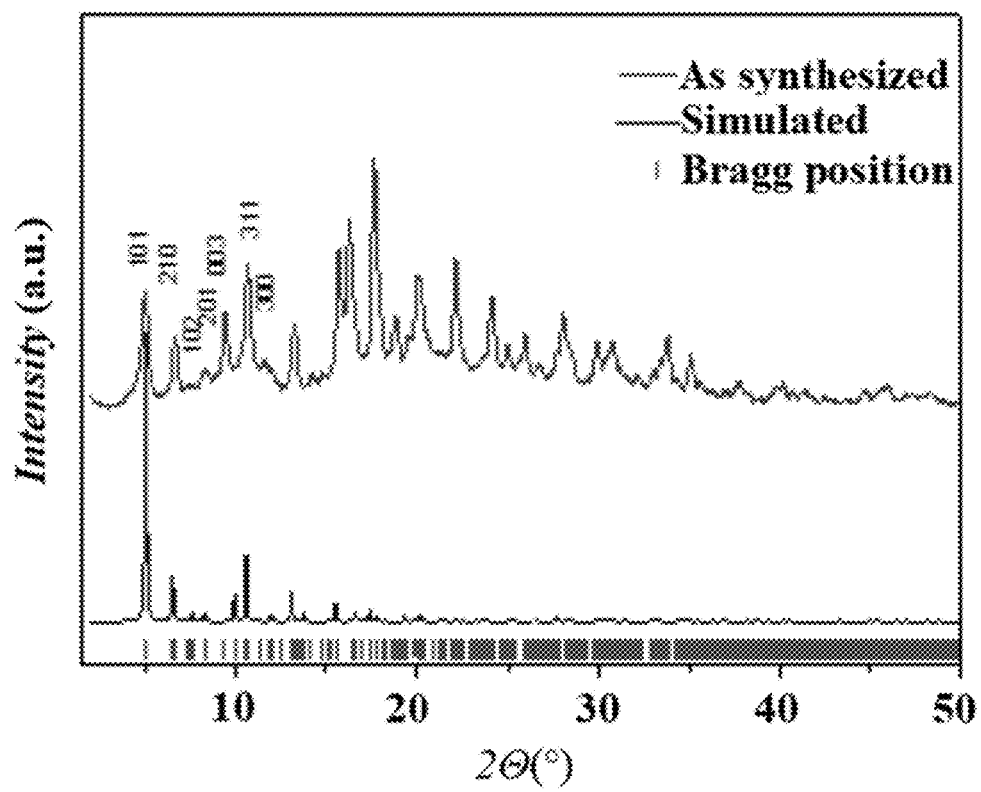
FIG. 21 provides a comparison of the experimental PXRD patterns of ZIF-585: as-synthesized (top) and simulated pattern (bottom) from single crystal X-ray data.
Figure 22:
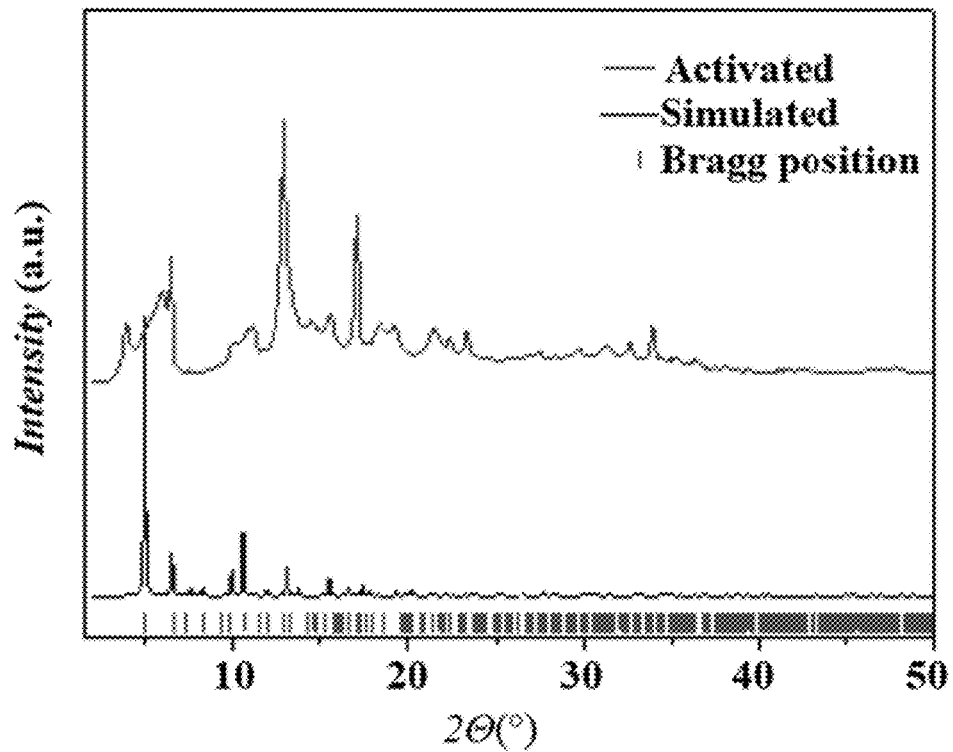
FIG. 22 provides a comparison of the experimental PXRD patterns of ZIF-585: activated (top) and simulated pattern (bottom) from single crystal X-ray data. The original pattern changed to an unknown phase after activation.
Figure 23:
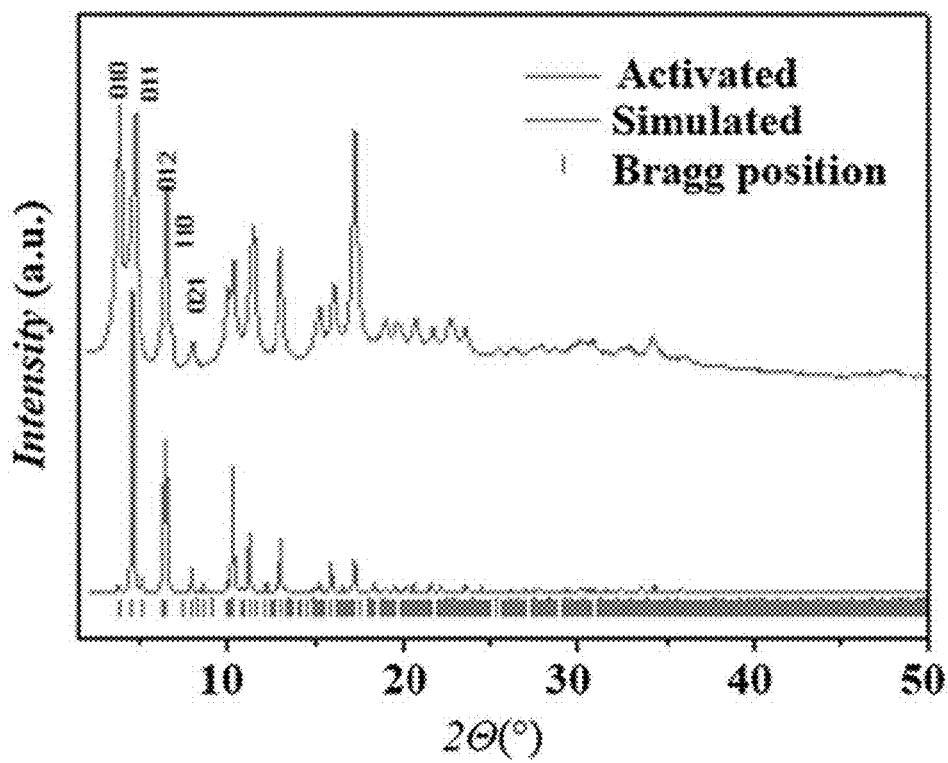
FIG. 23 provides a comparison of the experimental PXRD patterns of ZIF-636: activated (top) and simulated pattern (bottom) from single crystal X-ray data.
Figure 24:
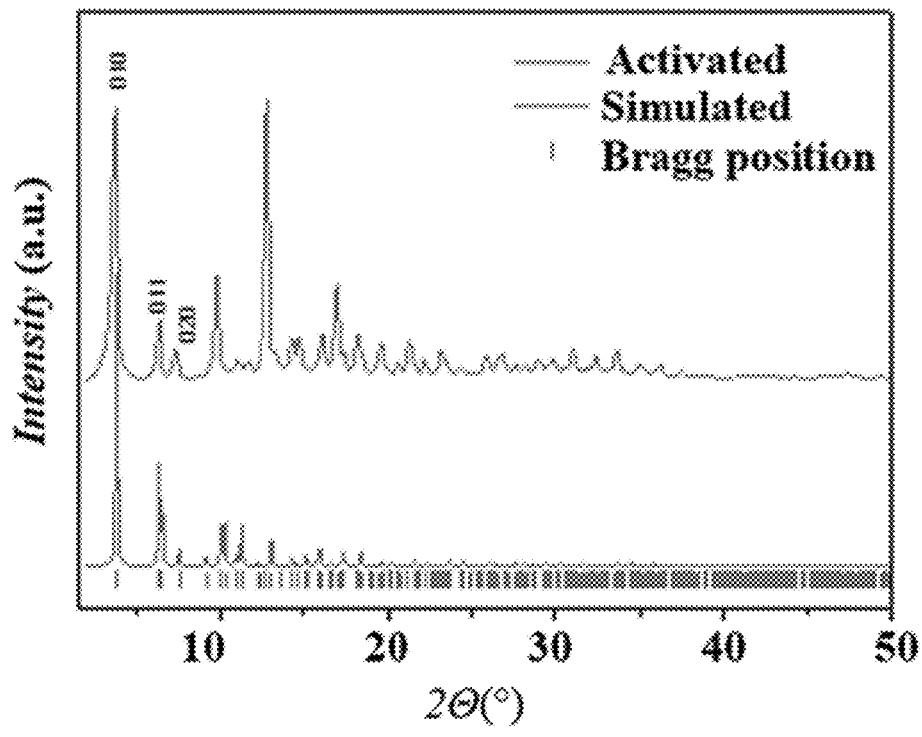
FIG. 24 provides a comparison of the experimental PXRD patterns of ZIF-640: activated (top) and simulated pattern (bottom) from single crystal X-ray data.
Figure 25:
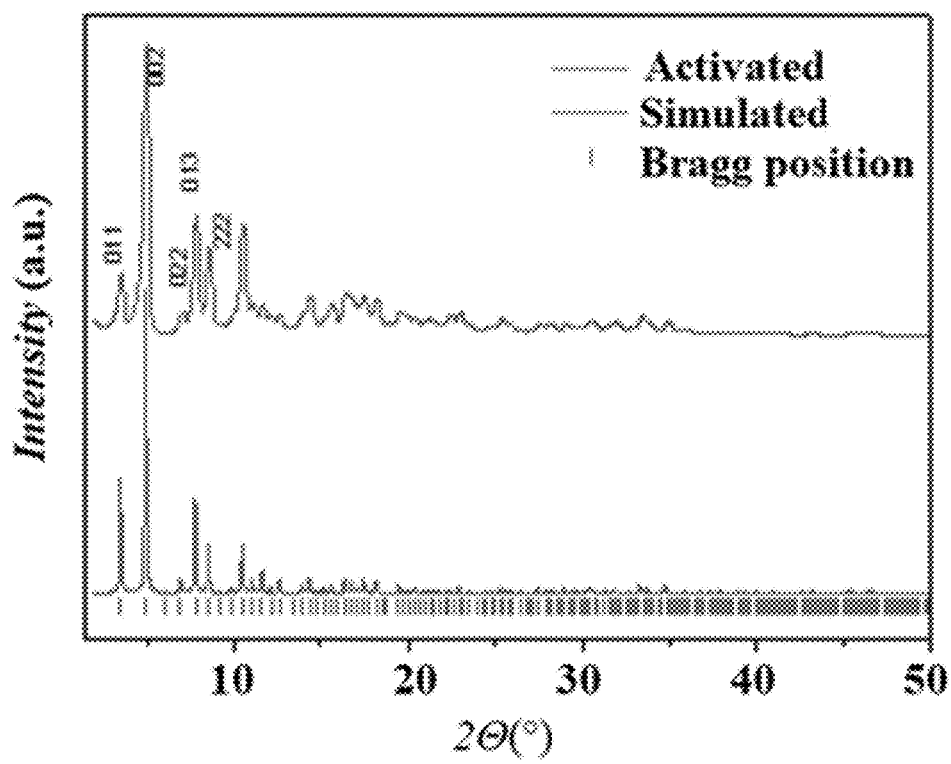
FIG. 25 provides a comparison of the experimental PXRD patterns of ZIF-725: activated (top) and simulated pattern (bottom) from single crystal X-ray data.
Figure 26:
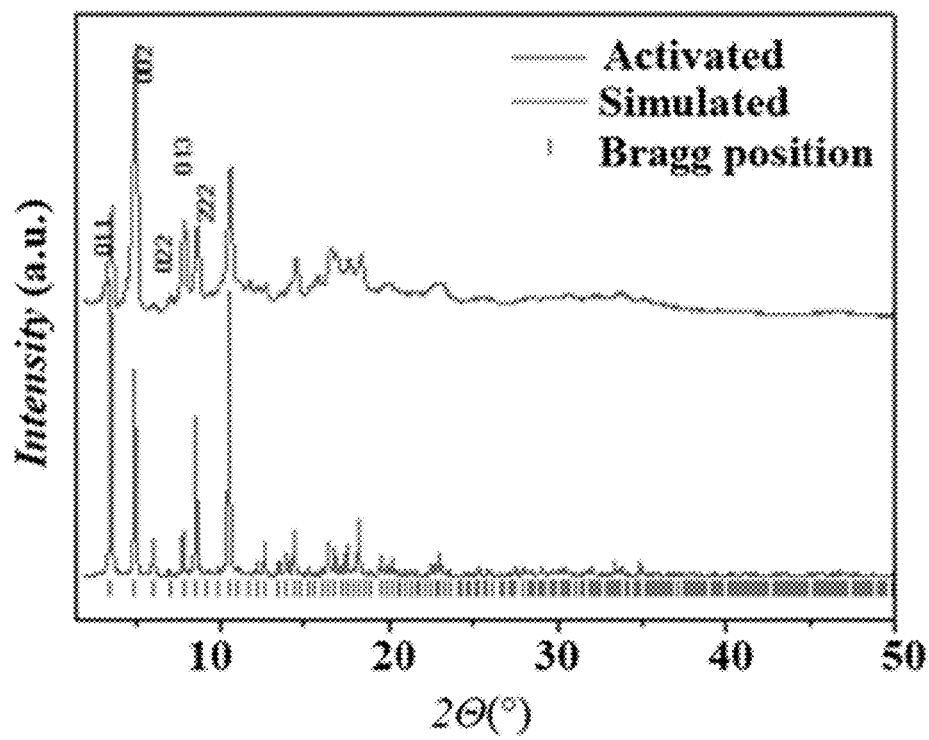
FIG. 26 provides a comparison of the experimental PXRD patterns of ZIF-726: activated (top) and simulated pattern (bottom) from single crystal X-ray data.
Figure 27:
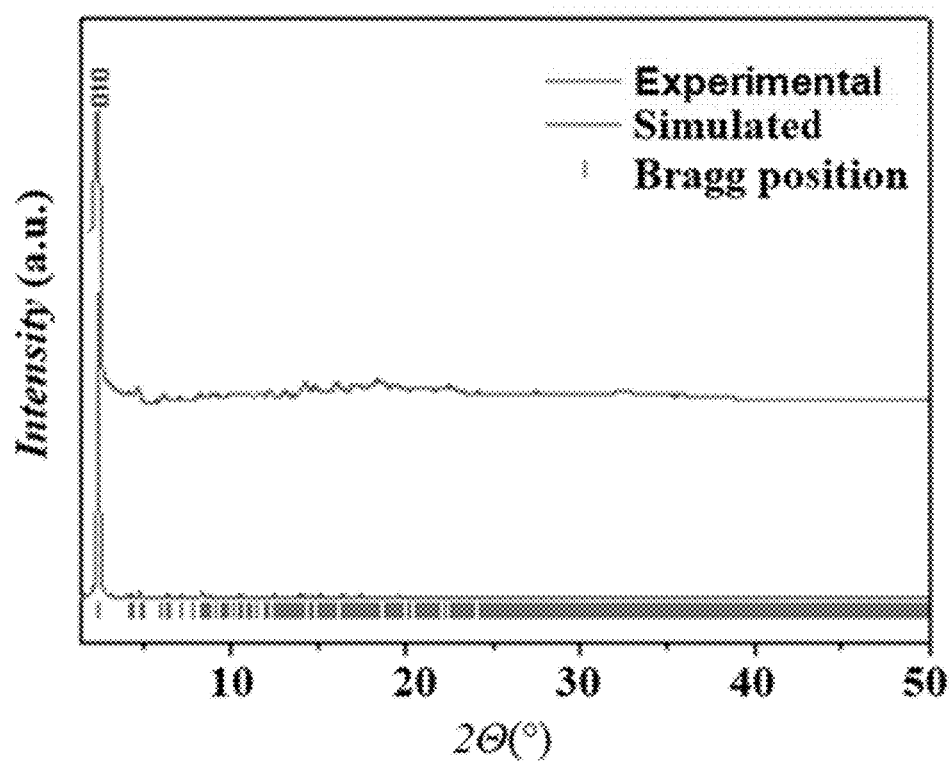
FIG. 27 provides a comparison of the experimental PXRD patterns of ZIF-740: activated (top) and simulated pattern (bottom) from single crystal X-ray data.
Figure 28:
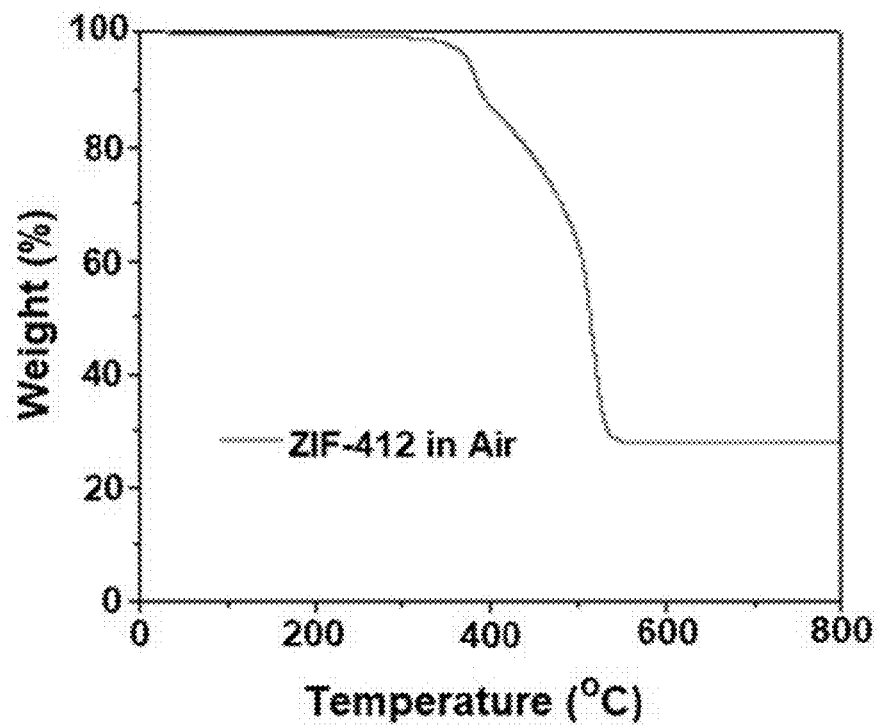
FIG. 28 presents a thermogravimetric analysis (TGA) trace for the activated sample of ZIF-412.
Figure 29:
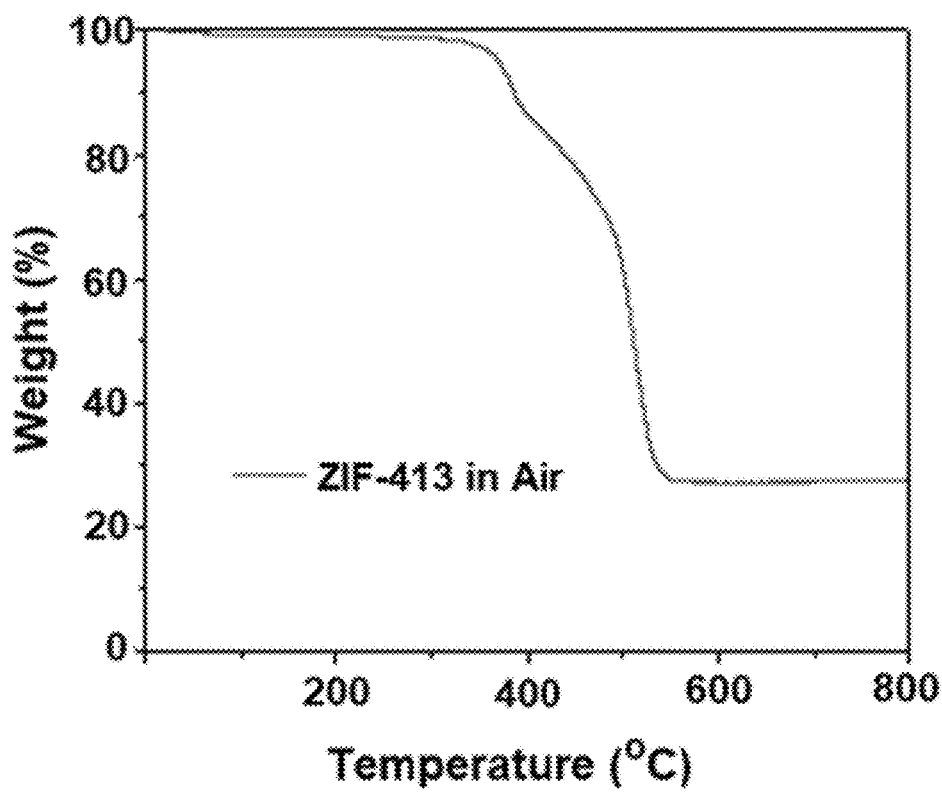
FIG. 29 presents a TGA trace for the activated sample of ZIF-413.
Figure 30:
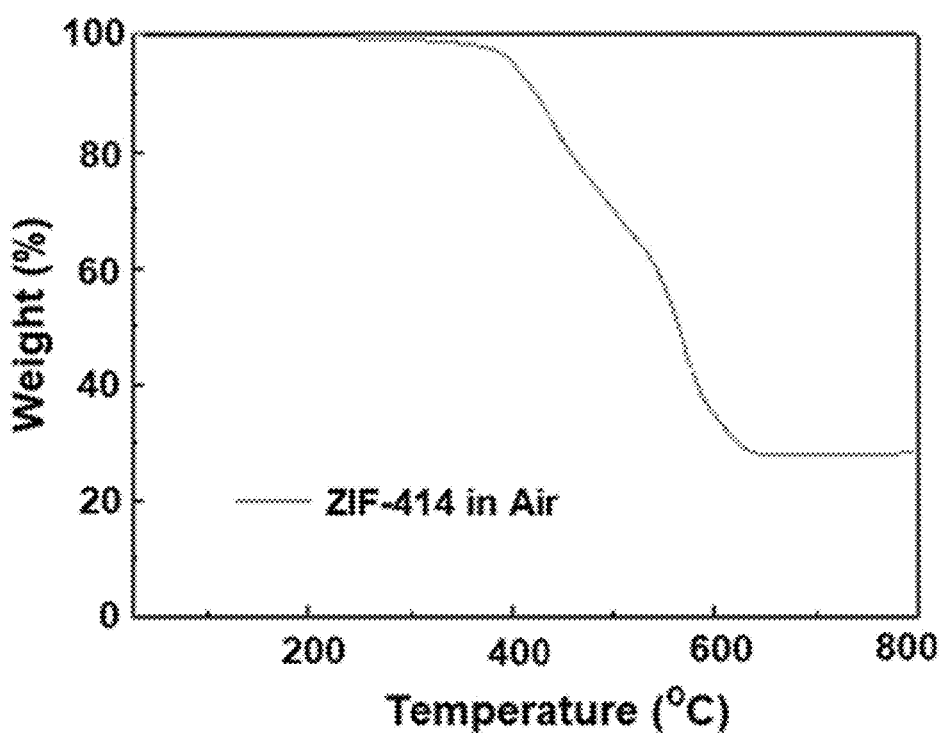
FIG. 30 presents a TGA trace for the activated sample of ZIF-414.
Figure 31:
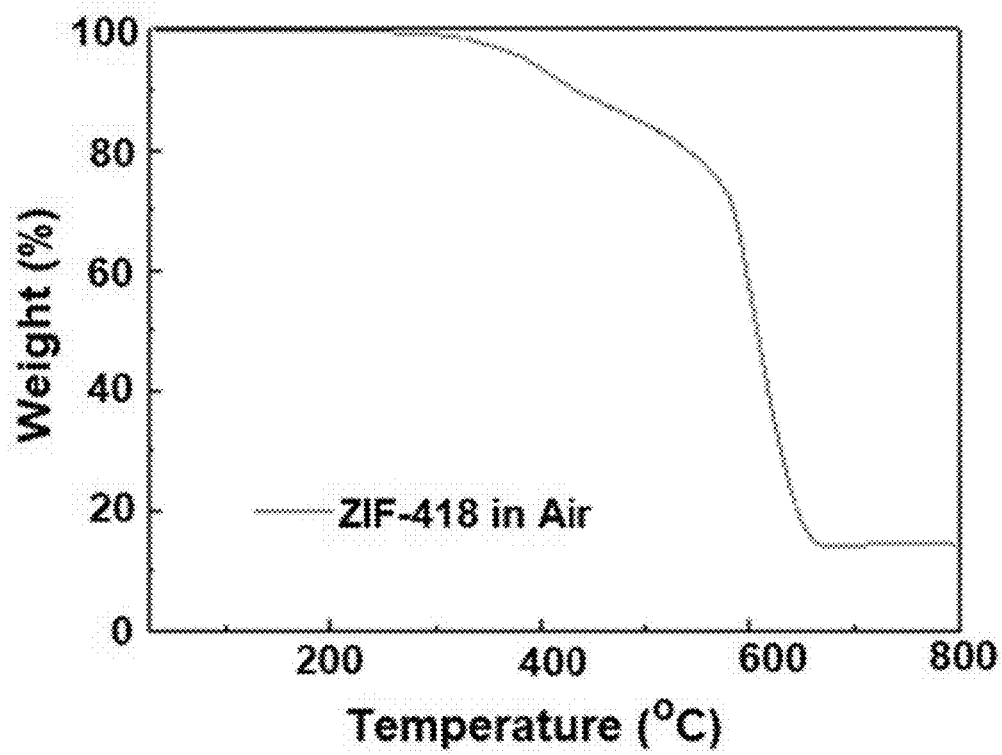
FIG. 31 presents a TGA trace for the activated sample of ZIF-418.
Figure 32:
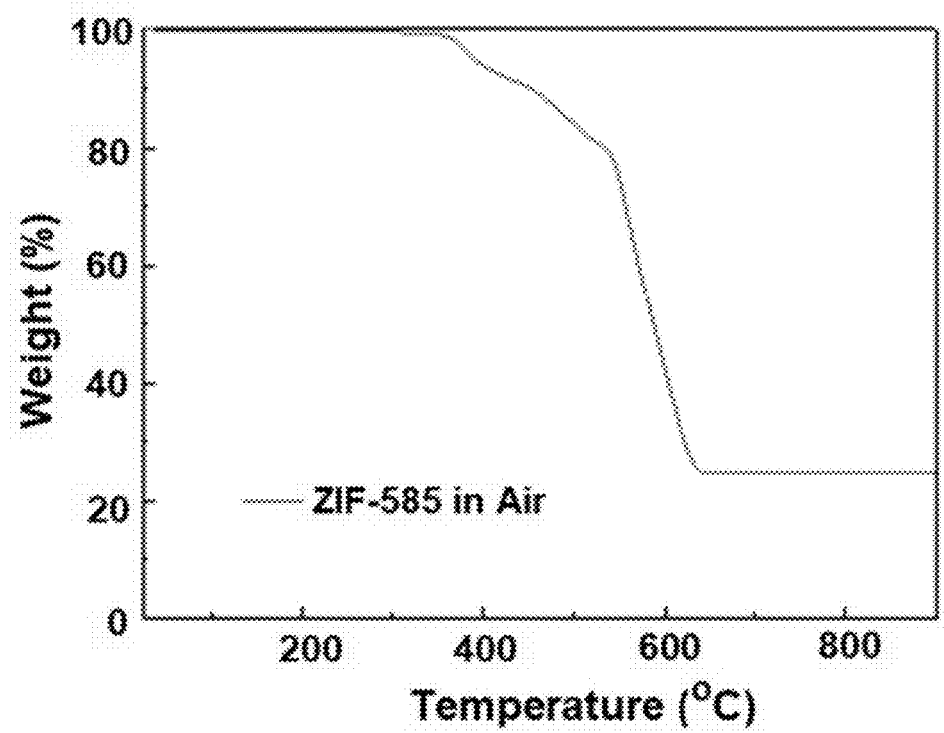
FIG. 32 presents a TGA trace for the activated sample of ZIF-585.
Figure 33:
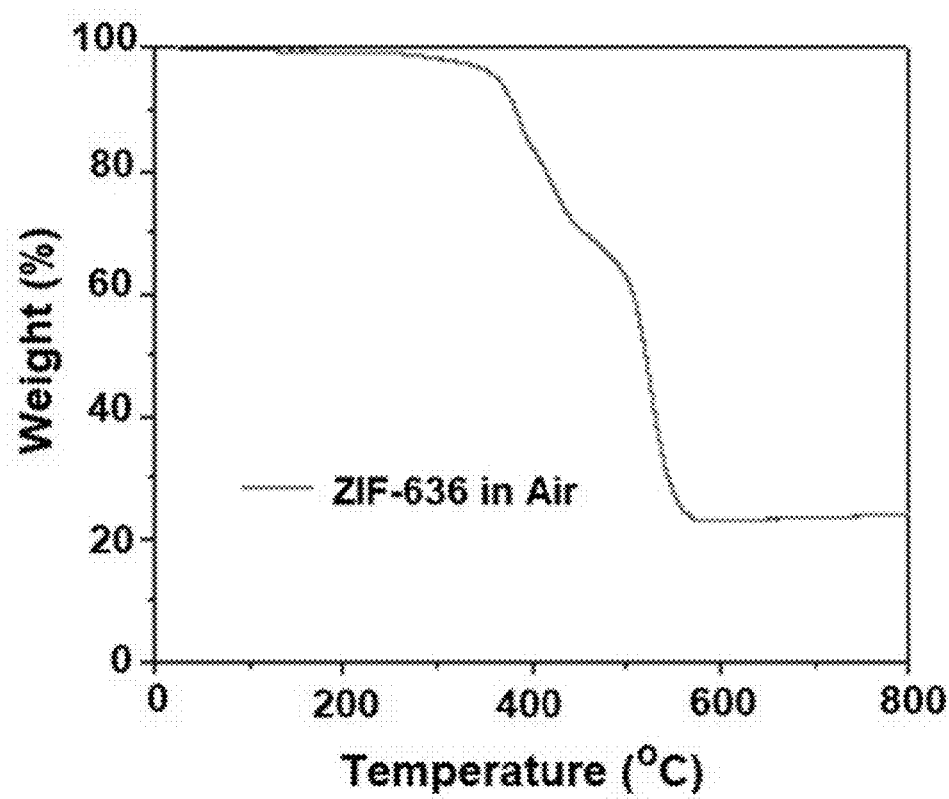
FIG. 33 presents a TGA trace for the activated sample of ZIF-636.
Figure 34:
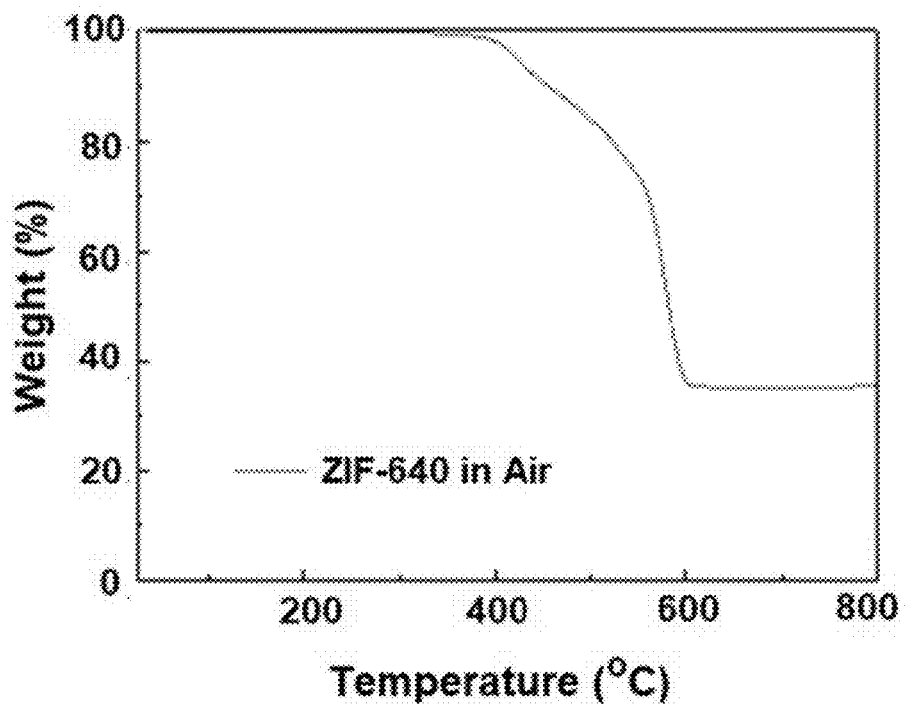
FIG. 34 presents a TGA trace for the activated sample of ZIF-640.
Figure 35:
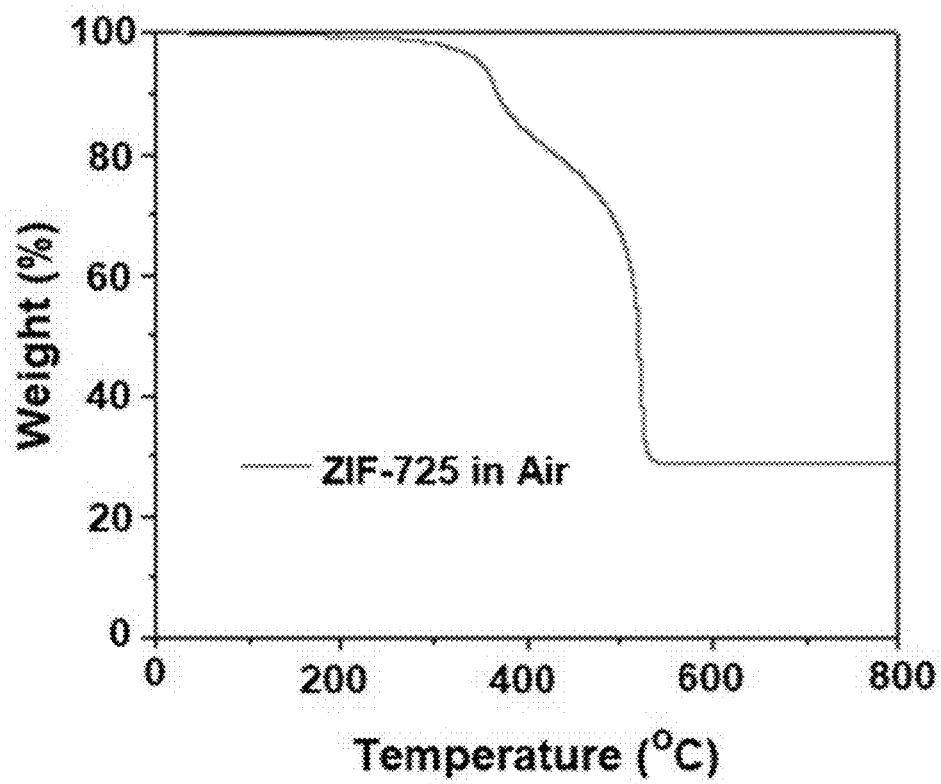
FIG. 35 presents a TGA trace for the activated sample of ZIF-725.
Figure 36:
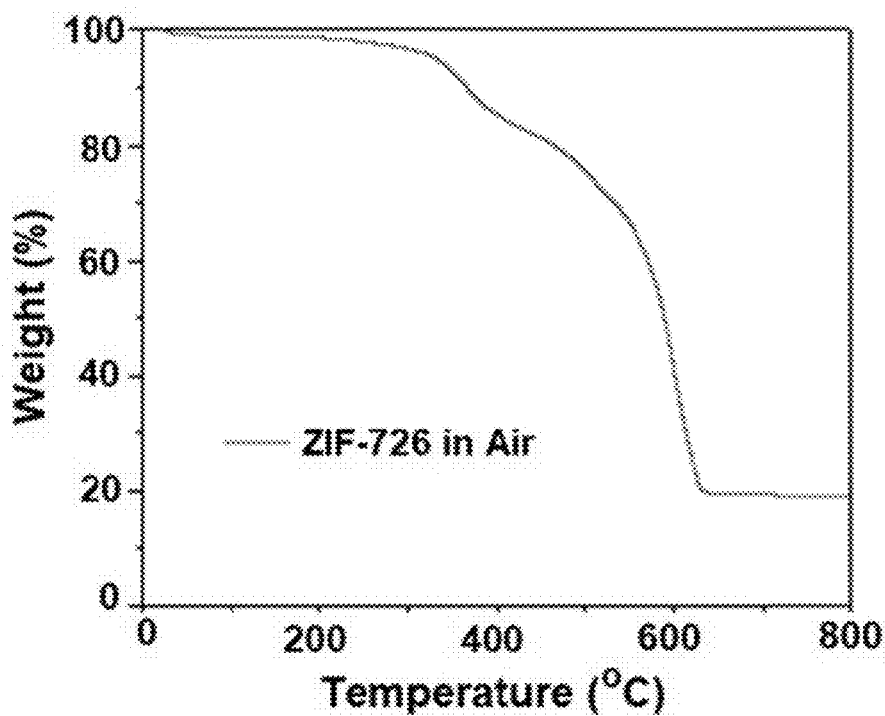
FIG. 36 presents a TGA trace for the activated sample of ZIF-726.
Figure 37:
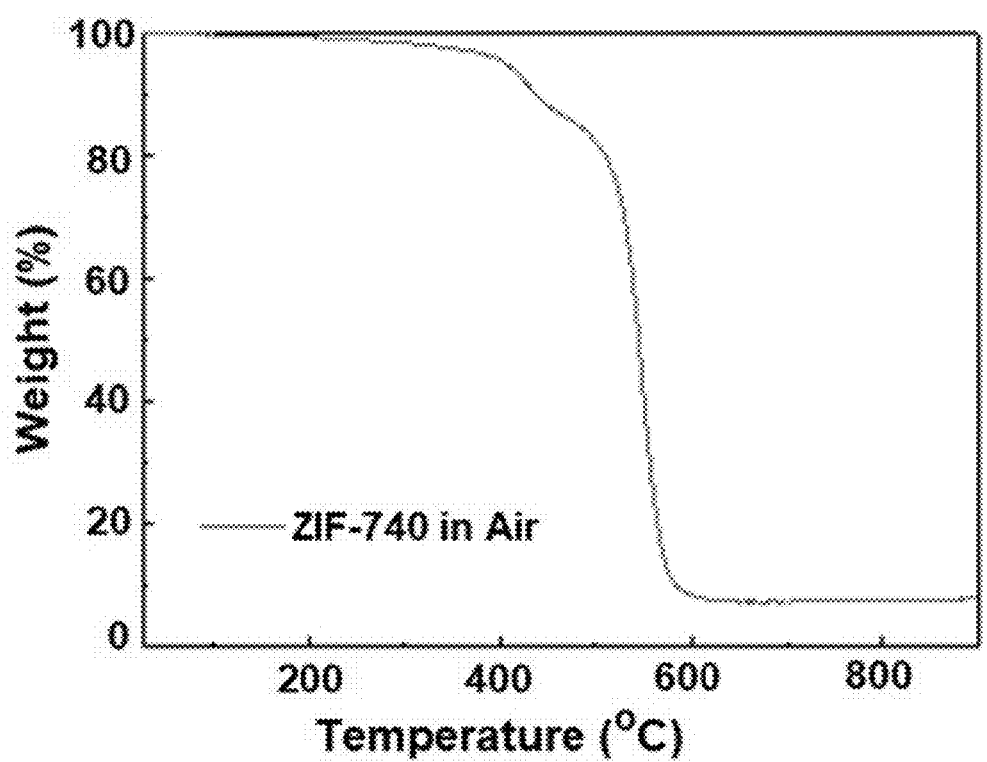
FIG. 37 presents a TGA trace for the activated sample of ZIF-740.
Figure 38:
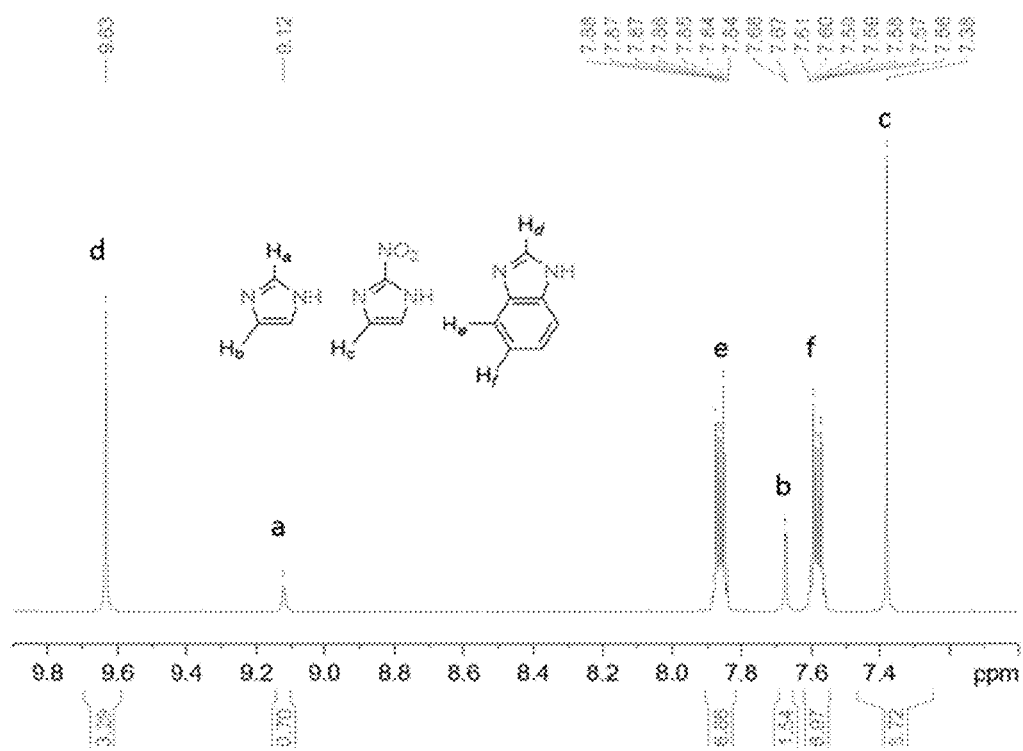
FIG. 38 presents a $^1$H-NMR spectrum of the digested solution of ZIF-412.
Figure 39:
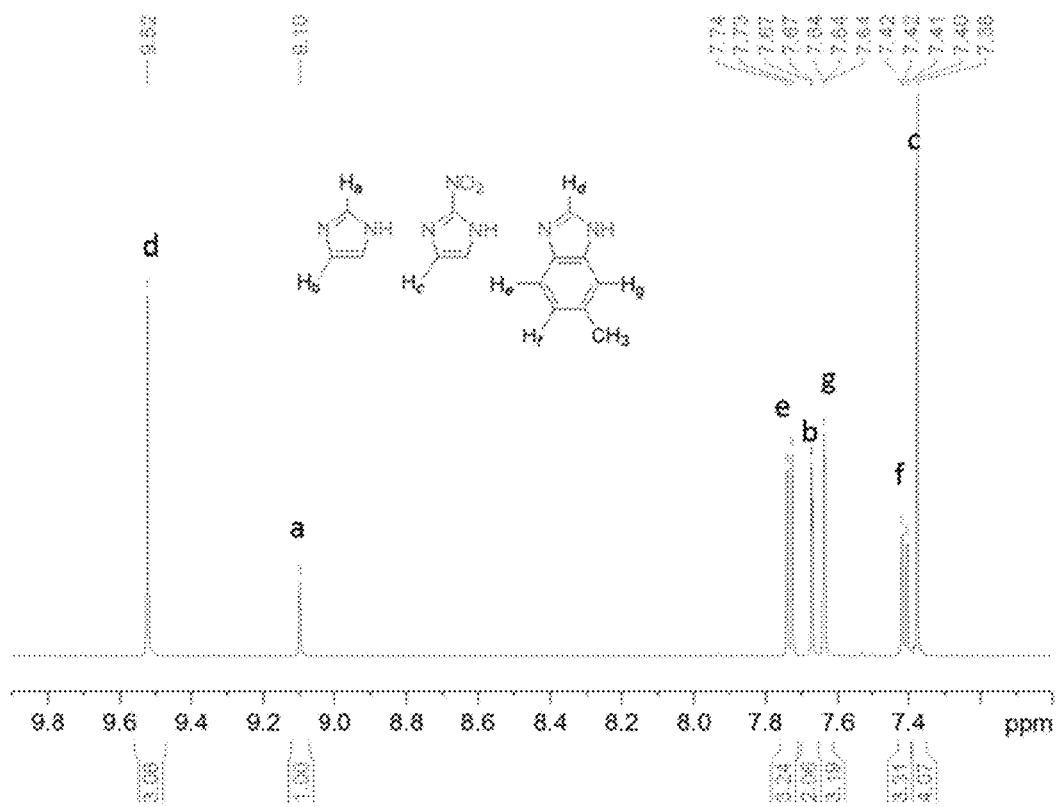
FIG. 39 presents a $^1$H-NMR spectrum of the digested solution of ZIF-413.
Figure 40:
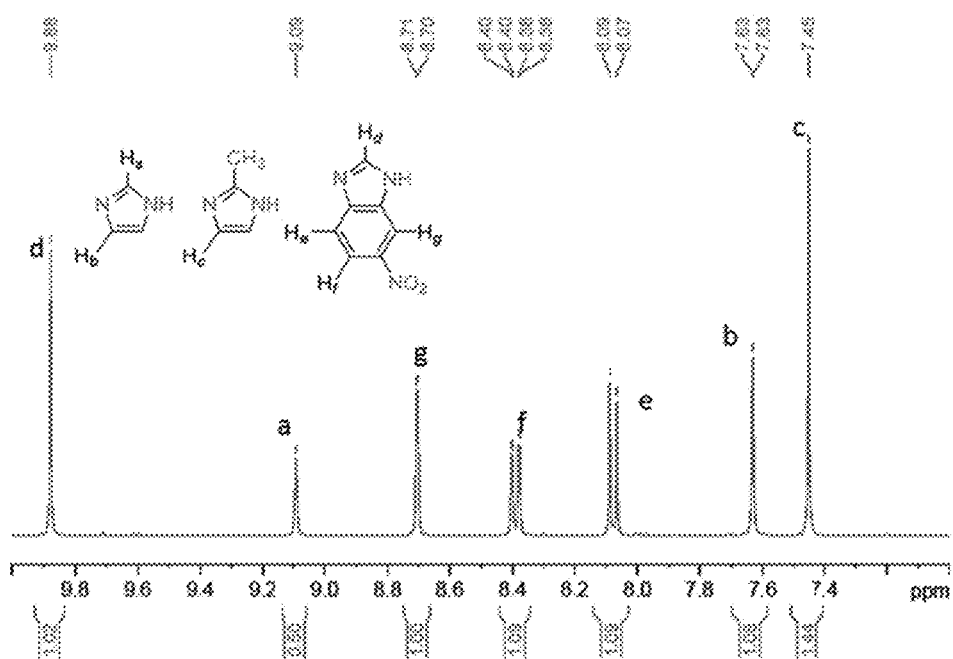
FIG. 40 presents a $^1$H-NMR spectrum of the digested solution of ZIF-414.
Figure 41:
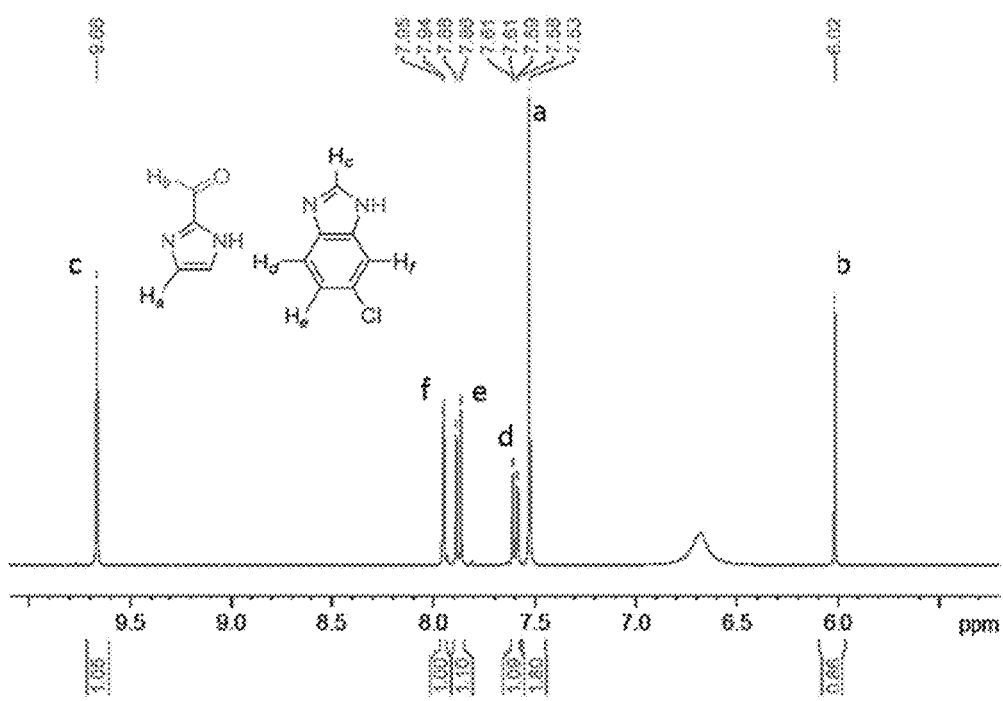
FIG. 41 presents a $^1$H-NMR spectrum of the digested solution of ZIF-418.
Figure 42:
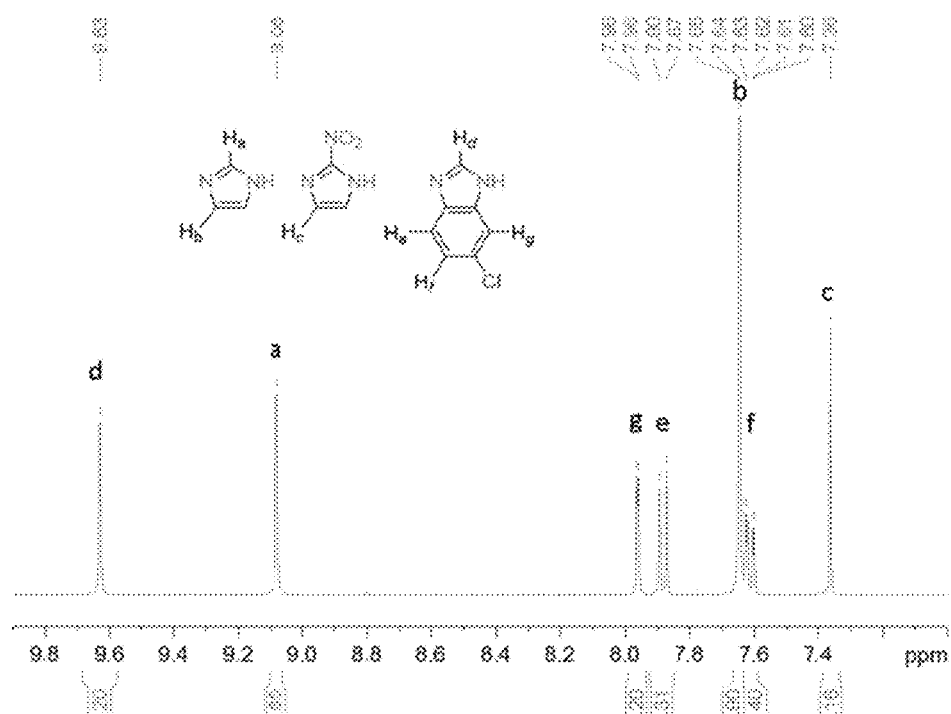
FIG. 42 presents a $^1$H-NMR spectrum of the digested solution of ZIF-585.
Figure 43:
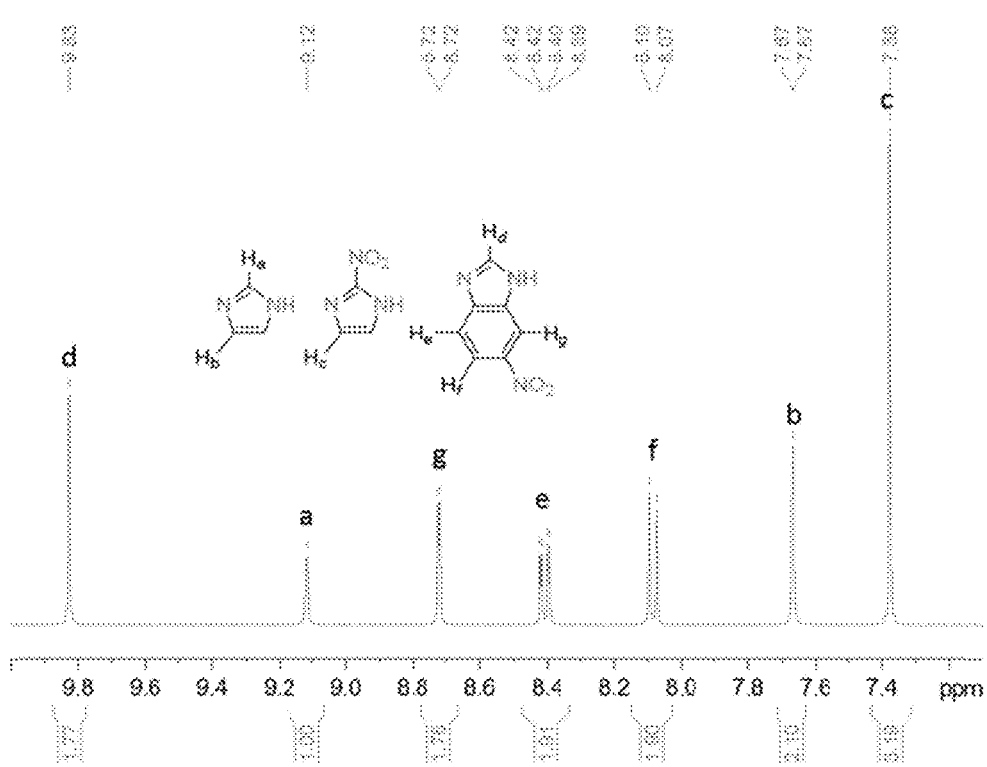
FIG. 43 presents a $^1$H-NMR spectrum of the digested solution of ZIF-636.
Figure 44:
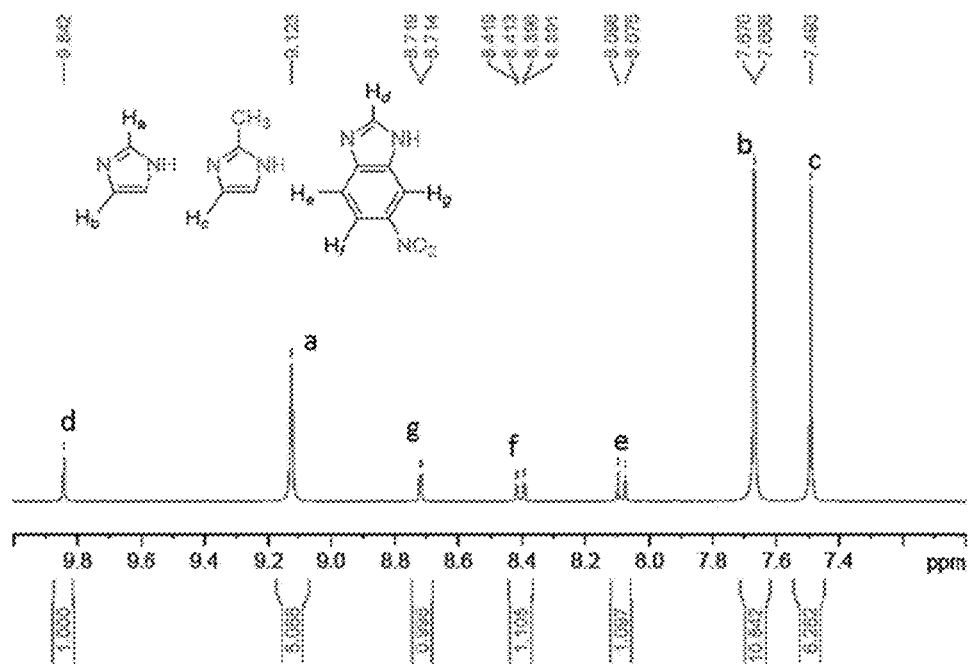
FIG. 44 presents a $^1$H-NMR spectrum of the digested solution of ZIF-640.
Figure 45:
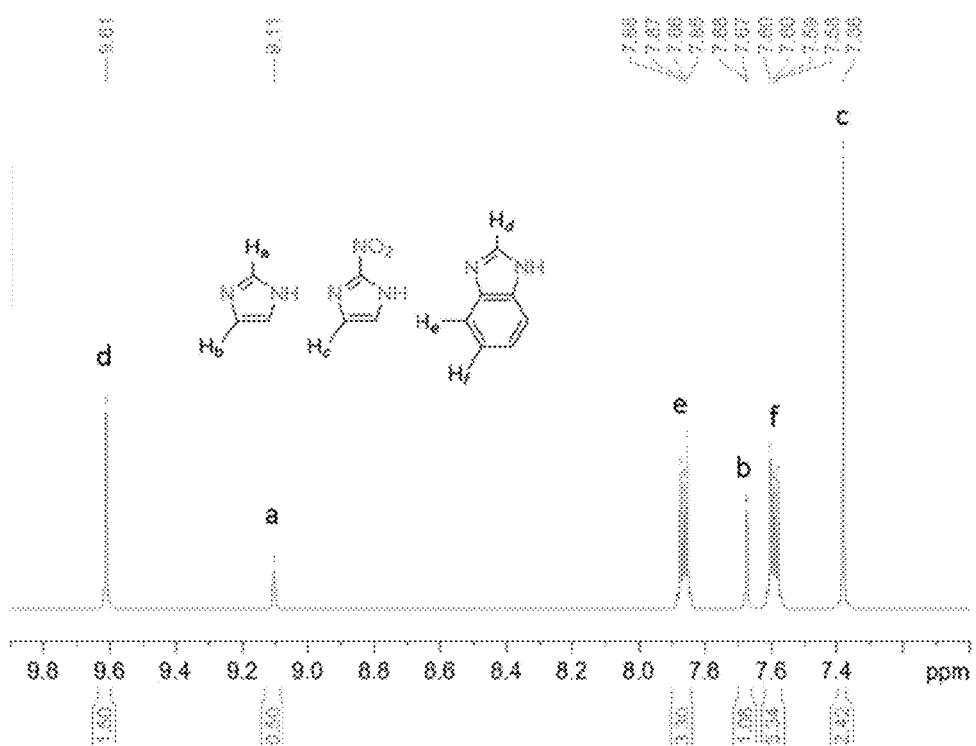
FIG. 45 presents a $^1$H-NMR spectrum of the digested solution of ZIF-725.
Figure 46:
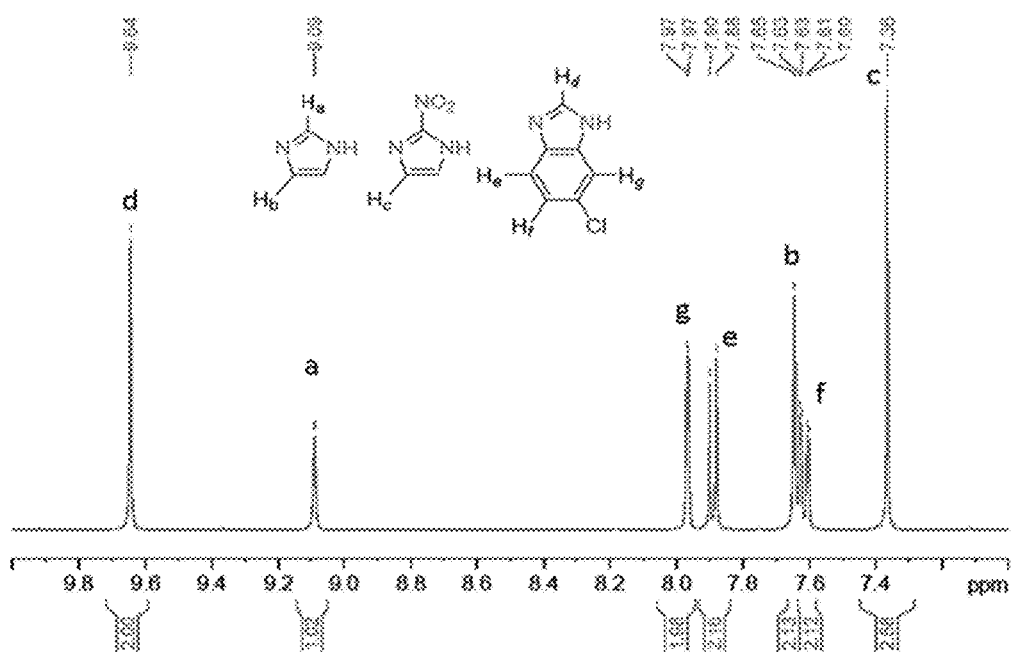
FIG. 46 presents a $^1$H-NMR spectrum of the digested solution of ZIF-726.
Figure 47:
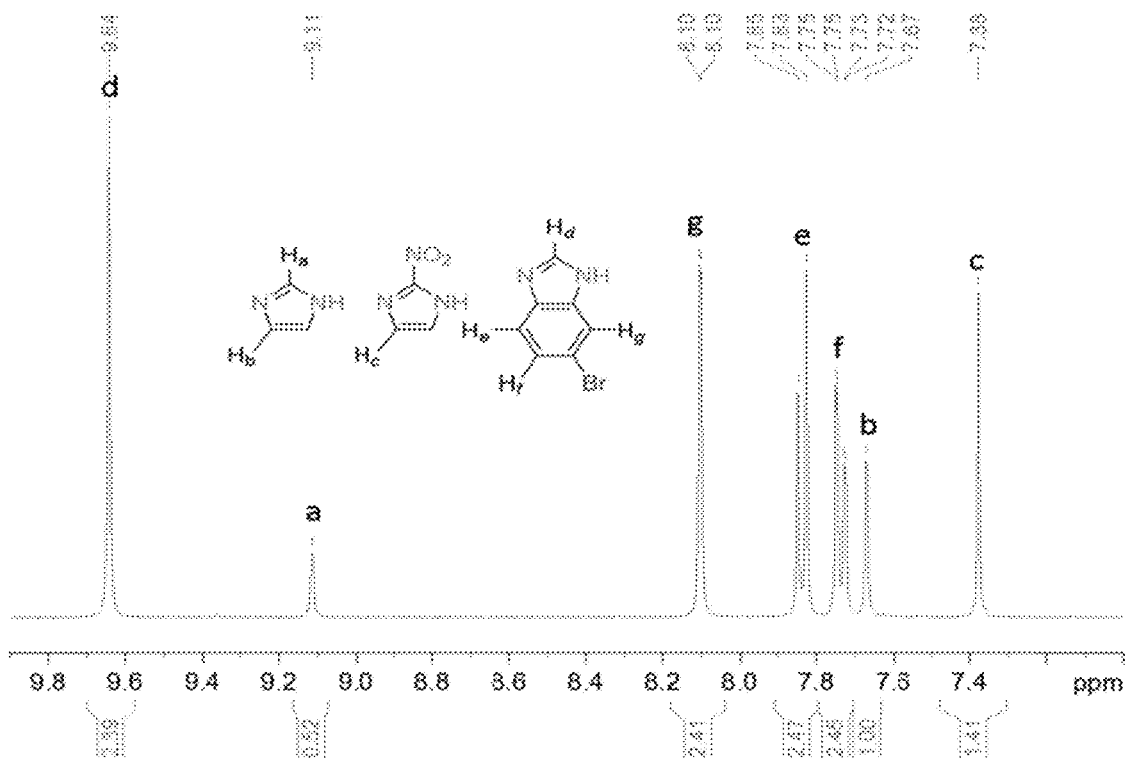
FIG. 47 presents a $^1$H-NMR spectrum of the digested solution of ZIF-740.
Figure 48:
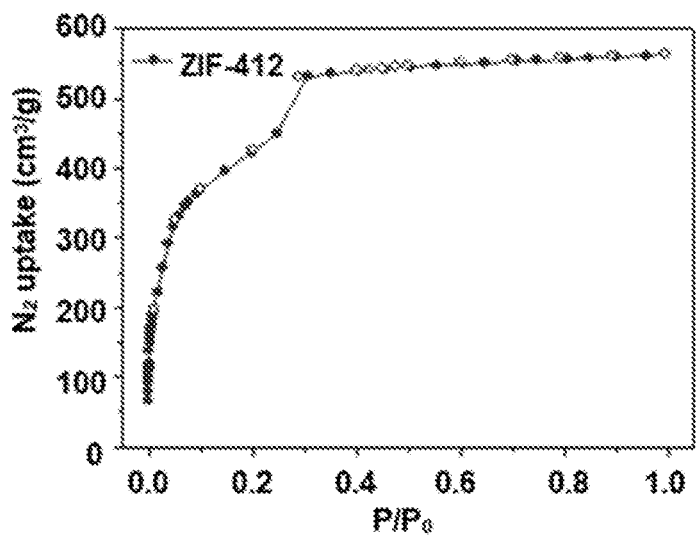
FIG. 48 displays a nitrogen adsorption isotherm of ZIF-412 at 77 K.
Figure 49:
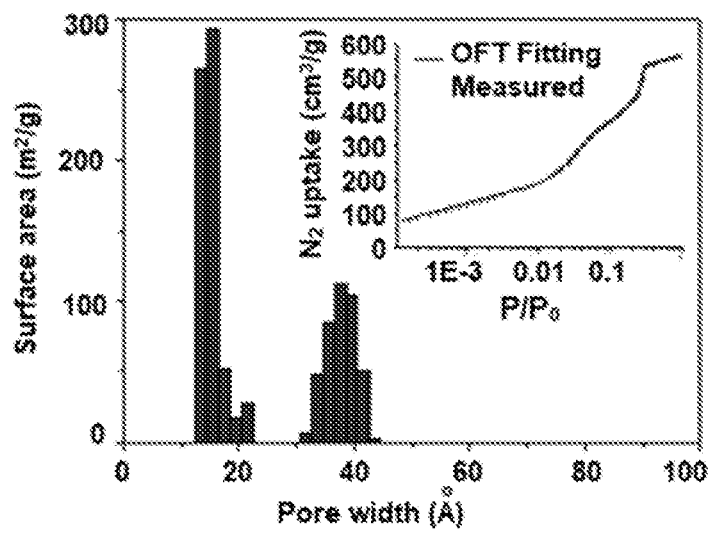
FIG. 49 provides a pore size distribution histogram of ZIF-412 calculated from DFT/Monte-Carlo fitting of the adsorption branch of the $N_2$ adsorption isotherm at 77 K (inset) with the fitting error of 0.505% using slit/cylinder/sphere pores QSDFT model.
Figure 50:
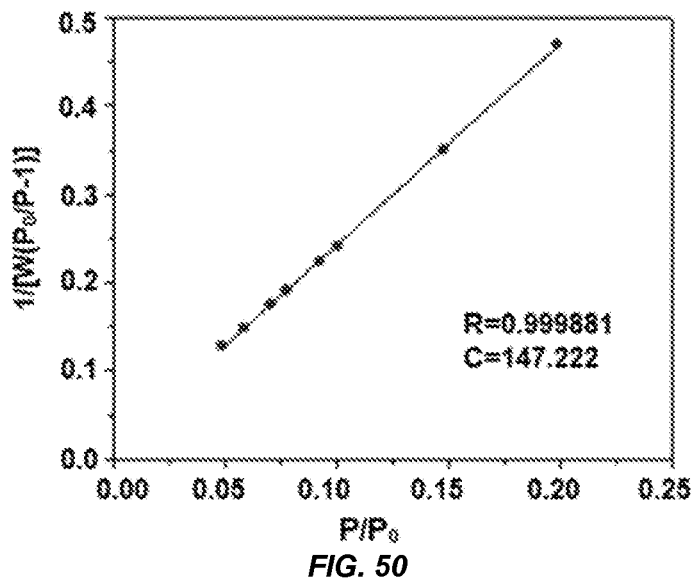
FIG. 50 displays a multiple point BET plot of ZIF-412 giving a specific surface area of 1520 $m^2/g$.
Figure 51:
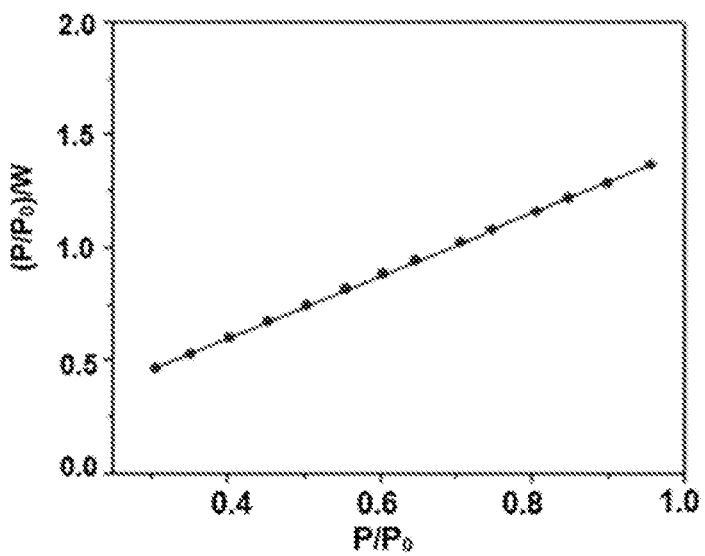
FIG. 51 provides a Langmuir plot of ZIF-412 giving a specific surface area of 2500 $m^2/g$.
Figure 52:
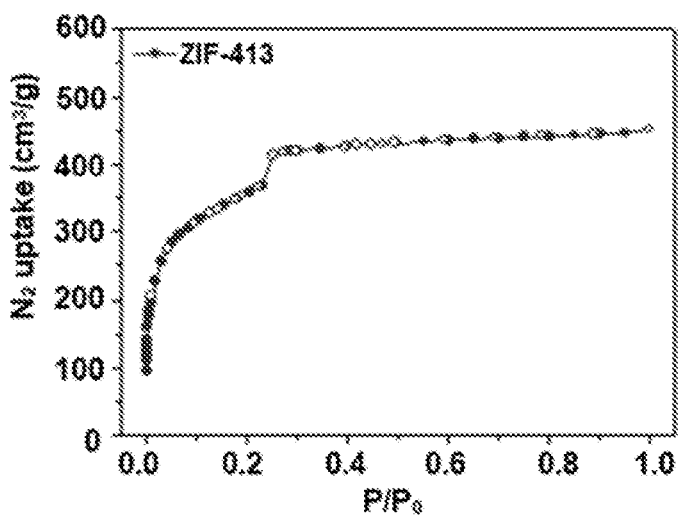
FIG. 52 presents a low-pressure nitrogen adsorption isotherm of ZIF-413 at 77 K.
Figure 53:
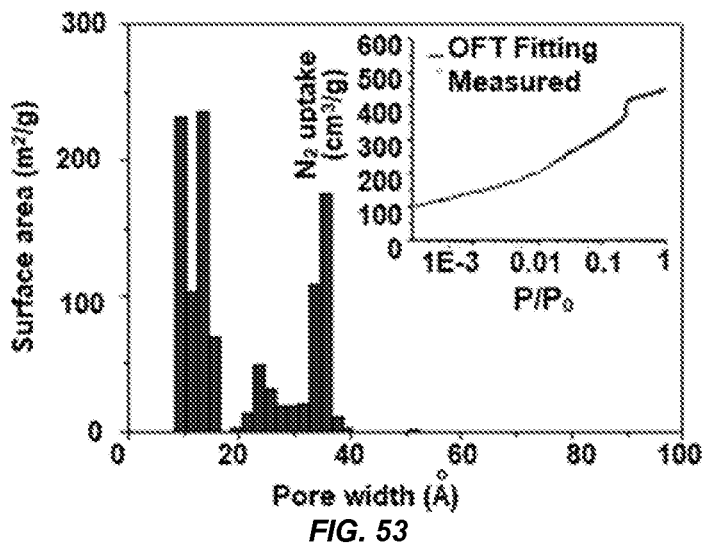
FIG. 53 provides a pore size distribution histogram of ZIF-413 calculated from DFT/Monte-Carlo fitting of the adsorption branch of the $N_2$ adsorption isotherm at 77 K (inset) with the fitting error of 0.259% using slit/cylinder/sphere pores QSDFT model.
Figure 54:
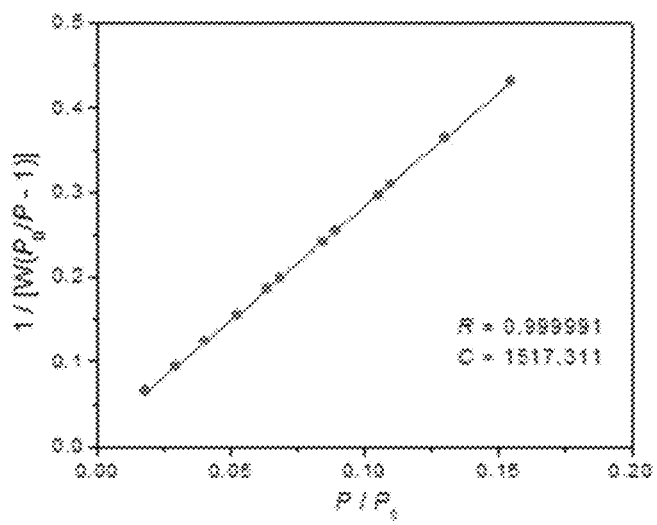
FIG. 54 displays a multiple point BET plot of ZIF-413 giving a specific surface area of 1290 $m^2/g$.
Figure 55:
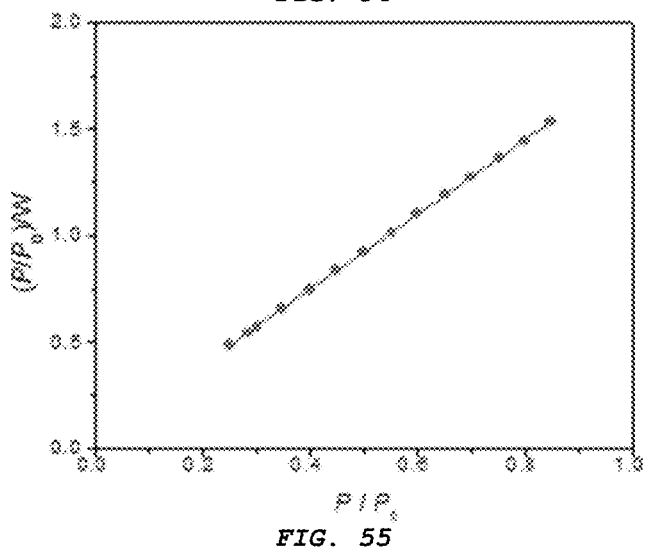
FIG. 55 provides a Langmuir plot of ZIF-413 giving a specific surface area of 1990 $m^2/g$.
Figure 56:
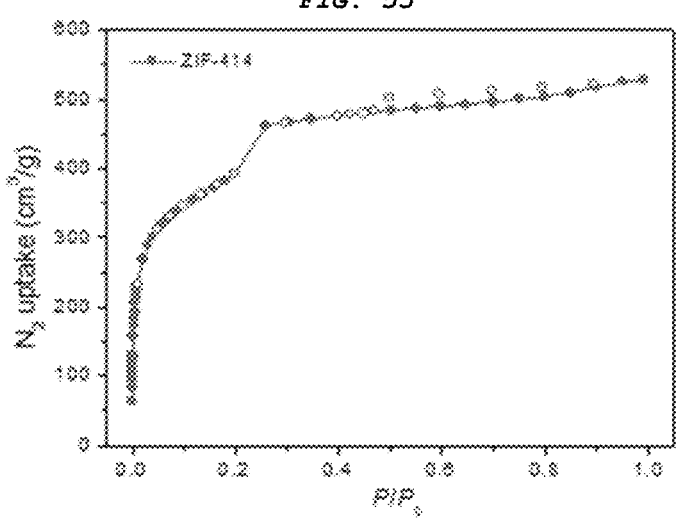
FIG. 56 presents a nitrogen adsorption isotherm of ZIF-414 at 77 K.
Figure 57:
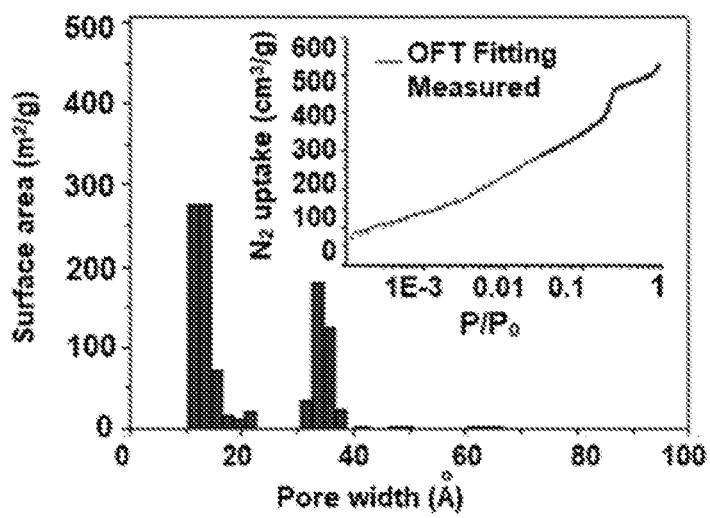
FIG. 57 shows a pore size distribution histogram of ZIF-414 calculated from DFT/Monte-Carlo fitting of the adsorption branch of the $N_2$ adsorption isotherm at 77 K (inset) with the fitting error of 0.415% using slit/cylinder/sphere pores QSDFT model.
Figure 58:
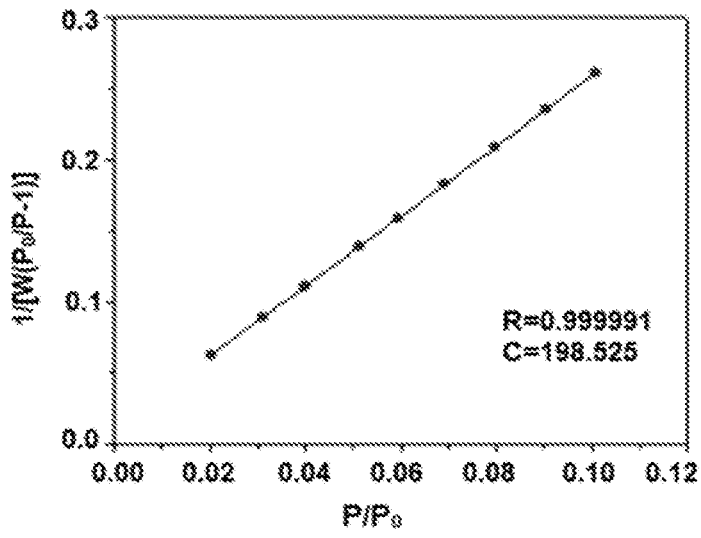
FIG. 58 displays a multiple point BET plot of ZIF-414 giving a specific surface area of 1440 $m^2/g$.
Figure 59:
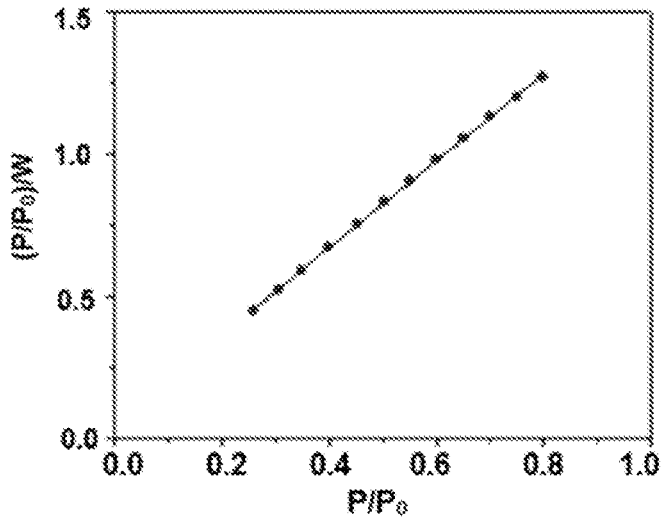
FIG. 59 provides a Langmuir plot of ZIF-414 giving a specific surface area of 2284 $m^2/g$.
Figure 60:
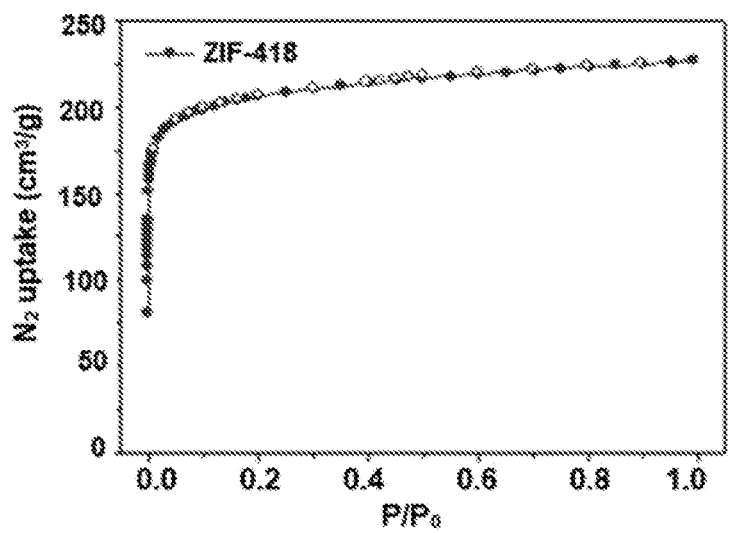
FIG. 60 presents a nitrogen adsorption isotherm of ZIF-418 at 77 K.
Figure 61:
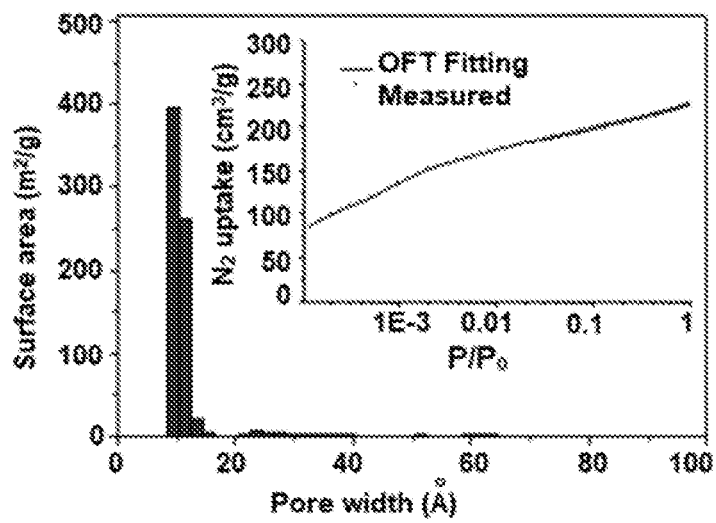
FIG. 61 provides a pore size distribution histogram of ZIF-418 calculated from DFT/Monte-Carlo fitting of the adsorption branch of the $N_2$ adsorption isotherm at 77 K (inset) with the fitting error of 0.023% using slit/cylinder/sphere pores QSDFT model.
Figure 62:
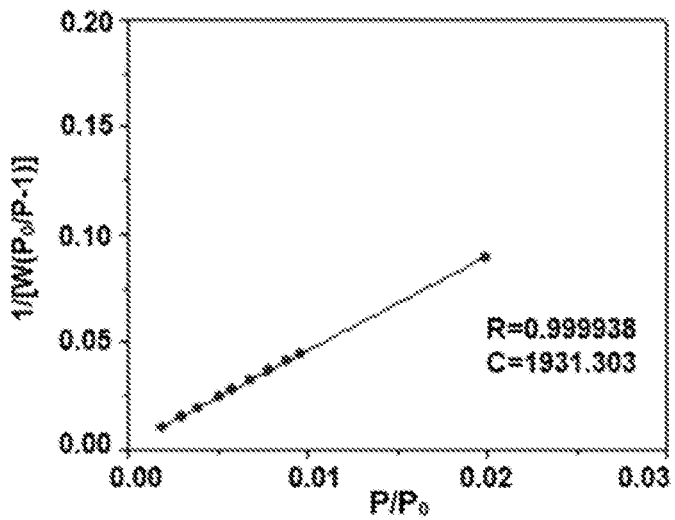
FIG. 62 displays a multiple point BET plot of ZIF-418 giving a specific surface area of 795 $m^2/g$.
Figure 63:
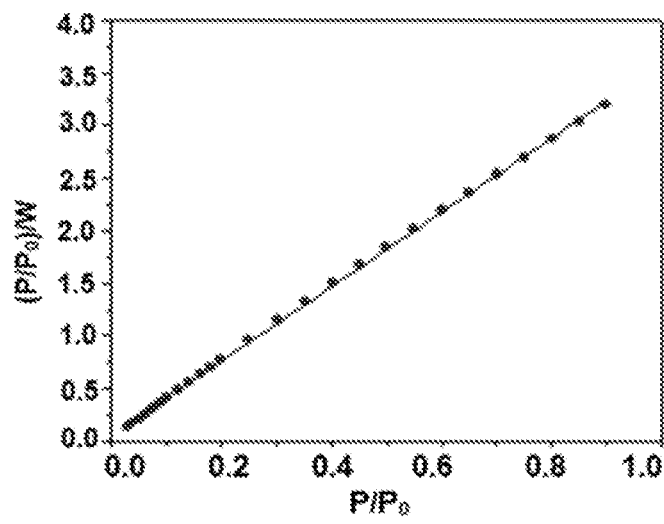
FIG. 63 provides a Langmuir plot of ZIF-418 giving a specific surface area of 985 $m^2/g$.
Figure 64:
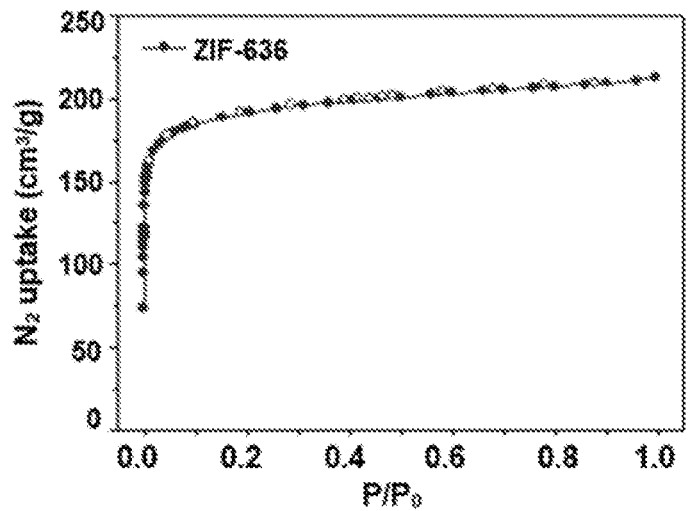
FIG. 64 presents a nitrogen adsorption isotherm of ZIF-636 at 77 K.
Figure 65:
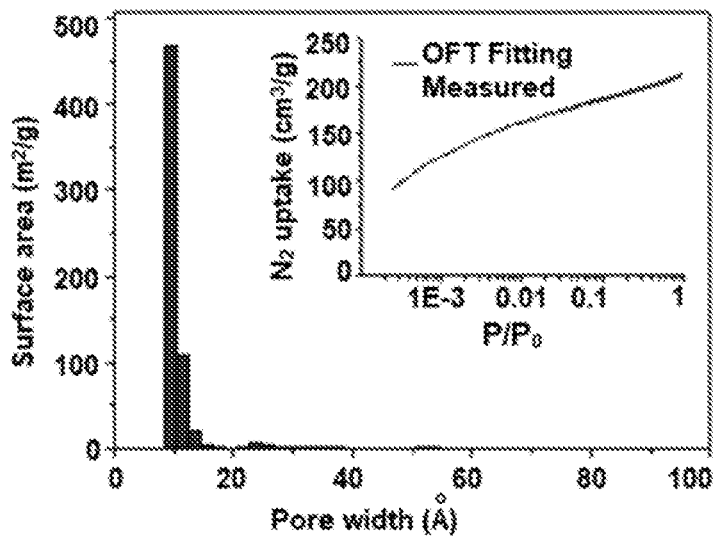
FIG. 65 provides a pore size distribution histogram of ZIF-636 calculated from DFT/Monte-Carlo fitting of the adsorption branch of the $N_2$ adsorption isotherm at 77 K (inset) with the fitting error of 0.062% using slit/cylinder/sphere pores QSDFT model.
Figure 66:
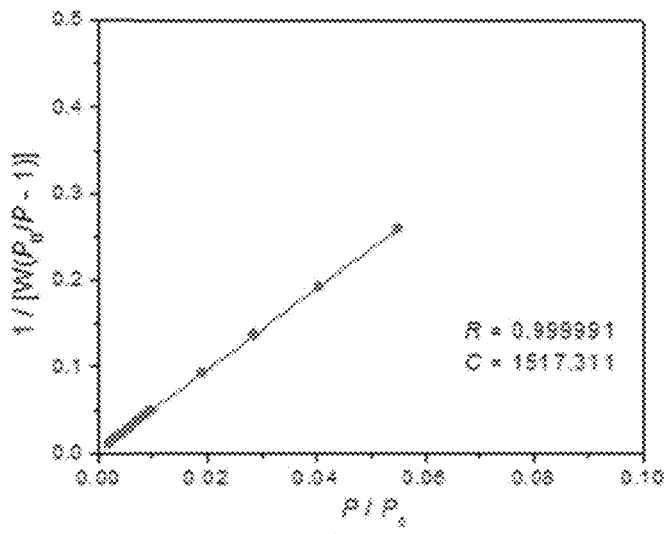
FIG. 66 displays a multiple point BET plot of ZIF-636 giving a specific surface area of 740 $m^2/g$.
Figure 67:
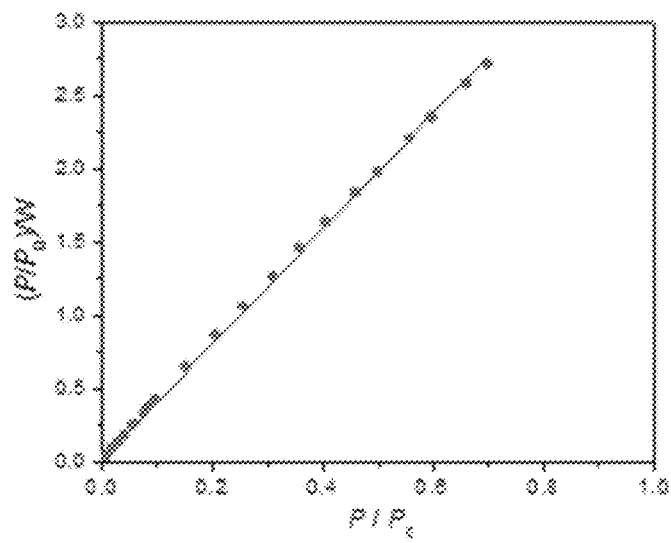
FIG. 67 provides a Langmuir plot of ZIF-636 giving a specific surface area of 890 $m^2/g$.
Figure 68:
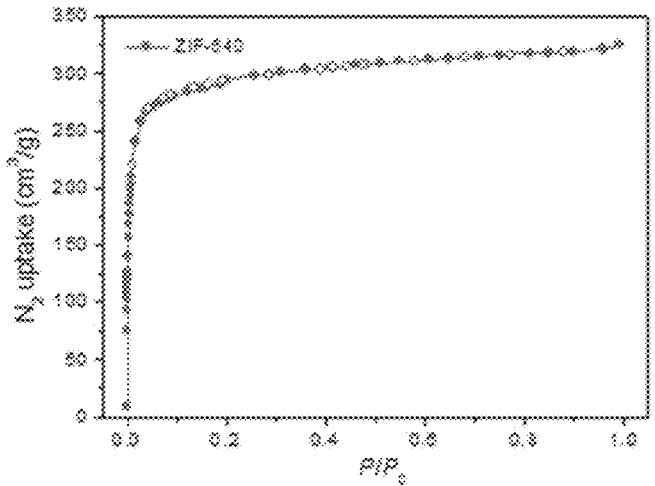
FIG. 68 presents a nitrogen adsorption isotherm of ZIF-640 at 77 K.
Figure 69:
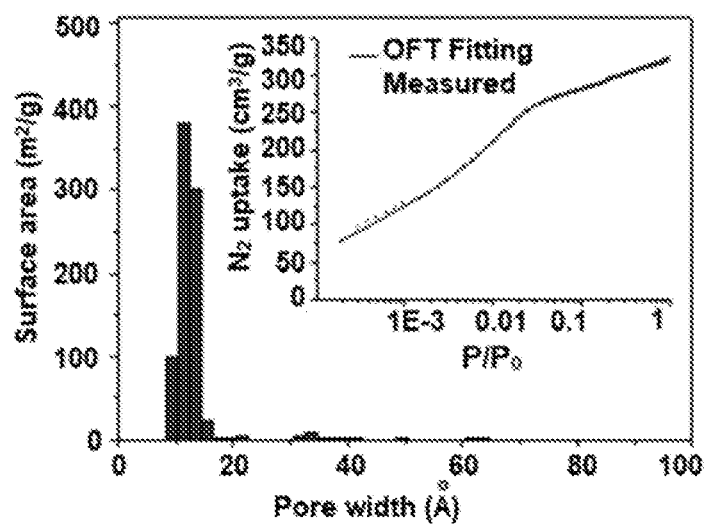
FIG. 69 provides a pore size distribution histogram of ZIF-640 calculated from DFT/Monte-Carlo fitting of the adsorption branch of the $N_2$ adsorption isotherm at 77 K (inset) with the fitting error of 0.551% using slit/cylinder/sphere pores QSDFT model.
Figure 70:
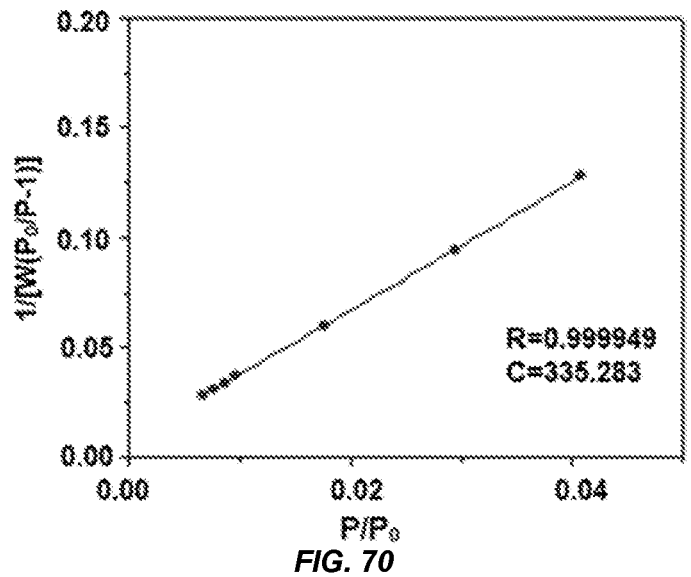
FIG. 70 displays a multiple point BET plot of ZIF-640 giving a specific surface area of 1184 $m^2/g$.
Figure 71:
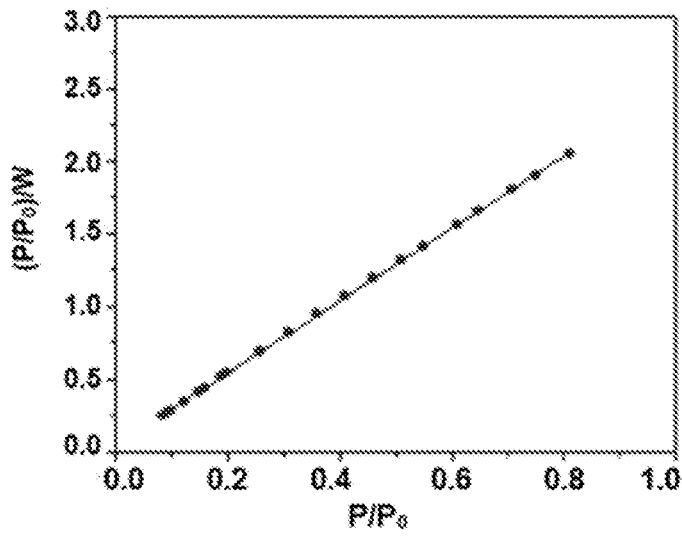
FIG. 71 provides a Langmuir plot of ZIF-640 giving a specific surface area of 1404 $m^2/g$.
Figure 72:
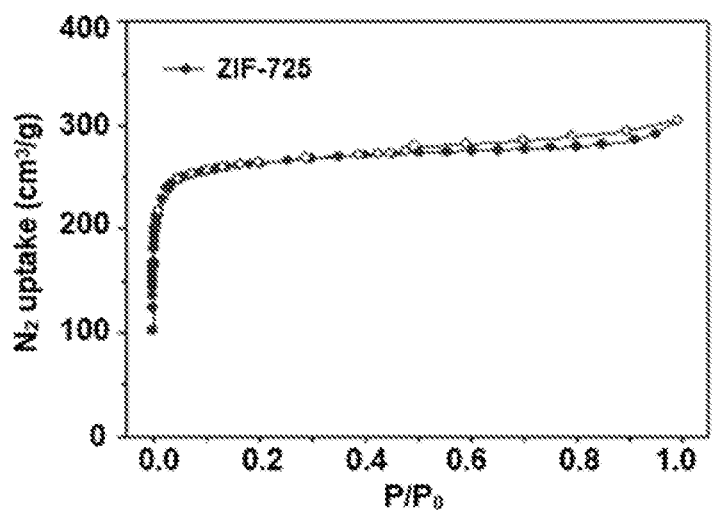
FIG. 72 presents a low-pressure nitrogen adsorption isotherm of ZIF-725 at 77 K.
Figure 73:
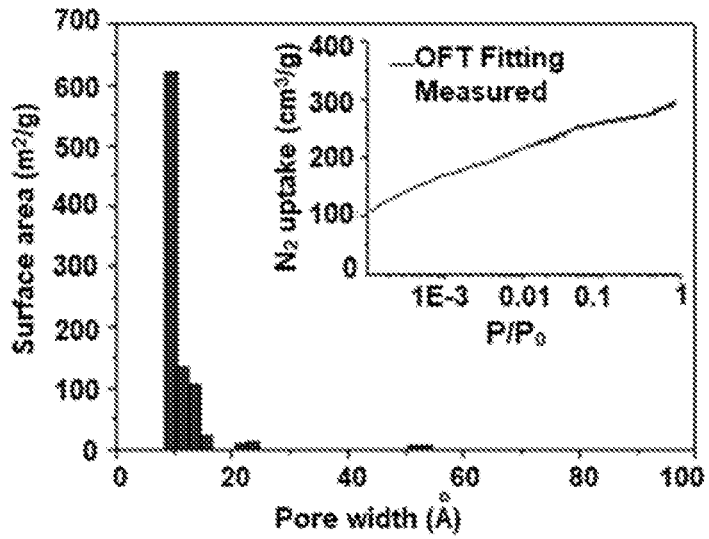
FIG. 73 displays a multiple point pore size distribution histogram of ZIF-725 calculated from DFT/Monte-Carlo fitting of the adsorption branch of the $N_2$ adsorption isotherm at 77 K (inset) with the fitting error of 0.082% using slit/cylinder/sphere pores QSDFT model.
Figure 74:
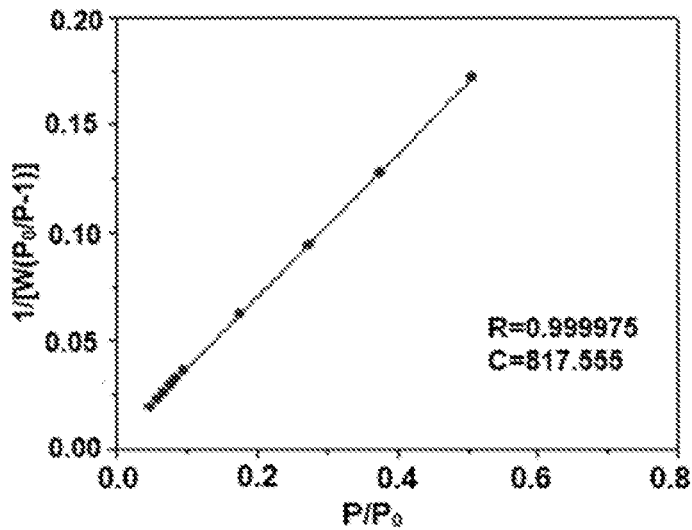
FIG. 74 displays a multiple point BET plot of ZIF-725 giving a specific surface area of 1050 $m^2/g$.
Figure 75:
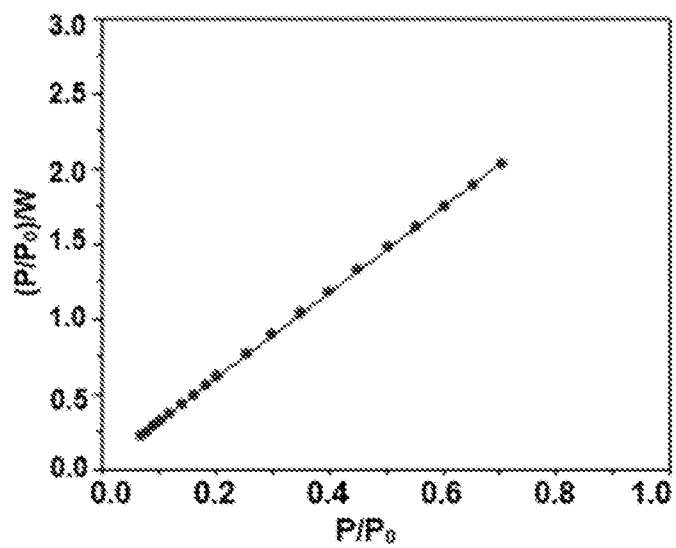
FIG. 75 provides a Langmuir plot of ZIF-725 giving a specific surface area of 1220 $m^2/g$.
Figure 76:
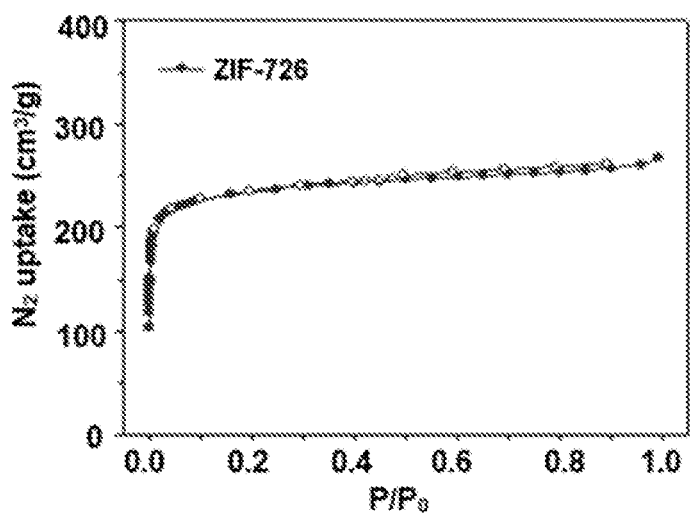
FIG. 76 presents a low-pressure nitrogen adsorption isotherm of ZIF-726 at 77 K.
Figure 77:
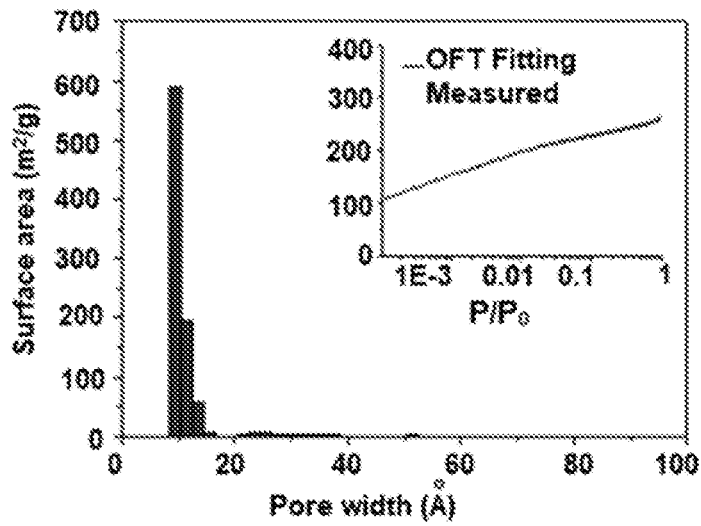
FIG. 77 provides a pore size distribution histogram of ZIF-726 calculated from DFT/Monte-Carlo fitting of the adsorption branch of the $N_2$ adsorption isotherm at 77 K (inset) with the fitting error of 0.052% using slit/cylinder/sphere pores QSDFT model.
Figure 78:
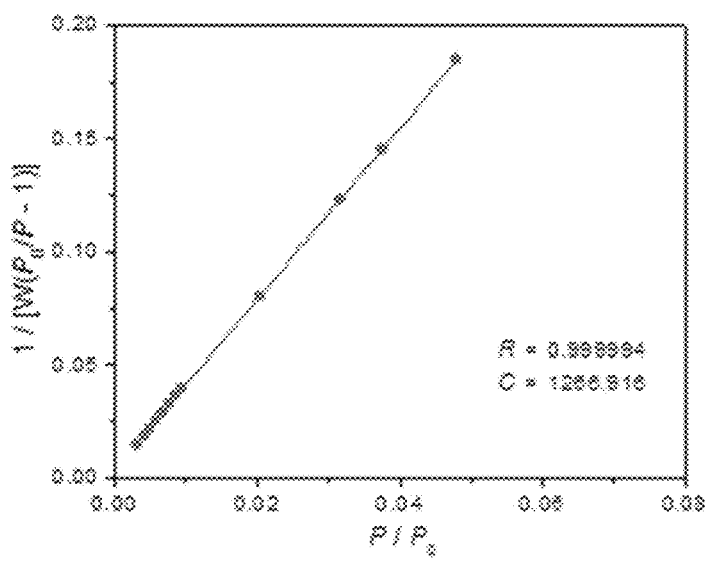
FIG. 78 displays a multiple point BET plot of ZIF-726 giving a specific surface area of 920 $m^2/g$.
Figure 79:
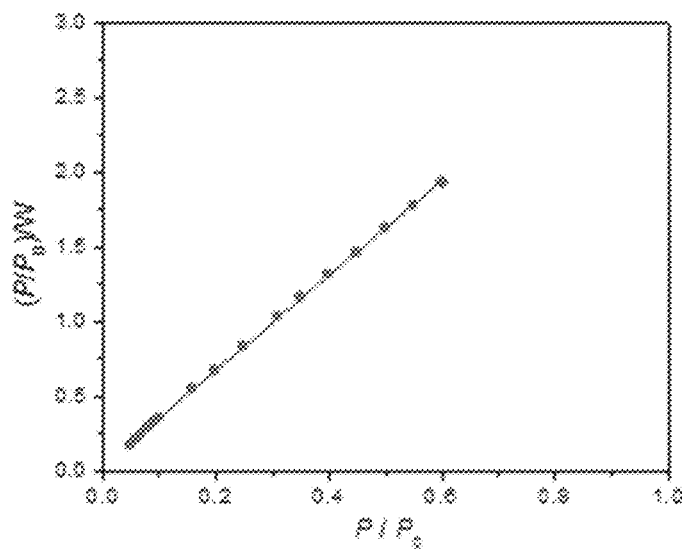
FIG. 79 provides a Langmuir plot of ZIF-726 giving a specific surface area of 1095 $m^2/g$.
Figure 80:
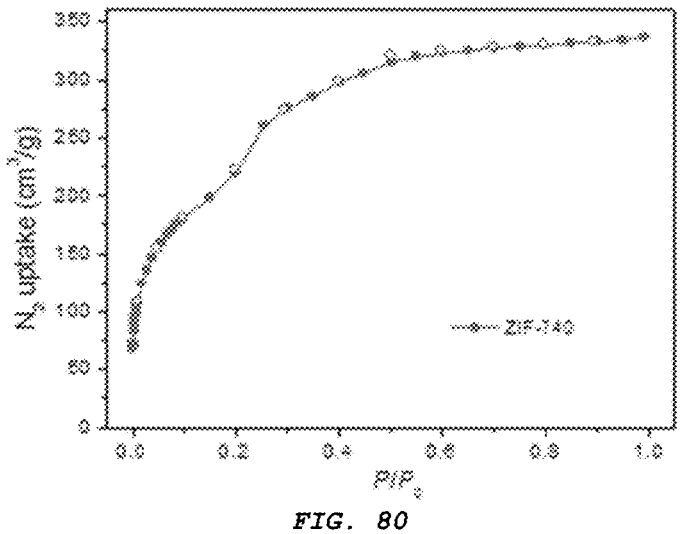
FIG. 80 presents a nitrogen adsorption isotherm of ZIF-740 at 77 K.
Figure 81:
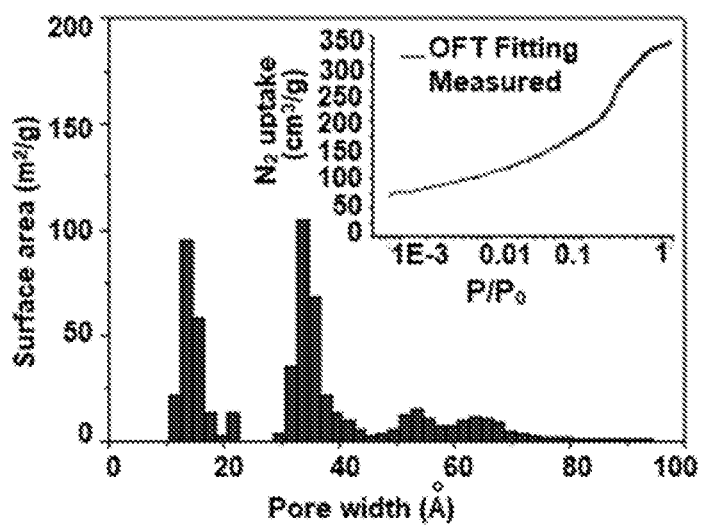
FIG. 81 provides a pore size distribution histogram of ZIF-740 calculated from DFT/Monte-Carlo fitting of the adsorption branch of the $N_2$ adsorption isotherm at 77 K (inset) with the fitting error of 0.274% using slit/cylinder/sphere pores QSDFT model.
Figure 82:
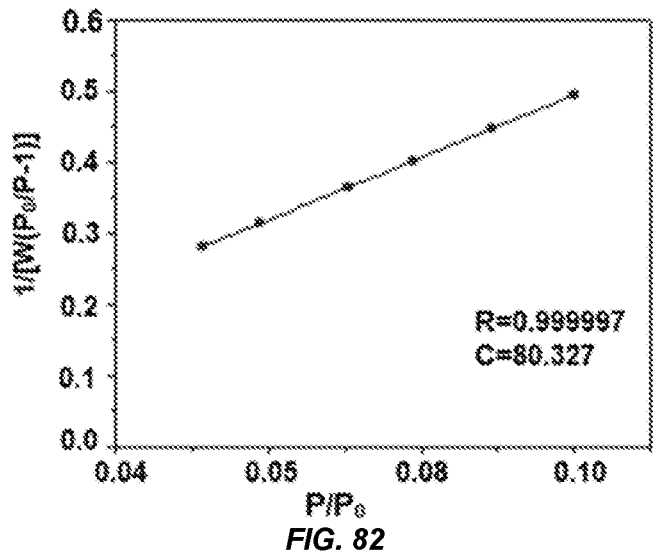
FIG. 82 displays a multiple point BET plot of ZIF-740 giving a specific surface area of 780 $m^2/g$.
Figure 83:
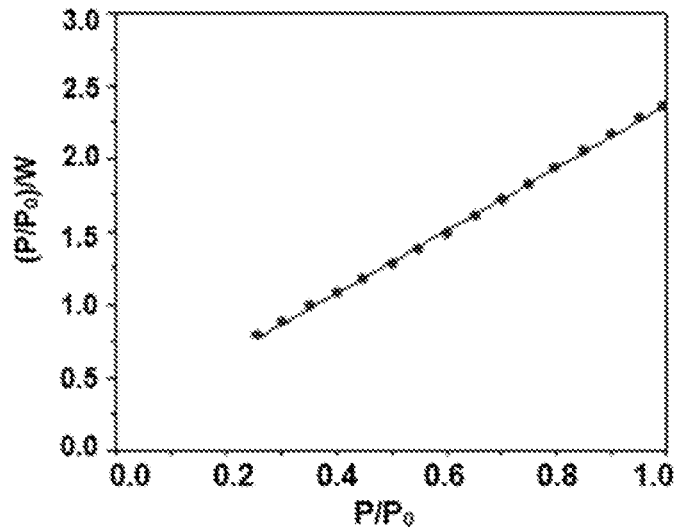
FIG. 83 provides a Langmuir plot of ZIF-740 giving a specific surface area of 1618 $m^2/g$.
Figure 84:
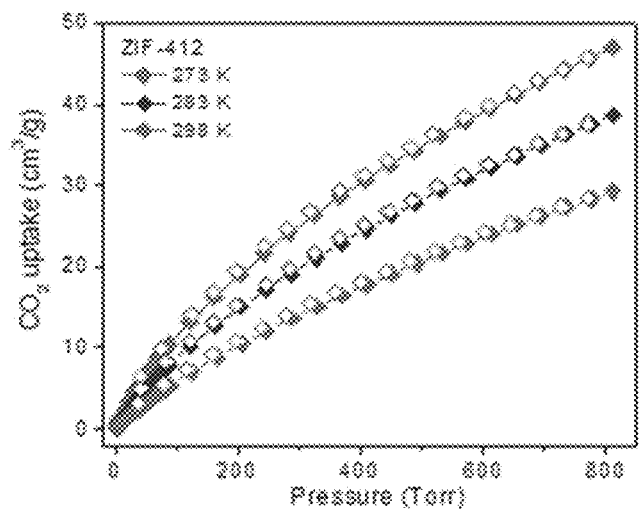
FIG. 84 presents a low-pressure carbon dioxide adsorption isotherm of ZIF-412 at 273 K (top), 283 K (middle), and 298 K (bottom), respectively.
Figure 85:
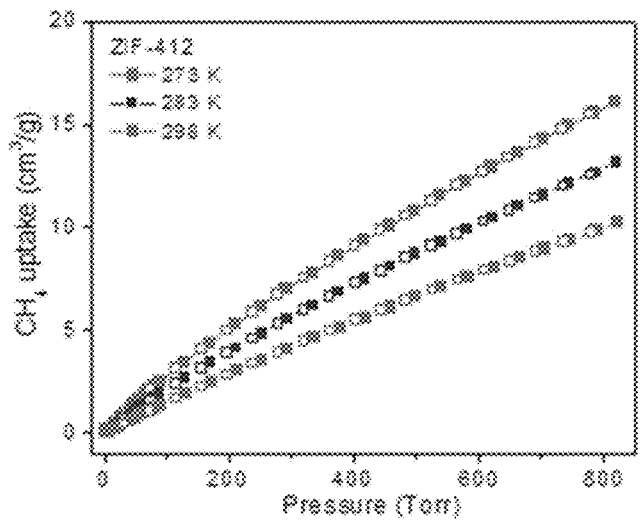
FIG. 85 provides a low-pressure methane adsorption isotherm of ZIF-412 at 273 K (top), 283 K (middle), and 298 K (bottom), respectively.
Figure 86:
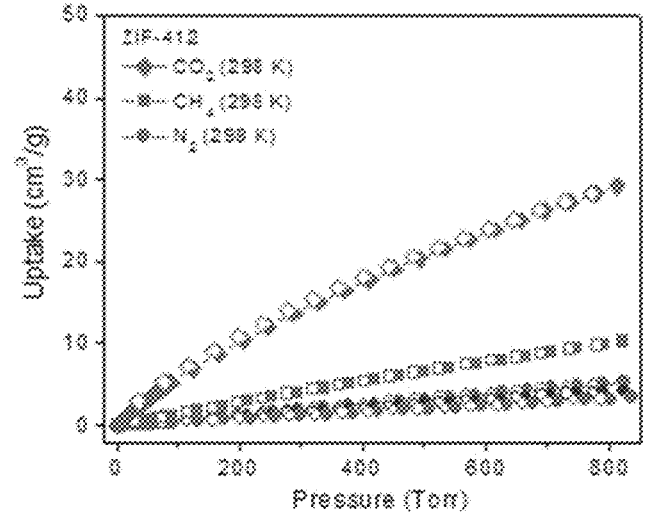
FIG. 86 provides a low-pressure nitrogen adsorption isotherm of ZIF-412 (circle) at 273 K, 283 K, and 298 K, respectively, and comparison with those of carbon dioxide (diamond) and methane (square) at 298 K.
Figure 87:
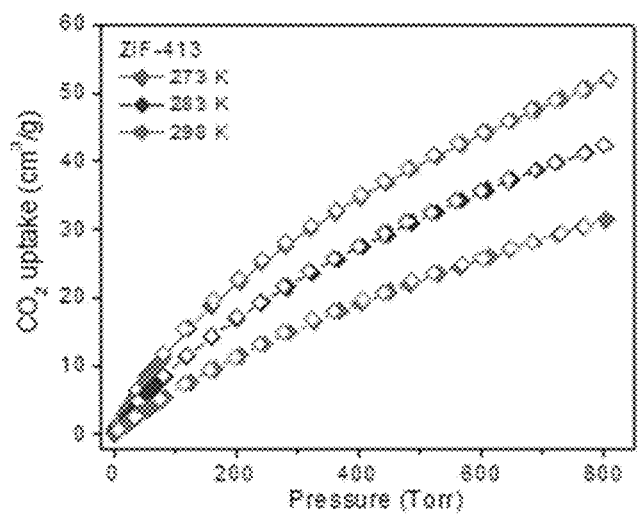
FIG. 87 provides a low-pressure carbon dioxide adsorption isotherm of ZIF-413 at 273 K (top), 283 K (middle), and 298 K (bottom), respectively.
Figure 88:
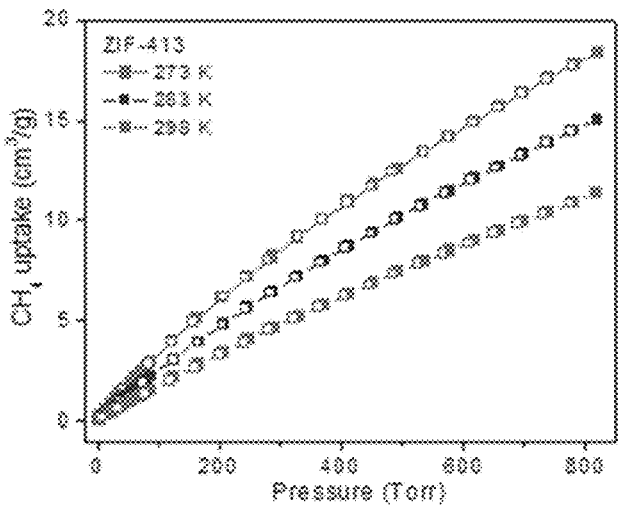
FIG. 88 provides a low-pressure methane adsorption isotherm of ZIF-413 at 273 K (top), 283 K (middle), and 298 K (bottom), respectively.
Figure 89:
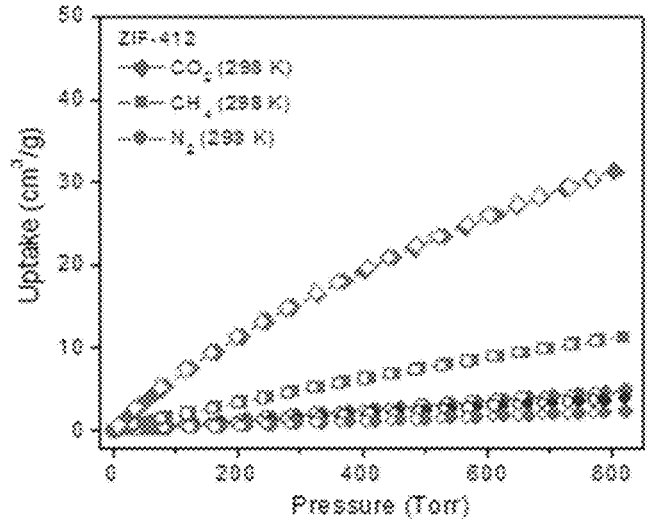
FIG. 89 provides a low-pressure nitrogen adsorption isotherm of ZIF-413 (circle) at 273 K, 283 K, and 298 K, respectively, and comparison with those of carbon dioxide (diamond) and methane (square) at 298 K.
Figure 90:
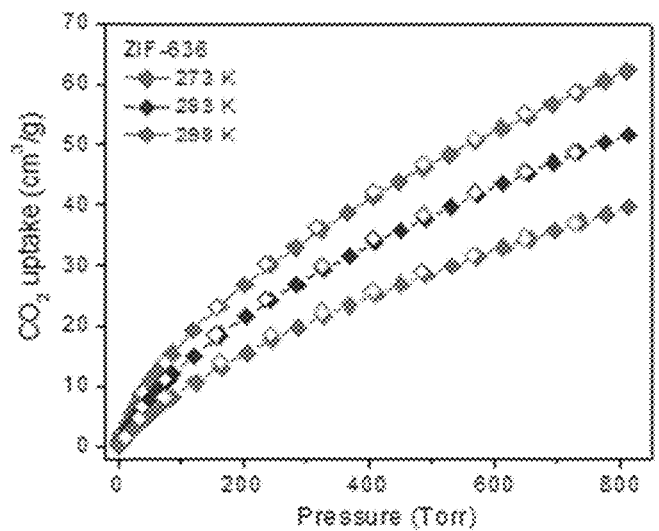
FIG. 90 provides a low-pressure carbon dioxide adsorption isotherm of ZIF-636 at 273 K (top), 283 K (middle), and 298 K (bottom), respectively.
Figure 91:
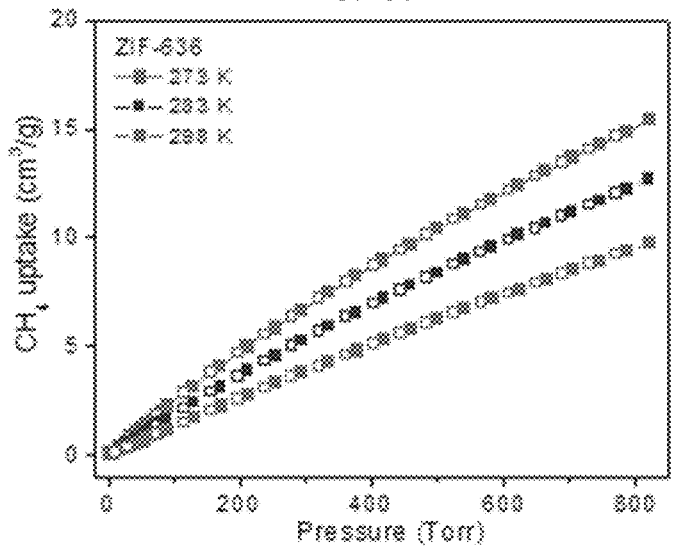
FIG. 91 provides a low-pressure methane adsorption isotherm of ZIF-636 at 273 K (top), 283 K (middle), and 298 K (bottom), respectively.
Figure 92:
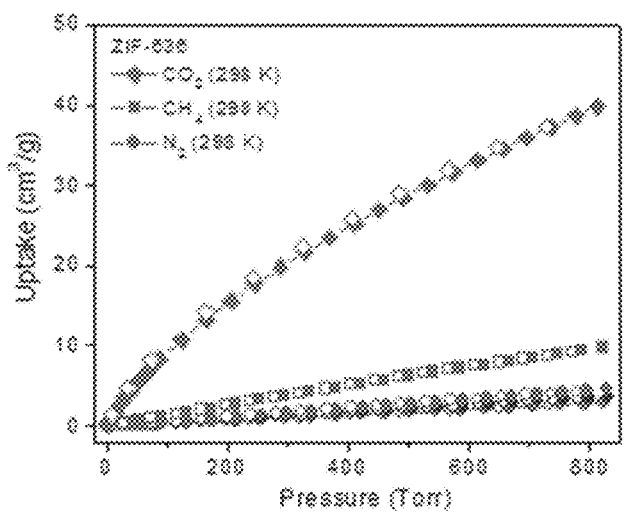
FIG. 92 provides a low-pressure nitrogen adsorption isotherm of ZIF-636 (circle) at 273 K, 283 K, and 298 K, respectively, and comparison with those of carbon dioxide (diamond) and methane (square) at 298 K.
Figure 93:
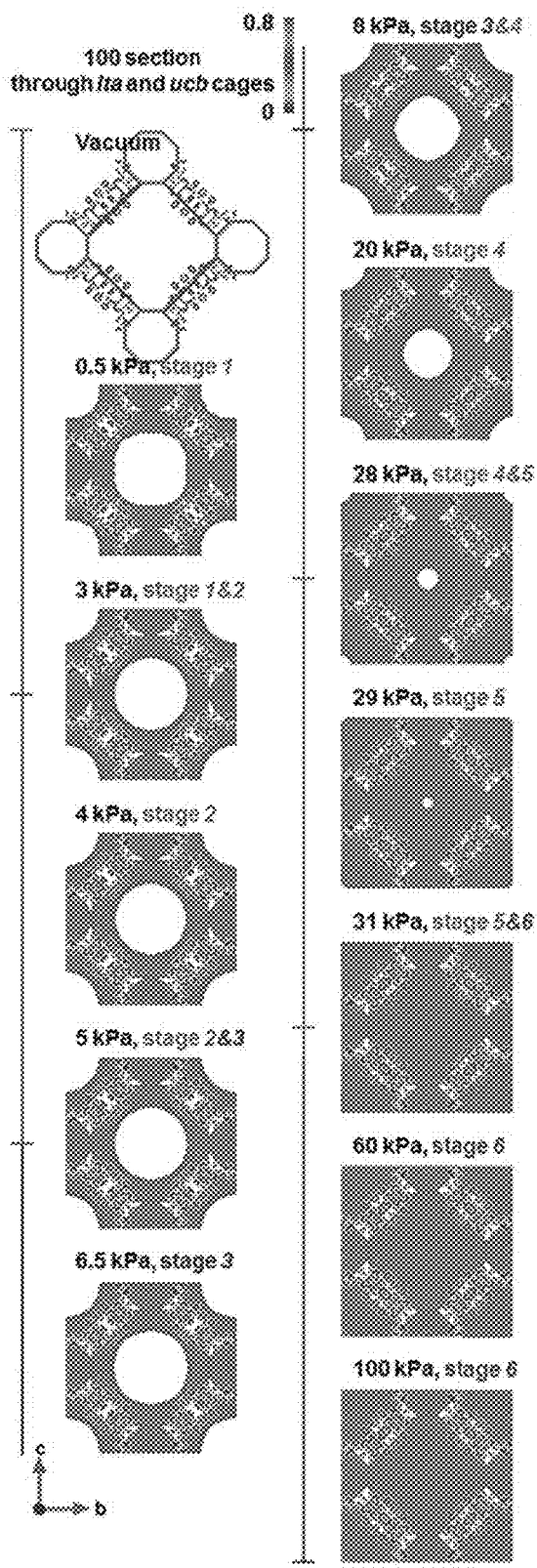
FIG. 93 displays an electron density map of Ar in ZIF-412 at 100 section through center of lta and ucb cages during Ar adsorption process, derived from difference MEM analysis. Atomic coordinates of ZIF-412 was included to clarify the relative position of Ar in ZIF framework. The electron density increases from dark to light (blue to red).
Figure 94A:
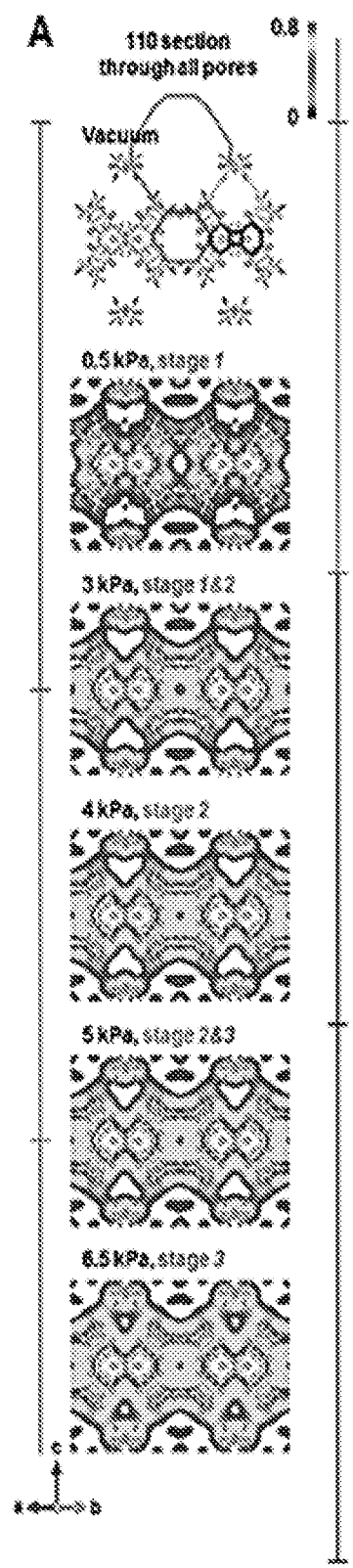
FIG. 94A-B displays electron density maps of Ar in ZIF-412 at (A) 110 and (B) 100 sections through the center of lta and ucb cages during Ar adsorption process, derived from difference Fourier analysis. Atomic coordinates of ZIF-412 was included to clarify the relative position of Ar in the ZIF framework. The electron density increases from dark to light (blue to red).
Figure 94B:
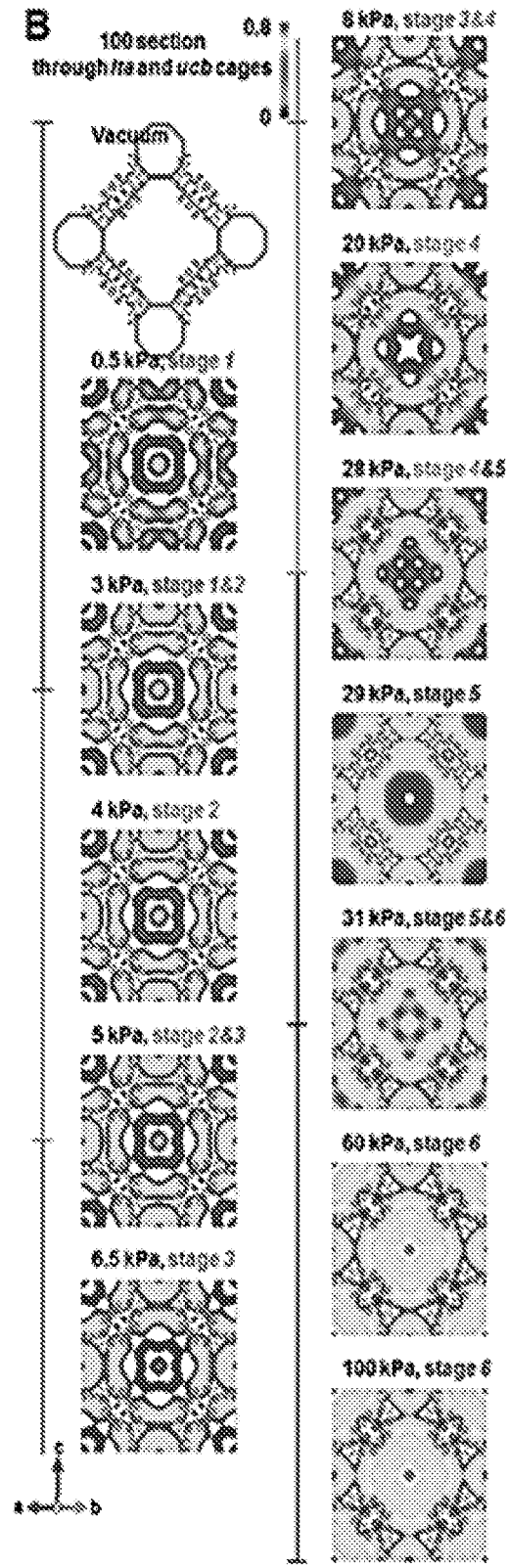
Figures 95A, 95B:
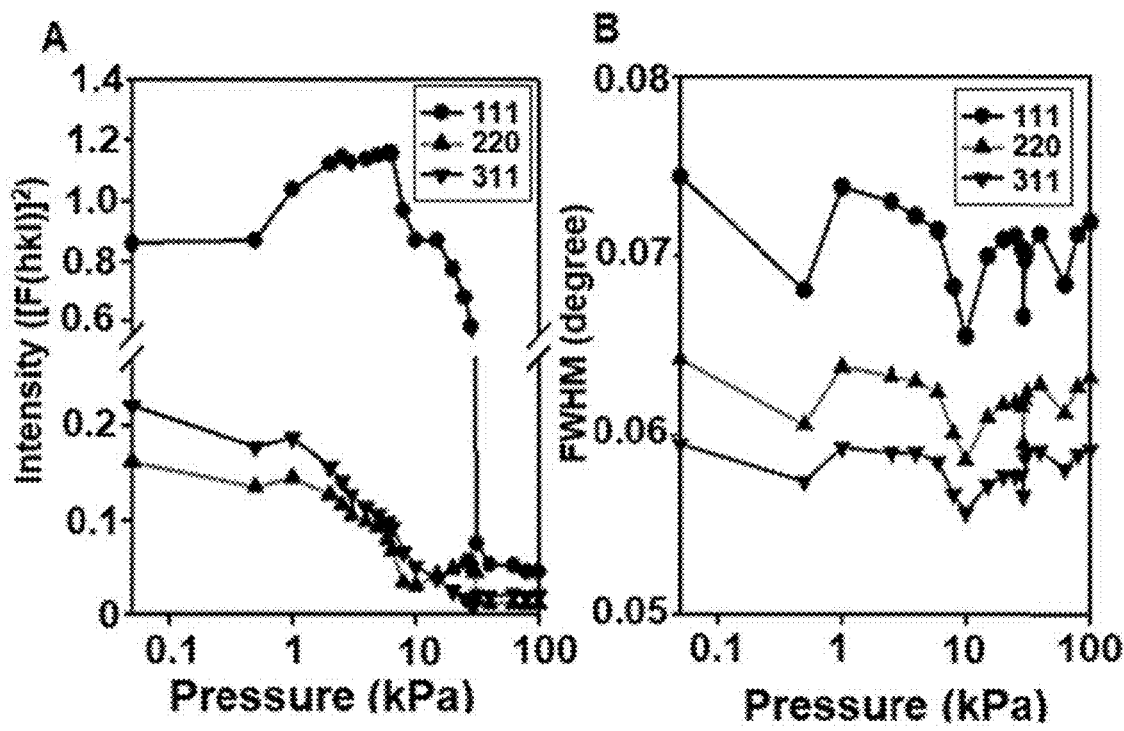
FIG. 95A-B provides (A) $[F(hkl)]^2$ and (B) full width half maxima (FWHM) of 111, 220, 311 reflections for ZIF-412 at different Ar pressures, calculated from integrated intensity. All data show significant decrease during capillary condensation of Ar in fau (5-8 kPa) and ucb (28-31 kPa) cages of ZIF-412. The change in $[F(hkl)]^2$ originates from the alteration of the electron density due to the uptake of adsorbates into the different cages of ZIF-412. FWHM of each reflection at different Ar pressures indicates strain of the ZIF-412 framework induced by the gas uptake.

Since the adsorption behavior in hierarchical porous system is complex, the adsorption behavior was studied in situ taking advantage of the extra-large unit cell of ucb ZIF-412 and the state-of-the-art small angle X-ray scattering (SAXS) equipped with gas adsorption apparatus. An unprecedented sequential pore filling process of argon was found in ZIF-412. This process can be described into six stages based on the different slopes of the adsorption isotherm and the corresponding diffraction [stage 1 (0 to 3 kPa), 2 (3 to 5 kPa), 3 (5 to 8 kPa), 4 (8 to 28 kPa), 5 (28 to 31 kPa), and 6 (31 to 100 kPa) (see FIGS. 4A and B)]. (1) At stage 1, all the interior surface of ZIF-412 was covered by monolayer argon. Surprisingly, gas molecules were also observed in these pockets inside the hexagonal prism SBUs, serving as the smallest cage of the structure. (2) At stage 2, with a smaller pore entrance (8-MR) and truncated cuboctahedral shape, argon commenced to fill the lta cage at 3 kPa and was completely filled at 5 kPa. (3) At stage 3, fau cages with similar cage size but a large window (12-MR) and of tetrahedral shape started to be filled with argon at 5 kPa and was completely filled at 8 kPa. (4) At stage 4, the thickness of the argon layer in ucb cage is gradually filling as pressure increments increase to finally reach up to 2 to 3 layers compared with the monolayer covering in fau cage and lta cage occurring before condensation, thus showing the expected mesoporous character. (5) At stage 5, argon condensed quickly in the ucb cage being accompanied by a boost in uptake. (6) At stage 6, all the pores were filled at 100 kPa with argon distributed homogeneously (FIG. 3c). From the top of the peaks in the electron density map of 0.5 kPa, the actual pore diameter of lta, fau and ucb cages at {110} sections were calculated by maximum-entropy method (MEM) as 19 Å, 24 Å, and 44 Å, respectively, and corresponding the values by difference Fourier map were found to be 16 Å, 21 Å, and 42 Å. The pore size of ucb cage is significantly larger than the one estimated from DFT fitting (32 Å, 28-31 kPa), while the latter matched well with the size (33 Å) derived by MEM at 28 kPa, where condensation starts, indicating that the pore size derived from DFT fitting was actually the size that argon start to condense in the ucb pores.

The family of ZIFs reported here show high thermal stability in air up to 350° C., as confirmed by thermal gravimetric analysis (TGA), and have high $CO_2$ uptake. It was found that ucb ZIF-413 has $CO_2$ uptake of 2.2 mmol/g at 273 K (760 torr), and that AFX (ZIF-636) has even higher $CO_2$ uptake of up to 2.7 mmol/g, with a high $CO_2/CH_4$ (50/50) and $CO_2/N_2$ (15/75) of up to 9.5 and 57.4 (273 K) [7.1 and 24 (298 K)] respectively; surpassed those observed in the state-of-the-art BPL carbon (3.9 and 17.8, respectively).

The ZIFs reported here also include large pores that have or are greater than 8 membered rings (MR). For example, ZIFs of the disclosure having KFI—8MR; AFX—8MR; ucb—12 MR; bam—24 MR are provided. In certain ZIFs of the disclosure the benzene tails are directed toward the center of the largest rings, such arrangement represents an efficient way to avoid steric hindrance between the bulky links as large rings would have larger space to keep these tails; in other words, the large rings form and/or are stabilized because of the steric repulsion of these bulky groups (8 MR, 10 MR, 12 MR, etc.). For structures comprising large rings but with no long length, either a huge distortion of the largest ring, leading to the shape transforming from circle to ellipsoid imidazolates (ana, 8MR; crb, 8MR; dft, 8MR; frl, 8MR; gis, 8MR; not, 8MR; qtz, 8MR; zec, 10MR) or instability upon removing solvent (MER, 8MR) occur. Similarly, formation of smaller rings (e.g., 4 MR, 6MR) would be used if short length imidazolates were used. Moreover, connection of large rings through relatively small rings would result in three dimensional extended zeolitic structures.

The data demonstrate that long length imidazolates are useful to achieve large structures because of the capability to maintain large rings while introducing other types of shorter length imidazolates and tuning their ratio, which provides useful ring size distribution and connectivity. The disclosure demonstrates such structures. For example, reaction of 4-nitroimidazole and 5-methylbenzimidazole with long length 5-chlorobenzimidazole/5-bromobenzimidazole and zinc salt results in two ZIFs named ZIF-723 $(Zn(4-nIM)_{0.98}(cbIm)_{1.05})$ with topology cjh48 and ZIF-128 $(Zn(mbIm)_{1.23}(bbIm)_{0.77}(DMF)_{0.05})$ with topology hyk. Both of these exemplary ZIFs have large unit cells (primitive cell volume of 24,786 Å$^3$ and 59,471 Å$^3$, respectively).

The disclosure provides for zeolitic imidazolate frameworks (ZIFs) that are comprised of a plurality of interconnected hexagonal prism and/or cube secondary building units (SBUs). SBUs are molecular complexes and cluster entities in which ligand coordination modes and metal coordination environments can be utilized in the transformation of these fragments into extended porous networks using polytopic organic linkers. For the metal organic frameworks disclosed herein, the SBUs have the general formulae of M-N-L, wherein M is a metal, metal ion, or metal containing complex, and N is a nitrogen atom of an imidazolate based organic linker, and L is an imidazolate based organic linker (e.g., imdazolate, benzimidazolate, adenine, cytosine and so on). In some embodiments described herein an imidazolate based organic linker is depicted as not being bound to a metal, metal ion or metal complex. In such instances, such linkers may be referred to as "precursor imidazolate based organic linkers" because upon binding a metal, metal ion or metal complex one or more hydrogens may be lost from a nitrogen atom on the organic linker, wherein the metal, metal ion or metal complex binds to one or more nitrogens on the imidazolate based organic linker. In another embodiment, the disclosure may describe "L" as being "obtained" or "derived" from a particular imidazolate based organic linker, in such instance it should be readily apparent that upon reaction with a metal, metal ion or metal complex, the metal, metal ion or metal complex will form a bond with a nitrogen on the organic linker thus forming an "M-N-L" structure. Further, the metal organic frameworks of the disclosure are characterized by being comprised of multivariate imidazolate based organic linkers. The ZIFs of the disclosure can comprise any number of topologies including, but not limited to, GME, CHA, KFI, AFX, LTA, bam, and ucb. The ZIFs of the disclosure are further characterized by comprising pores. Accordingly, the ZIFs disclosed herein are all capable of adsorbing fluids, including gases, liquids, and compounds.

The disclosure also provides for the general synthesis of ZIFs comprising a plurality of interconnected hexagonal prism and/or cube secondary building units (SBUs). It should be further noted, that for any of the organic linking moieties disclosed herein the moieties may be further functionalized in order to modify SBU size, pore size of the SBU, or modulate the specificity of the framework to a guest species or gas molecule.

In a particular embodiment, the disclosure provides for ZIFs which comprise interconnected prism and/or cube SBUs having the general structure of M-N-L, wherein M comprises a metal, metal ion, or metal complex, N is a nitrogen atom, and L is an imidazolate based organic linker, wherein the ZIF comprises a plurality of L derived/obtained the structure of Formula I, and a plurality of L derived/obtained the structure of Formula II and/or Formula III:

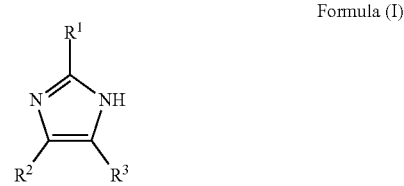

Formula (I)

Formula (II)

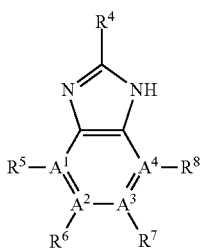

Formula (III)

wherein, A¹-A⁴ are each independently C or N; R¹ is an optionally substituted $(C_1-C_6)$alkyl, an optionally substituted $(C_1-C_6)$alkenyl, an optionally substituted $(C_1-C_6)$alkynyl, halo, nitro, aldehyde, carboxylic acid, amine, amide, cyano, ester, ketone, thiol, alkoxy, hydroxyl; R⁴-R⁸ are each independently selected from H, an optionally substituted $(C_1-C_6)$alkyl, an optionally substituted $(C_1-C_6)$alkenyl, an optionally substituted $(C_1-C_6)$alkynyl, halo, nitro, aldehyde, carboxylic acid, amine, amide, cyano, ester, ketone, thiol, alkoxy, and hydroxyl; wherein any of R⁵-R⁸ are absent if bound to A that is a N. It should be readily apparent to one of skill in the art that the precursor linking moieties of Formulas I, II and III are reacted such that M forms a bond with one or more nitrogens of Formula I, II and/or III such that structures of formulas I, II and III become linking moieties.

In a further embodiment, the disclosure provides for a ZIF which comprises a plurality of L that have a structure of Formula I and a plurality of L that have a structure of Formula II. In an alternate embodiment, the disclosure provides for a ZIF which comprises a plurality of L that have a structure of Formula I and a plurality of L that have a structure of Formula III. In another alternate embodiment, the disclosure provides for a ZIF which comprises a plurality of L that have a structure of Formula I and a plurality of L that have a structure of Formula II and a plurality of L that have a structure of Formula III.

In another embodiment, the disclosure further provides for ZIFs which comprise interconnected prism and/or cube SBUs having the general structure of M-N-L, wherein M comprises a metal, metal ion, or metal complex, N is a nitrogen atom of L, and L is an imidazolate based linking moiety, wherein the ZIF comprises a plurality of L obtain from or derived from the structure of Formula I(a), and a plurality of L obtained from or derived from the structure of Formula II and/or Formula III(a):

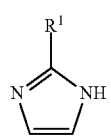

Formula I(a)

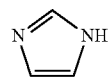

Formula (II)

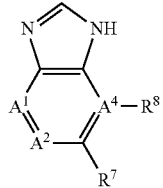

Formula III(a)

wherein, A¹, A², and A⁴ are each independently C or N; R¹ is an optionally substituted $(C_1-C_3)$alkyl, halo, nitro, aldehyde, amine, cyano, thiol, hydroxyl; R⁷-R⁸ are each independently selected from H, an optionally substituted $(C_1-C_3)$alkyl, halo, nitro, aldehyde, carboxylic acid, amine, amide, cyano, ester, ketone, thiol, alkoxy, and hydroxyl; wherein R⁸ is absent if A⁴ that is a N.

In a further embodiment, the disclosure provides for a ZIF which comprises a plurality of L that have a structure of Formula I(a) and a plurality of Ls that have a structure of Formula II. In an alternate embodiment, the disclosure provides for a ZIF which comprises a plurality of L that have a structure of Formula I(a) and a plurality of L that have a structure of Formula III(a). In another alternate embodiment, the disclosure provides for a ZIF which comprises a plurality of L that have a structure of Formula I(a), a plurality of Ls that have a structure of Formula II, and a plurality of Ls that have a structure of Formula III(a).

In one embodiment, a ZIF of the disclosure comprises a heterogeneous combination of metals, metal ions, or metal containing complexes. In an alternate embodiment, a ZIF disclosed herein comprises homogenous metals, metal ions or metal containing complexes.

In a particular embodiment, the disclosure provides for a ZIF which comprises one or more metals or metal ions selected from: $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $Nb^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, Cr, $Mo^{6+}$, $Mo^{5+}$, $Mo^{4+}$, $Mo^{3+}$, $Mo^{2+}$, $Mo^+$, Mo, $W^{6+}$, $W^{5+}$, $W^{4+}$, $W^{3+}$, $W^{2+}$, $W^+$, W, $Mn^{7+}$, $Mn^{6+}$, $Mn^{5+}$, $Mn^{4+}$, $Mn^{3+}$, $Mn^{2+}$, $Mn^+$, $Re^{7+}$, $Re^{6+}$, $Re^{5+}$, $Re^{4+}$, $Re^{3+}$, $Re^{2+}$, $Re^+$, Re, $Fe^{6+}$, $Fe^{4+}$, $Fe^{3+}$, $Fe^{2+}$, $Fe^+$, Fe, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $Os^{4+}$, $Os^{3+}$, $Os^{2+}$, $Os^+$, Os, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^+$, Ir, $Ni^{3+}$, $Ni^{2+}$, $Ni^+$, Ni, $Pd^{6+}$, $Pd^{4+}$, $Pd^{2+}$, $Pd^+$, Pd, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au^+$, $Zn^{2+}$, $Zn^+$, Zn, $Cd^{2+}$, $Cd^+$, $Hg^{4+}$, $Hg^{2+}$, $Hg^+$, $B^{3+}$, $B^{2+}$, $B^+$, $Al^{3+}$, $Al^{2+}$, $Al^+$, $Ga^{3+}$, $Ga^{2+}$, $Ga^+$, $In^{3+}$, $In^{2+}$, $In^{1+}$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, Ge, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $Db^{3+}$, $Db^{2+}$, $Ho^{3+}$, $Er^{3+}$, $Tm^{4+}$, $Tm^{3+}$, $Tm^{2+}$, $Yb^{3+}$, $Yb^{2+}$, $Lu^{3+}$, $La^{3+}$, $La^{2+}$, $La^+$, and combinations thereof, including any complexes which contain the metals or metal ions, as well as any corresponding metal salt counter-anions.

In another embodiment, a ZIF disclosed herein comprises one or more divalent metal ions selected from: $Be^{2+}$, $Mg^{2+}$, $Ca^{2+}$, $Sr^{2+}$, $Ba^{2+}$, $Sc^{2+}$, $Y^{2+}$, $Ti^{2+}$, $Zr^{2+}$, $V^{2+}$, $Nb^{2+}$, $Ta^{2+}$, $Cr^{2+}$, $Mo^{2+}$, $W^{2+}$, $Mn^{2+}$, $Re^{2+}$, $Fe^{2+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Ag^{2+}$, $Au^{2+}$, $Zn^{2+}$, $Cd^{2+}$, $Hg^{2+}$, $B^{2+}$, $Al^{2+}$, $Ga^{2+}$, $In^{2+}$, $Si^{2+}$, $Ge^+$, $Sn^{2+}$, $Pb^{2+}$, $As^{2+}$, $Te^{2+}$, $La^+$, $Ce^{2+}$, $Pr^{2+}$, $Nd^{2+}$, $Sm^{2+}$, $Eu^{2+}$, $Gd^{2+}$, $Tb^{2+}$, $Db^{2+}$, $Tm^{2+}$, $Yb^{2+}$, and $La^{2+}$, including any complexes which contain the metal ions, as well as any corresponding metal salt counter-anions. In a particular embodiment, a ZIF disclosed herein comprise $Zn^{2+}$.

The preparation of ZIF frameworks of the disclosure can be carried out in either an aqueous or non-aqueous solvent system. The solvent may be polar or non-polar, or a combination thereof, as the case may be. The reaction mixture or suspension comprises a solvent system, organic linkers, and a metal or a metal/salt complex. The reaction solution, mixture or suspension may further contain a templating agent, catalyst, or combination thereof. The reaction mixture may be heated at an elevated temperature or maintained at ambient temperature, depending on the reaction components.

Examples of non-aqueous solvents that can be used in a reaction to make a ZIF disclosed herein and/or used as non-aqueous solvent for a post-synthesized ZIF reaction, include, but are not limited to: n-hydrocarbon based solvents, such as pentane, hexane, octadecane, and dodecane; branched and cyclo-hydrocarbon based solvents, such as cycloheptane, cyclohexane, methyl cyclohexane, cyclohexene, cyclopentane; aryl and substituted aryl based solvents, such as benzene, toluene, xylene, chlorobenzene, nitrobenzene, cyanobenzene, naphthalene, and aniline; mixed hydrocarbon and aryl based solvents, such as, mixed hexanes, mixed pentanes, naptha, and petroleum ether; alcohol based solvents, such as, methanol, ethanol, n-propanol, isopropanol, propylene glycol, 1,3-propanediol, n-butanol, isobutanol, 2-methyl-1-butanol, tert-butanol, 1,4-butanediol, 2-methyl-1-petanol, and 2-pentanol; amide based solvents, such as, dimethylacetamide, dimethylformamide (DMF), formamide, N-methylformamide, N-methylpyrrolidone, and 2-pyrrolidone; amine based solvents, such as, piperidine, pyrrolidine, collidine, pyridine, morpholine, quinoline, ethanolamine, ethylenediamine, and diethylenetriamine; ester based solvents, such as, butylacetate, sec-butyl acetate, tert-butyl acetate, diethyl carbonate, ethyl acetate, ethyl acetoacetate, ethyl lactate, ethylene carbonate, hexyl acetate, isobutyl acetate, isopropyl acetate, methyl acetate, propyl acetate, and propylene carbonate; ether based solvents, such as, di-tert-butyl ether, diethyl ether, diglyme, diisopropyl ether, 1,4-dioxane, 2-methyltetrahydrofuran, tetrahydrofuran (THF), and tetrahydropyran; glycol ether based solvents, such as, 2-butoxyethanol, dimethoxyethane, 2-ethoxyethanol, 2-(2-ethoxyethoxy)ethanol, and 2-methoxyethanol; halogenated based solvents, such as, carbon tetrachloride, cholorbenzene, chloroform, 1,1-dichloroethane, 1,2-dichloroethane, 1,2-dichloroethene, dichloromethane (DCM), diiodomethane, epichlorohydrin, hexachlorobutadiene, hexafluoro-2-propanol, perfluorodecalin, perfluorohexane, tetrabromomethane, 1,1,2,2-tetrchloroethane, tetrachloroethylene, 1,3,5-trichlorobenzene, 1,1,1-trichloroethane, 1,1,2-trichloroethane, trichloroethylene, 1,2,3-trichloropropane, trifluoroacetic acid, and 2,2,2-trifluoroethanol; inorganic based solvents, such as hydrogen chloride, ammonia, carbon disulfide, thionyl chloride, and phophorous tribromide; ketone based solvents, such as, acetone, butanone, ethylisopropyl ketone, isophorone, methyl isobutyl ketone, methyl isopropyl ketone, and 3-pentanone; nitro and nitrile based solvents, such as, nitroethane, acetonitrile, and nitromethane; sulfur based solvents, dimethyl sulfoxide (DMSO), methylsulfonylmethane, sulfolane, isocyanomethane, thiophene, and thiodiglycol; urea, lactone and carbonate based solvents, such as 1-3-dimethyl-3,4,5,6-tetrahydro-2(1H)-pyrimidinone (DMPU), 1-3-dimethyl-2-imidazolidinone, butyrolactone, cis-2,3-butylene carbonate, trans-2,3-butylene carbonate, 2,3-butylene carbonate; carboxylic acid based solvents, such as formic acid, acetic acid, chloracetic acid, trichloroacetic acid, trifluoroacetic acid, propanoic acid, butanoic acid, caproic acid, oxalic acid, and benzoic acid; boron and phosphorous based solvents, such as triethyl borate, triethyl phosphate, trimethyl borate, and trimethyl phosphate; deuterium containing solvents, such as deuterated acetone, deuterated benzene, deuterated chloroform, deuterated dichloromethane, deuterated DMF, deuterated DMSO, deuterated ethanol, deuterated methanol, and deuterated THF; and any appropriate mixtures thereof.

In another embodiment, a nonaqueous solvent used as the solvent system in synthesizing a ZIF framework disclosed herein has a pH less than 7. In a further embodiment, a solvent system used to synthesize a ZIF framework of the disclosure is an aqueous solution that has a pH less than 7. In yet a further embodiment, a solvent system used to synthesize a ZIF framework disclosed herein contains DMF or DEF. In another embodiment, a solvent system used to synthesize a ZIF framework of the disclosure contains a base.

Those skilled in the art will be readily able to determine an appropriate solvent or appropriate mixture of solvents based on the starting reactants and/or where the choice of a particular solvent(s) is not believed to be crucial in obtaining the materials of the disclosure.

Templating agents can be used in the methods of the disclosure. Templating agents employed in the disclosure are added to the reaction mixture for the purpose of occupying the pores in the resulting ZIF frameworks disclosed herein. In some variations of the disclosure, space-filling agents, absorbed or adsorbed chemical species and guest species increase the surface area of a ZIF framework disclosed herein. Suitable space-filling agents include, for example, a component selected from the group consisting of: (i) alkyl amines and their corresponding alkyl ammonium salts, containing linear, branched, or cyclic aliphatic groups, having from 1 to 20 carbon atoms; (ii) aryl amines and their corresponding aryl ammonium salts having from 1 to 5 phenyl rings; (iii) alkyl phosphonium salts, containing linear, branched, or cyclic aliphatic groups, having from 1 to 20 carbon atoms; (iv) aryl phosphonium salts, having from 1 to 5 phenyl rings; (v) alkyl organic acids and their corresponding salts, containing linear, branched, or cyclic aliphatic groups, having from 1 to 20 carbon atoms; (vi) aryl organic acids and their corresponding salts, having from 1 to 5 phenyl rings; (vii) aliphatic alcohols, containing linear, branched, or cyclic aliphatic groups, having from 1 to 20 carbon atoms; or (viii) aryl alcohols having from 1 to 5 phenyl rings.

In certain embodiments templating agents are used with the methods disclosed herein, and in other embodiments templating agents are not used with the Methods disclosed herein.

Crystallization of ZIF frameworks of the disclosure can be carried out by maintaining the solution, mixture, or suspension at ambient temperature or by maintaining the solution, mixture, or suspension at an elevated temperature; adding a diluted base to the solution; diffusing the diluted base throughout the solution; and/or transferring the solution to a closed vessel and heating to a predetermined temperature.

In a certain embodiment, crystallization of ZIF frameworks of the disclosure can be improved by adding an additive that promotes nucleation.

In another embodiment, the solution, mixture or suspension is maintained at ambient temperature to allow for crystallization. In yet another embodiment, the solution, mixture, or suspension is heated at an elevated temperature to allow for crystallization. In a certain embodiment, the solution, mixture, or suspension is heated at an elevated temperature up to 200° C. to allow for crystallization. In a yet further embodiment, crystallization of the frameworks can be achieved by heating the frameworks at 65° C. to 130° C. for 36 hours to 12 days. In a further embodiment, activated frameworks can be generated by calcination.

After ZIF frameworks of the disclosure are synthesized, the ZIF frameworks may be further modified by reacting with one or more post framework reactants that may or may not have denticity. In a certain embodiment, the ZIF frameworks as-synthesized are not reacted with a post framework reactant. In another embodiment, the ZIF frameworks as-synthesized are reacted with at least one post framework reactant. In yet another embodiment, the ZIF frameworks as-synthesized are reacted with at least two post framework reactants. In a further embodiment, the ZIF frameworks as-synthesized are reacted with at least one post framework reactant that will result in adding denticity to the framework.

The disclosure provides for chemical reactions that modify, substitute, or eliminate a functional group post-synthesis of a ZIF framework disclosed herein with a post framework. These chemical reactions may use one or more similar or divergent chemical reaction mechanisms depending on the type of functional group and/or post framework reactant used in the reaction. Examples of chemical reaction include, but are not limited to, radical-based, unimolecular nuclephilic substitution (SN1), bimolecular nucleophilic substitution (SN2), unimolecular elimination (E1), bimolecular elimination (E2), E1cB elimination, nucleophilic aromatic substitution (SnAr), nucleophilic internal substitution (SNi), nucleophilic addition, electrophilic addition, oxidation, reduction, cycloaddition, ring closing metathesis (RCM), pericylic, electrocylic, rearrangement, carbene, carbenoid, cross coupling, and degradation.

All the aforementioned linking moieties that possess appropriate reactive functionalities can be chemically transformed by a suitable reactant post framework synthesis to add further functionalities to the pores. By modifying the organic links within the framework post-synthetically, access to functional groups that were previously inaccessible or accessible only through great difficulty and/or cost is possible and facile.

It is yet further contemplated by this disclosure that to enhance chemoselectivity it may be desirable to protect one or more functional groups that would generate unfavorable products upon a chemical reaction desired for another functional group, and then deprotect this protected group after the desired reaction is completed. Employing such a protection/deprotection strategy could be used for one or more functional groups.

Other agents can be added to increase the rate of the reactions disclosed herein, including adding catalysts, bases, and acids.

In another embodiment, a post framework reactant adds at least one effect to a ZIF of the disclosure including, but not limited to, modulating the gas storage ability of a ZIF; modulating the sorption properties of a ZIF; modulating the pore size of a ZIF; modulating the catalytic activity of a ZIF; modulating the conductivity of a ZIF; and modulating the sensitivity of a ZIF to the presence of an analyte of interest. In a further embodiment, a post framework reactant adds at least two effects to a ZIF of the disclosure including, but not limited to, modulating the gas storage ability of a ZIF; modulating the sorption properties of a ZIF; modulating the pore size of a ZIF; modulating the catalytic activity of a ZIF; modulating the conductivity of a ZIF; and modulating the sensitivity of a ZIF to the presence of an analyte of interest.

In one embodiment, a post framework reactant can be a saturated or unsaturated heterocycle.

In another embodiment, a post framework reactant has 1-20 carbons with functional groups including atoms such as N, S, and O.

In yet another embodiment, a post framework reactant is selected to modulate the size of the pores of a ZIF framework disclosed herein.

In another embodiment, a post framework reactant is selected to increase the hydrophobicity of a ZIF framework disclosed herein.

In yet another embodiment, a post framework reactant is selected to modulate gas separation of a ZIF framework disclosed herein. In a certain embodiment, a post framework reactant creates an electric dipole moment on the surface of a ZIF framework of the disclosure when it chelates a metal ion.

In a further embodiment, a post framework reactant is selected to modulate the gas sorption properties of a ZIF framework of the disclosure. In another embodiment, a post framework reactant is selected to promote or increase greenhouse gas sorption of a ZIF framework disclosed herein. In another embodiment, a post framework reactant is selected to promote or increase hydrocarbon gas sorption of a ZIF framework of the disclosure.

In yet a further embodiment, a post framework reactant is selected to increase or add catalytic efficiency to a ZIF framework disclosed herein.

In another embodiment, a post framework reactant is selected so that organometallic complexes can be tethered to a ZIF framework of the disclosure. Such tethered organometallic complexes can be used, for example, as heterogeneous catalysts.

Natural gas is an important fuel gas and it is used extensively as a basic raw material in the petrochemical industry and other chemical process industries. The composition of natural gas varies widely from field to field. Many natural gas reservoirs contain relatively low percentages of hydrocarbons (less than 40%, for example) and high percentages of acid gases, principally carbon dioxide, but also hydrogen sulfide, carbonyl sulfide, carbon disulfide and various mercaptans. Removing acid gases from natural gas recovered from remote national gas fields provides conditioned or sweet, dry natural gas either for delivery to pipelines, natural gas liquids recovery, helium recovery, conversion to liquefied natural gas (LNG), or for subsequent nitrogen rejection. Carbon dioxide is corrosive when in the presence of water. Carbon dioxide freezes to form dry ice under certain temperatures and pressures that can lead to freeze-up problems in pipelines and in cryogenic equipment which are used in processing natural gas. Also, by not contributing to the heating value, carbon dioxide merely adds to the cost of gas transmission.

Moreover, power plants produce a large amount of anthropogenic carbon dioxide as a byproduct of combustion. Removal of the carbon dioxide from the flue exhaust of power plants is commonly accomplished by chilling and pressurizing the exhaust or by passing the fumes through a fluidized bed of aqueous amine solution, both of which are costly and inefficient. Other methods based on chemisorption of carbon dioxide on oxide surfaces or adsorption within porous silicates, carbon, and membranes have been pursued as means for carbon dioxide uptake. However, in order for an effective adsorption medium to have long term viability in carbon dioxide removal it should combine two features: (i) a periodic structure for which carbon dioxide uptake and release is fully reversible, and (ii) a flexibility with which chemical functionalization and molecular level fine-tuning can be achieved for optimized uptake capacities.

A number of processes for the recovery or removal of carbon dioxide from gas steams have been proposed and practiced on a commercial scale. The processes vary widely, but generally involve some form of solvent absorption, adsorption on a porous adsorbent, distillation, or diffusion through a semipermeable membrane.

In one embodiment, a gas separation material comprising one or more ZIF frameworks disclosed herein is provided. Advantageously, a ZIF framework disclosed herein includes one or more sites for sorption of one or more select gas molecules resulting in separation of these gas molecules from a multicomponent gas. Furthermore, gases that may be separated by one or more ZIF frameworks disclosed herein include gas molecules comprising available electron density for attachment to the one or more sites on the surface area of a pore or interpenetrating porous network. Such electron density includes molecules having multiple bonds between two atoms contained therein or molecules having a lone pair of electrons. Suitable examples of such gases include, but are not limited to, the gases comprising a component selected from the group consisting of ammonia, argon, carbon dioxide, hydrogen sulfide, carbonyl sulfide, carbon disulfide, mercaptans, carbon monoxide, hydrogen, methane and combinations thereof. In one embodiment, one or more ZIF frameworks disclosed herein can be used to separate one or more component gases from a multi-component gas mixture. In a certain embodiment, one or more ZIF frameworks disclosed herein can be used to separate one or more gases with high electron density from a gas mixture. In another embodiment, one or more ZIF frameworks disclosed herein can be used to separate one or more gases with high electron density from one or more gases with low electron density.

In one embodiment, one or more ZIF frameworks disclosed herein are part of a device. In one embodiment, a gas separation device comprises one or more ZIF frameworks of the disclosure. In a further embodiment, a gas separation device used to separate one or more component gases from a multi-component gas mixture comprises one or more ZIF frameworks disclosed herein. In a certain embodiment, a gas separation device used to separate one or more gases with high electron density from gas mixture comprises one or more ZIF frameworks of the disclosure. In a further embodiment, a gas separation device used to separate one or more gases with high electron density from one or more low density gases comprises one or more ZIF frameworks of the disclosure.

In one embodiment of the disclosure, a gas storage material comprising one more ZIF frameworks disclosed herein is provided. A gas that may be stored or separated by the methods, compositions and systems of the disclosure includes gas molecules comprising available electron density for attachment to the one or more sites. Such electron density includes molecules having multiple bonds between two atoms contained therein or molecules having a lone pair of electrons. Suitable examples of such gases include, but are not limited to, the gases comprising a component selected from the group consisting of ammonia, argon, hydrogen sulfide, carbon dioxide, hydrogen sulfide, carbonyl sulfide, carbon disulfide, mercaptans, carbon monoxide, and combinations thereof. In particularly useful variation, a gas binding material is a carbon dioxide binding material that may be used to separate carbon dioxide from a gaseous mixture. In a particularly useful variation a gas storage material is a hydrogen storage material that is used to store hydrogen ($H_2$). In another particularly useful variation, a gas storage material is a carbon dioxide storage material that may be used to separate carbon dioxide from a gaseous mixture.

In yet a further embodiment, one or more ZIF frameworks disclosed herein can be used to separate and/or store one or more gases selected from the group comprising carbon monoxide, carbon dioxide, hydrogen sulfide, carbonyl sulfide, carbon disulfide, mercaptans, nitrous oxide, and ozone.

In another embodiment, one or more ZIF frameworks disclosed herein can be used to separate and/or store one or more gases selected from the group comprising carbon monoxide, carbon dioxide, hydrogen sulfide, carbonyl sulfide, carbon disulfide, and mercaptans.

In yet another embodiment, one or more ZIF frameworks disclosed herein can be used to separate and/or store carbon monoxide or carbon dioxide.

In a certain embodiment, one or more ZIF frameworks disclosed herein can be used to separate and/or store carbon dioxide.

In one embodiment, one or more ZIF frameworks disclosed herein can be used to separate and/or store hydrogen.

In one embodiment, a gas storage device comprises one or more ZIF frameworks disclosed herein. In a further embodiment, a gas storage device used to adsorb and/or absorb one or more component gases from a multi-component gas mixture comprises one or more ZIF frameworks disclosed herein. In a certain embodiment, a gas storage device used to adsorb and/or absorb one or more gases with high electron density from gas mixture comprises one or more ZIF frameworks disclosed herein. In a further embodiment, a gas storage device used to adsorb and/or absorb one or more gases with high electron density from one or more low density gases comprises one or more ZIF frameworks disclosed herein.

The disclosure also provides methods using ZIF frameworks disclosed herein. In a certain embodiment, a method to separate or store one or more gases comprises contacting one or more gases with one or more ZIF frameworks disclosed herein. In a further embodiment, a method to separate or store one or more gases from a mixed gas mixture comprises contacting the gas mixture with one or more ZIF frameworks disclosed herein. In a yet further embodiment, a method to separate or store one or more high electron density gases from a mixed gas mixture comprises contacting the gas mixture with one or more ZIF frameworks disclosed herein. In a certain embodiment, a method to separate or store one or more gases from a fuel gas stream comprises contacting the fuel gas stream with one or more ZIF frameworks disclosed herein. In a further embodiment, a method to separate or store one or more acid gases from a natural gas stream comprises contacting the natural gas stream with one or more ZIF frameworks disclosed herein. In yet another embodiment, a method to separate or store one or more gases from the exhaust of a combustion engine comprises contacting the exhaust with one or more ZIF frameworks disclosed herein. In a certain embodiment, a method to separate or store one or more gases from flue-gas comprises contacting the flue-gas with one or more ZIF frameworks disclosed herein.

One or more ZIF frameworks of the disclosure can also comprise part of a gas separation and/or a gas storage device. These devices for gas separation and/or gas storage can be used for industrial or nonindustrial purposes, or a combination thereof. Examples of gas separation and/or gas storage devices include, but are not limited to, purifiers, filters, scrubbers, pressure swing adsorption devices, molecular sieves, hollow fiber membranes, ceramic membranes, cryogenic air separation devices, and hybrid gas separation devices. In one embodiment, gas separation and/or gas storage devices comprising one or more ZIF frameworks of the disclosure can be used to purify fuel gas streams, air, flue-gas emissions, and/or waste emissions from combustion engines. In another embodiment, one or more ZIF frameworks disclosed herein can comprise gas separation and/or gas storage devices designed to remove and/or store greenhouse gases, such as carbon dioxide, ozone, nitrous oxide, and fluorocarbons. In a certain embodiment, one or more ZIF frameworks disclosed herein can comprise gas separation and/or gas storage devices designed to remove and/or store environmental pollutants, such as formaldehyde, diisocyanates, trichloroethylene, and benzene.

In a certain embodiment, an air purification device comprises one or more ZIF frameworks disclosed herein. In a further embodiment, a device used to remove and/or store contaminants from fuel gas comprises one or more ZIF frameworks disclosed herein. In yet a further embodiment, a device used to remove and/or store environmentally harmful gases from flue gas emissions comprises one or more ZIF frameworks disclosed herein. In a certain embodiment, a device used to remove and/or store environmentally harmful gases or gaseous vapors from air comprises one or more ZIF frameworks disclosed herein. In a further embodiment, a device used to remove and/or store greenhouse gases comprises one or more ZIF frameworks disclosed herein. In a yet further embodiment, a device for use to prevent buildups of one or more hazardous gases in mining comprises one or more ZIF frameworks disclosed herein. In a yet further embodiment, a device for use to remove and/or store one or more gases from emissions of a combustion engine comprises one or more ZIF frameworks disclosed herein.

The disclosure provides an apparatus and method for separating one or more components from a multi-component gas using a separation system having a feed side and an effluent side separated by one or more ZIF frameworks of the disclosure. The ZIF framework may comprise a column separation format.

"Natural gas" refers to a multi-component gas obtained from a crude oil well (associated gas) or from a subterranean gas-bearing formation (non-associated gas). The composition and pressure of natural gas can vary significantly. A typical natural gas stream contains methane as a significant component. The natural gas will also typically contain ethane, higher molecular weight hydrocarbons, one or more acid gases (such as carbon dioxide, hydrogen sulfide, carbonyl sulfide, carbon disulfide, and mercaptans), and minor amounts of contaminants such as water, nitrogen, iron sulfide, wax, and crude oil.

The disclosure is particularly suitable for treatment of natural gas streams containing one or more contaminants such as carbon dioxide, hydrogen sulfide, and water vapor. The disclosure, however, is not limited to treatment of natural gas. One or more ZIF frameworks and methods disclosed herein can be used to separate a one or more gas components of a multi-component gas.

In a certain embodiment, one or more ZIF frameworks disclosed herein can be used to separate and/or store one or more gases from a natural gas stream. In another embodiment, one or more ZIF frameworks disclosed herein can be used to separate and/or store one or more acid gases from a natural gas stream. In yet another embodiment, one or more ZIF frameworks disclosed herein can be used to separate and/or store one or more gases from a town gas stream. In yet another embodiment, one or more ZIF frameworks disclosed herein can be used to separate and/or store one or more gases of a biogas stream. In yet another embodiment, one or more ZIF frameworks disclosed herein can be used to separate and/or store one or more gases from a syngas stream.

Sorption is a general term that refers to a process resulting in the association of atoms or molecules with a target material. Sorption includes both adsorption and absorption. Absorption refers to a process in which atoms or molecules move into the bulk of a porous material, such as the absorption of water by a sponge. Adsorption refers to a process in which atoms or molecules move from a bulk phase (that is, solid, liquid, or gas) onto a solid or liquid surface. The term adsorption may be used in the context of solid surfaces in contact with liquids and gases. Molecules that have been adsorbed onto solid surfaces are referred to generically as adsorbates, and the surface to which they are adsorbed as the substrate or adsorbent. Adsorption is usually described through isotherms, that is, functions which connect the amount of adsorbate on the adsorbent, with its pressure (if gas) or concentration (if liquid). In general, desorption refers to the reverse of adsorption, and is a process in which molecules adsorbed on a surface are transferred back into a bulk phase.

These materials would be used as standard ZIF frameworks for sorption instruments, and obtained results would be helpful to improve various industrial plants (i.e. separation or recovery of chemical substance).

In a variation of this embodiment, the gaseous storage site comprises a pore in a ZIF framework disclosed herein which is functionalized with a group having a desired size or charge. In a refinement, this activation involves removing one or more chemical moieties (guest molecules) from a ZIF framework of the disclosure. Typically, such guest molecules include species such as water, solvent molecules contained within a ZIF framework disclosed herein, and other chemical moieties having electron density available for attachment.

One or more ZIF frameworks used in the embodiments of the disclosure include a plurality of pores for gas adsorption. In one variation, the plurality of pores has a unimodal size distribution. In another variation, the plurality of pores have a multimodal (e.g., bimodal) size distribution.

The disclosure also provides chemical sensors (e.g. resistometric sensors) capable of sensing the presence of an analyte of interest. There is considerable interest in developing sensors that act as analogs of the mammalian olfactory system. However, many of such sensor systems are easily contaminated. The porous structures of the disclosure provide a defined interaction area that limits the ability of contaminate to contact a sensor material the passes through the porous structure of one or more ZIF frameworks of the disclosure. For example, various polymers are used in sensor systems including conductive polymers (e.g., poly(anilines) and polythiophenes), composites of conductive polymers and non-conductive polymers and composites of conductive materials and non-conductive materials. In resistometric systems conductive leads are separated by the conductive material such that a current traverse between the leads and through the sensor material. Upon binding to an analyte, the resistance in the material changes and detectable signal is thus generated. Using a ZIF framework of the disclosure, the area surrounding the sensor material is limited and serves as a "filter" to limit contaminants from contacting the sensor material, thus increasing sensor specificity.

In a certain embodiment, a carbon monoxide detector comprises one or more ZIF frameworks of the disclosure. In another embodiment, a combustible gas detector comprises one or more ZIF frameworks disclosed herein. In a further embodiment, a device used to measure vehicle emissions comprises one or more ZIF frameworks of the disclosure.

The disclosure further provides for ZIF framework catalysts comprising one or more ZIF frameworks of the disclosure. One or more ZIF frameworks of the disclosure, as crystalline material or as molding, can be used in the catalytic conversion of organic molecules. Reactions of this type are, for example, oxidations, the epoxidation of olefins, e.g. the preparation of propylene oxide from propylene and $H_2O_2$ the hydroxylation of aromatics, e.g. the preparation of hydroquinone from phenol and $H_2O_2$ or the conversion of toluene into cresol, the conversion of alkanes into alcohols, aldehydes and acids, isomerization, reactions, for example the conversion of epoxides into aldehydes.

The invention is illustrated in the following examples, which are provided by way of illustration and are not intended to be limiting.

EXAMPLE

Synthetic procedures and characterization of ZIFs. Imidazole (HIm), benzimidazole (HbIm), 5-chlorobenzimidazole (HcbIm), 5-methylbenzimidazole (HmbIm), 6-bromobenzimidazole (HbbIm), 6-nitrobenzimidazole (HnbIm), 2-nitroimidazole (HnIm), 4-nitroimidazole (H4nIm), Imidazole-2-carboxaldehyde (aIm), 2-methylimidazole (HmIm), zinc (II) nitrate tetrahydrate [$Zn(NO_3)_2 \cdot 4H_2O$], zinc (II) trifluoromethanesulfonate [$Zn(CF_3SO_3)_2$], anhydrous N,N-dimethylformamide (DMF), anhydrous acetone and methanol were purchased from commercial source and were used directly without further purification. N,N-Diethylformamide (DEF) was obtained from BASF, which was stirred with activated carbon before treating with a solvent purification system.

All the synthetic procedures were conducted in open air unless otherwise noted. The ZIFs were activated by the following procedure: Firstly, the as-synthesized crystalline material was immersed in DMF for three days, three times per day; then exchanged with anhydrous acetone or methanol for three days, three times per day. After that, the solvent-exchanged ZIFs were fully exchanged with liquid $CO_2$ six times, and further kept under supercritical $CO_2$ atmosphere for 1 h before being bled using a Tousimis Samdri PVT-3D critical point dryer. The samples were finally evacuated to remove guest molecules under vacuum (0.01 Torr) at ambient temperature for 4 h, then at elaborated temperature of 50° C. for 4 h, 100° C. for 4 h, 150° C. for 4 h and finally 180° C. for 12 h to give the activated sample. The following measurements were all conducted using the activated samples for each ZIF unless otherwise noted.

Elemental analyses (EA) of activated ZIFs were performed using a Perkin Elmer 2400 Series II CHNS elemental analyzer; $^1$H NMR spectra for digested solutions of ZIFs were acquired on a Bruker AVB-400 NMR spectrometer, with chemical shifts of imidazoles identified by comparing with spectra for each pure linker, samples (ca. 10 mg for each) were dissolved in DMSO-$d_6$ (deuterated dimethyl sulfoxide, 580 μL) and 20% DCl in $D_2O$ (20 μL) with sonications; attenuated-total-reflectance Fourier-transform infrared (ATR-FTIR) spectra of neat ZIFs were recorded on a Bruker ALPHA Platinum ATR-FTIR Spectrometer.

ZIF-128 (hyk), $Zn(mbIm)_{1.23}(bbIm)_{0.77}(DMF)_{0.05}$. A mixture of $Zn(NO_3)_2 \cdot 4H_2O$ (0.04 mmol, 0.2 mL of 0.2 M stock solution in DMF), HmbIm (0.2 mmol, 1 mL of 0.2 M stock solution in DMF), HbbIm (0.2 mmol, 1 mL of 0.2 M stock solution in DMF) and 70 uL water was sealed in a 4-mL glass vial and heated at 130° C. for 96 h. Transparent crystals were collected and washed with anhydrous DMF (3×4 ml). (Yield: 72% based on Zn). EA: Calcd. for $Zn(C_8H_7N_2)_{1.23}(C_7H_4N_2Br)_{0.77}(C_3H_7NO)_{0.05}$: C, 48.45; H, 3.18; N, 14.88%. Found: C, 40.98; H, 2.44; N, 22.91%. ATR-FTIR (4000-400 cm$^{-1}$): 1603(w), 1469(s, br), 1340 (m), 1286(m), 1240(s), 1203(m), 1180(m), 1141(w), 1130 (m), 1052(w), 1017(w), 944(w), 917(m), 857(w), 0.822 (w), 798(s), 760 (m), 703(m), 648(s), 585 (m), 468(s), 423(s).

ZIF-412 (ucb), $Zn_3(nIm)_{1.85}(Im)_{0.75}(bIm)_{3.40}$. A mixture of $Zn(NO_3)_2 \cdot 4H_2O$ (0.1 mmol, 0.5 mL of 0.2 M stock solution in DMF), HnIm (0.3 mmol, 1.5 mL of 0.2 M stock solution in DMF), HIm (0.1 mmol, 0.5 mL of 0.2 M stock solution in DMF), and HbIM (0.2 mmol, 1.0 mL of 0.2 M stock solution in DMF) was sealed in a 4-mL glass vial and heated at 115° C. for 48 hours. Transparent polyhedral crystals were collected from the wall and washed with anhydrous DMF (3×4 mL), crystals suitable for single crystal X-ray analysis could be obtained with lower concentration (1 mL more DMF added) and elongated reaction time (7 days) in 20 mL vial. (Yield: 46% based on Zn). EA: Calcd. for $Zn_3(C_3H_2N_3O_2)_{1.85}$ $(C_3H_3N_2)_{0.75}$ $(C_7H_5N_2)_{3.40}$: C, 44.55; H, 2.71; N, 22.77%. Found: C, 43.30; H, 2.62; N, 22.76%. ATR-FTIR (4000-400 cm$^{-1}$): 1612(w), 1541(w), 1476(s), 1367(s), 1301(m), 1278 (m), 1244(s), 1198 (s), 1175(w), 1119(m), 1092 (w), 1005 (m), 952(m), 909(m), 831(w), 794(w), 776(m), 740(s), 670(w), 650(m), 573(w), 552 (w), 464 (m), 425 (m).

ZIF-413 (ucb), $Zn_3(nIM)_{1.90}(IM)(mbIM)_{3.10}$. A mixture of $Zn(NO_3)_2 \cdot 4H_2O$ (0.1 mmol, 0.5 mL of 0.2 M stock solution in DMF), HnIM (0.3 mmol, 1.5 mL of 0.2 M stock solution in DMF), HIM (0.1 mmol, 0.5 mL of 0.2 M stock solution in DMF), and HmbIM (0.2 mmol, 1.0 mL of 0.2 M stock solution in DMF) was sealed in a 4-mL glass vial and heated at 120° C. for 72 h. Transparent octahedral crystals were collected and washed with anhydrous DMF (3×4 mL). Crystals suitable for single-crystal X-ray analysis could be obtained with elongated reaction time (7 days). (Yield: 43% based on Zn). EA: Calcd. for $Zn_3$ $(C_3H_2N_3O_2)_{1.90}(C_3H_3N_2)$ $(C_8H_7N_2)_{3.10}$: C, 45.58; H, 3.25; N, 22.06%. Found: C, 44.83; H, 3.16; N, 21.80%. ATR-FTIR (4000-400 cm$_{-1}$): 1620(w), 1539(m), 1473(s), 1366(s), 1290(s), 1243(s), 1205(s), 1173(s), 1143(w), 1131(m), 1091(s), 1021(w), 950(s), 830(s), 824(s), 799(s), 761(s), 668(m), 652(s), 625 (m), 604(m), 572(m), 495(m), 468 (s), 427 (s).

ZIF-414 (ucb), $Zn_3(mIM)_{1.85}(IM)_{1.40}(nbIM)_{2.75}$. A mixture of $Zn(NO_3)_2 \cdot 4H_2O$ (0.1 mmol, 0.5 mL of 0.2 M stock solution in DMF), HmIM (0.3 mmol, 1.5 mL of 0.2 M stock solution in DMF), HIM (0.075 mmol, 0.375 mL of 0.2 M stock solution in DMF), and HnbIM (0.225 mmol, 1.125 mL of 0.2 M stock solution in DMF) was sealed in a 4-mL glass vial and heated at 130° C. for 36 h, then cool down to room temperature at 0.1° C./min. Transparent octahedral crystals were collected by sonication and washed with anhydrous DMF (3×4 ml). (Yield: 50% based on Zn). EA: Calcd. for $Zn_3$ $(C_4H_5N_2)_{1.85}$ $(C_3H_3N_2)_{1.40}$ $(C_7H_4N_3O_2)_{2.75}$: C, 41.82; H, 2.78; N, 23.32%. Found: C, 40.98; H, 2.44; N, 22.91%. ATR-FTIR (4000-400 cm$^{-1}$): 1615 (w), 1591(w), 1518 (m), 1463(m), 1443(w), 1425 (w), 1378 (w), 1343(s), 1289(s), 1257(w), 1234(m), 1196(w), 1182(w), 1146(w), 1127(w), 1069(s), 994(w), 949(m), 886(w), 0.823(w), 796(s), 757(m), 736(s), 709(m), 689(w), 670(m), 648(w), 594(w), 544(w), 424(s).

ZIF-418 (GME), $Zn(aIM)_{0.90}(cbIM)_{1.10}$. A mixture of $Zn(CF_3SO_3)_2$ (0.2 mmol, 1 mL of 0.2 M stock solution in DMF), HaIM (0.2 mmol, 1 mL of 0.2 M stock solution in DMF), and HcbIM (0.3 mmol, 1.5 mL of 0.2 M stock solution in DMF) was sealed in a 4-mL glass vial and heated at 85° C. for 96 h. Transparent hexagonal plate crystals were collected and washed with anhydrous DMF (3×4 ml). (Yield: 15% based on Zn). EA: Calcd. for $Zn(C_4H_3N_2O)_{0.90}(C_7H_4N_2Cl)_{1.10}$: C, 42.72; H, 2.25; N, 17.64%. Found: C, 41.92; H, 2.15; N, 17.60%. ATR-FTIR (4000-400 cm$^{-1}$): 1680 (br), 1609(w), 1574 (w), 1460 (br), 1415(s), 1360 (m), 1340 (w), 1323(w), 1287(w), 1238 (m), 1190(s), 1169(s), 1128(w), 1063(m), 953(m), 928(m), 852(w), 789 (br), 758(w), 723(s), 700 (w), 648 (w), 598(s), 533(w), 481(s), 425(s).

ZIF-516 (ucb), $Zn_3(mIm)_{1.85}(Im)_{1.40}(nbIm)_{2.75}$. A mixture of $Zn(NO_3)_2\cdot 4H_2O$ (0.04 mmol, 0.2 mL of 0.2 M stock solution in DMF), HnIm (0.06 mmol, 0.3 mL of 0.2 M stock solution in DMF), HIm (0.06 mmol, 0.3 mL of 0.2 M stock solution in DMF), and HnbIm (0.14 mmol, 0.7 mL of 0.2 M stock solution in DMF) was sealed in a 4-mL glass vial and heated at 130° C. for 96 h. Transparent octahedral crystals were collected and washed with anhydrous DMF (3×4 ml).

ZIF-585 (CHA), $Zn(nIM)_{0.30}(IM)(cbIM)_{0.70}$. A mixture of $Zn(NO_3)_2\cdot 4H_2O$ (0.1 mmol, 0.5 mL of 0.2M stock solution in DMF), HnIM (0.1 mmol, 0.5 mL of 0.2 M stock solution in DMF), HIM (0.2 mmol, 1.0 mL of 0.2 M stock solution in DMF), and HcbIM (0.1 mmol, 0.5 mL of 0.2 M stock solution in DMF) was sealed in a 4-mL glass vial and heated at 120° C. for 72 h. Yellow hexagonal plate crystals were collected and washed with anhydrous DMF (3×4 ml). (Yield: 49% based on Zn). EA: Calcd. for $Zn(C_3H_2N_3O_2)_{0.30}(C_3H_3N_2)(C_7H_4N_2Cl)_{0.70}$: C, 38.83; H, 2.37; N, 22.13%. Found: C, 37.86; H, 2.25; N, 23.11%. ATR-FTIR (4000-400 cm$^{-1}$): 1608 (w), 1574 (w), 1539(w), 1494(s), 1472(s), 1435 (m), 1365(s), 1341(m), 1321(w), 1288 (m), 1238 (m), 1192 (m), 1171(s), 1126(w), 1088(s), 1062(m), 1013(w), 978(w), 953(s), 928(m), 832(m), 801(s), 756(s), 723(m), 669(m), 649(m), 598(m), 571(w), 482 (m), 425 (m).

ZIF-636 (AFX), $Zn_2(nIM)_{1.40}(IM)\,0.90(nbIM)_{1.70}$. A mixture of $Zn(NO_3)_2\cdot 4H_2O$ (0.1 mmol, 0.5 mL of 0.2 M stock solution in DMF), HnIM (0.3 mmol, 1.5 mL of 0.2 M stock solution in DMF), HIM (0.1 mmol, 0.5 mL of 0.2 M stock solution in DMF), and HnbIM (0.2 mmol, 1.0 mL of 0.2 M stock solution in DMF) was sealed in a 4-mL glass vial and heated at 120° C. for 72 h. Yellow hexagonal plate crystals were collected and washed with anhydrous DMF (3×4 ml). (Yield: 38% based on Zn). EA: Calcd. for $Zn_2(C_3H_2N_3O_2)_{1.40}(C_3H_3N_2)_{0.90}(C_7H_4N_3O_2)_{1.70}$: C, 36.21; H, 1.99; N, 24.93%. Found: C, 35.33; H, 2.02; N, 24.37%. ATR-FTIR (4000-400 cm$^{-1}$): 1649(m), 1615 (m), 1591(w), 1518(s), 1496(s), 1475(s), 1412(w), 1364(s), 1343(s), 1305(s), 1290(s), 1258(w), 1235 (m), 1196(m), 1171(s), 1126(m), 1091(s), 1068 (m), 1012 (m), 981(w), 950(s), 885(m), 831(s), 795(s), 763(m), 736(s), 709(m), 668(m), 654(m), 623(w), 595(m), 573(m), 543(m), 503(w), 467(w), 450 (m), 424 (m).

ZIF-640 (GME), $Zn(mIM)_{0.65}(IM)_{1.15}(nbIM)_{0.20}$. A mixture of $Zn(NO_3)_2\cdot 4H_2O$ (0.12 mmol, 0.6 mL of 0.2 M stock solution in DMF), HmIM (0.3 mmol, 1.5 mL of 0.2 M stock solution in DMF), HIM (0.24 mmol, 1.2 mL of 0.2 M stock solution in DMF), and HnbIM (0.06 mmol, 0.3 mL of 0.2 M stock solution in DMF) was sealed in a 4-mL glass vial and heated at 130° C. for 48 h. Transparent hexagonal crystals were collected by sonication and washed with anhydrous DMF (3×4 ml). (Yield: 38% based on Zn). EA: Calcd. for $Zn(C_4H_5N_2)_{0.65}(C_3H_3N_2)_{1.15}(C_7H_4N_3O_2)_{0.20}$: C, 39.30; H, 3.32; N, 25.84%. Found: C, 39.32; H, 3.09; N, 25.68%. ATR-FTIR (4000-400 cm$^{-1}$): 1614 (w), 1591_w), 1514 (w), 1500(w), 1476(m), 1462 (w), 1422 (w), 1379(w), 1346(m), 1307(w), 1292(w), 1243(m), 1198(w), 1173(m), 1144 (m), 1088(s), 993(w), 954(s), 840 (w), 797 (w), 753(s), 737(m), 709(w), 691(w), 670(s), 594 (w), 544 (w), 484 (w), 451(w), 422(s).

ZIF-723 (cjh48), $Zn(4-nIm)_{0.95}(cbIm)_{1.05}$. A mixture of $Zn(NO_3)_2\cdot 4H_2O$ (0.08 mmol, 0.4 mL of 0.2 M stock solution in DMF), 4-HnIm (0.12 mmol, 0.6 mL of 0.2 M stock solution in DMF), and HcbIm (0.08 mmol, 0.4 mL of 0.2 M stock solution in DMF) was sealed in a 4-mL glass vial and heated at 130° C. for 96 h. needle crystals were collected and washed with anhydrous DMF (3×4 ml). (Yield: 38% based on Zn). EA: Calcd. for $Zn(C_3H_2N_3O_2)_{0.95}(C_7H_4N_2Cl)_{1.05}$: C, 37.01; H, 1.86; N, 20.95%. Found: C, 40.98; H, 2.44; N, 22.91%. ATR-FTIR (4000-400 cm$^{-1}$): 1610 (w), 1575 (w), 1534 (m), 1513(m), 1470(s), 1381(s), 1368(s), 1340 (m), 1287(m), 1245(s), 1219(w), 1191(m), 1107(s), 1064(m), 1036(m), 974(w), 0.928(m), 852(s), 824(s), 800(s), 752(m), 724(m), 665(s), 648(m), 598(m), 482(m), 424(m).

ZIF-725 (KFI), $Zn(nIM)_{0.70}(IM)_{0.30}(bIM)$. A mixture of $Zn(NO_3)_2\cdot 4H_2O$ (0.1 mmol, 0.5 mL of 0.2 M stock solution in DEF), HnIM (0.3 mmol, 1.5 mL of 0.2 M stock solution in DEF), HIM (0.1 mmol, 0.5 mL of 0.2 M stock solution in DEF), and HbIM (0.2 mmol, 1.0 mL of 0.2 M stock solution in DEF) was sealed in a 4-mL glass vial and heated at 100° C. for 72 h. Transparent trigonal prism crystals were collected from the wall and washed with anhydrous DEF (3×4 ml). Bulk syntheses were carried out in a Nalgene plastic bottle. (Yield: 38% based on Zn). EA: Calcd. for $Zn(C_3H_2N_3O_2)\,0.70\,(C_3H_3N_2)\,0.30\,(C_7H_5N_2)$: C, 42.73; H, 2.62; N, 23.42%. Found: C, 39.39; H, 2.48; N, 22.72%. ATR-FTIR (4000-400 cm$^{-1}$): 1611(m), 1539(m), 1476(s), 1364(s), 1301(m), 1278 (m), 1244(s), 1198 (w), 1173(s), 1118 (w), 1091(s), 1005 (w), 952(s), 908(s), 831(s), 793(m), 775(m), 740(s), 668(w), 651(s), 572 (m), 552 (m), 464(s), 427(s).

ZIF-726 (KFI), $Zn(nIM)_{0.60}(IM)_{0.45}(cbIM)_{0.95}$. A mixture of $Zn(NO_3)_2\cdot 4H_2O$ (0.1 mmol, 0.5 mL of 0.2 M stock solution in DEF), HnIM (0.3 mmol, 1.5 mL of 0.2 M stock solution in DEF), HIM (0.1 mmol, 0.5 mL of 0.2 M stock solution in DEF), and HcbIM (0.2 mmol, 1.0 mL of 0.2 M stock solution in DEF) was sealed in a 4-mL glass vial and heated at 100° C. for 72 h. Transparent trigonal prism crystals were collected from the wall and washed with anhydrous DEF (3×4 ml). Bulk syntheses were carried out in a Nalgene plastic bottle. (Yield: 34% based on Zn). EA: Calcd. for $Zn(C_3H_2N_3O_2)_{0.60}(C_3H_3N_2)_{0.45}(C_7H_4N_2Cl)_{0.95}$: C, 38.36; H, 2.09; N, 21.00%. Found: C, 35.90; H, 2.01; N, 20.67%. ATR-FTIR (4000-400 cm$^{-1}$): 1644 (w), 1610 (w), 1537(w), 1471(s), 1360(s), 1287 (m), 1253(w), 1238(m), 1192 (w), 1172(s), 1125 (w), 1090(s), 1063(m), 951(s), 927(s), 852(w), 831(s), 800(s), 757(m), 723(s), 668(w), 650(s), 598(s), 571(m), 512(w), 481(s), 459(w), 425(s).

ZIF-740 (bam), $Zn_2(nIM)_{0.80}(IM)_{0.50}(bbIM)_{2.70}$. A mixture of $Zn(NO_3)_2\cdot 4H_2O$ (0.1 mmol, 0.5 mL of 0.2 M stock solution in DMF), HnIM (0.085 mmol, 0.425 mL of 0.2 M stock solution in DMF), HIM (0.1 mmol, 0.5 mL of 0.2 M stock solution in DMF), and HbbIM (0.4 mmol, 2.0 mL of 0.2 M stock solution in DMF) was sealed in a 4-mL glass vial and heated at 65° C. for 12 days. Colorless rod-shaped crystals were collected and washed with anhydrous DMF (3×4 ml). (Yield: 19% based on Zn). EA: Calcd. for $Zn_2$ (C$_3$H$_2$N$_3$O$_2$)$_{0.80}$ (C$_3$H$_3$N$_2$)$_{0.50}$ (C$_7$H$_4$N$_2$Br)$_{2.70}$: C, 34.96; H, 1.79; N, 15.74%. Found C, 34.80; H, 1.57; N, 15.35%. ATR-FTIR (4000-400 cm$^{-1}$): 1604 (m), 1572 (w), 1537 (w), 1494(s), 1471(s), 1431(m), 1365(s), 1339(s), 1287(s), 1250(s), 1238(s), 1187(s), 1135(s), 1129(m), 1092 (s), 1052(s), 1013(w), 952 (m), 918(s), 852 (m), 831(m), 793(s), 757(m), 705(s), 669(m), 648(s), 586(s), 478(s), 423(s).

ZIF-813 (LTA), Zn(mIM)$_{0.25}$ (IM)$_{1.50}$(nbIM)$_{0.25}$. A mixture of Zn(NO$_3$)$_2$·4H$_2$O (0.14 mmol, 0.7 mL of 0.2 M stock solution in DMF), HmIM (0.3 mmol, 1.5 mL of 0.2 M stock solution in DMF), HIM (0.1 mmol, 0.5 mL of 0.2 M stock solution in DMF), and HnbIM (0.2 mmol, 1.0 mL of 0.2 M stock solution in DMF) was sealed in a 4-mL glass vial and heated at 130° C. for 72 h, then cool down to room temperature. Transparent octahedral crystals (ucb ZIF-414) and brown cubic crystals were found on the wall, the cubic crystals were collected and analyzed by Single crystal X-ray diffraction as ZIF-813. This ZIF was not purified, only single-crystal X-ray diffraction data was obtained and the chemical composition was estimated from single-crystal data.

X-ray single-crystal and powder diffraction studies. Single crystal X-ray diffraction data was used to determine the connectivity and topology of the ZIFs, and was collected using a combination of synchrotron radiation on beamline 11.3.1 at the Advanced Light Source (ALS) at Lawrence Berkeley National Lab, a Bruker D8-Venture diffractometer and a Bruker MicroSTAR-H APEX II diffractometer. The resolution obtained for all samples was limited due to inherent disorder in the crystals. This resulted in poorly resolved reflections at higher resolution, so the data was cut to improve refinement of the models. However, the resolution was still sufficient to locate electron density peaks in the difference map to establish the connectivity of the structures. Data from NMR and elemental analysis were used as a starting point for the occupancies of functionalized imidazolates except for ZIF-813, which could not be purified. For all structures, all non-hydrogen atoms, in particular the positions of functional groups on the imidazole rings, were located using the difference map during refinement. Typically, the restraints and constraints used on the refined model include rigid group restraints such as restraining phenyl and imidazolate rings to be planar with the appropriate distances applied from other known structure models, and rigid-bond restraints which are derived from a sound chemical basis. See the individual description for each ZIF and their corresponding CIFs for further details.

Samples were mounted on MiTeGen® kapton loops and placed in a 100(2) K nitrogen cold stream unless otherwise specified. Beamline 11.3.1 is equipped with a PHOTON100 CMOS detector operating in shutterless mode equipped, and the radiation is monochromated using silicon(111). The Bruker D8-Venture diffractometer is equipped with Mo- ($\lambda$=0.71073 Å) and Cu-target ($\lambda$=1.54184 Å) micro-focus X-ray tubes and a PHOTON 100 CMOS detector, operated at 50 kW and 1 mA. The Bruker MicroSTAR-H APEX II diffractometer [small molecule X-ray crystallography facility (CheXray) in College of Chemistry at UC Berkeley] is equipped with a CCD area detector using micro-focus rotating anode X-ray source with a Cu-target ($\lambda$=1.54184 Å).

In all cases, the data were processed with the Bruker APEX2 software package which were integrated using SAINT and corrected for the absorption by SADABS routines (no correction was made for extinction or decay). ZIF-585 was processed as a two-domain twin using TWIN-ABS. The structures were solved by intrinsic phasing (SHELXT) and refined by full-matrix least squares on F$^2$ (SHELXL-2014). All non-hydrogen atoms were refined anisotropically. Hydrogen atoms were geometrically calculated and refined as riding atoms. In all structures, highly disordered guest molecules occupying the cavities of the structure, which could not be modeled and so were accounted for using solvent masking using the Olex2 software package, except for ZIF-585 where SQUEEZE in PLATON's software package was used.

X-ray single-crystal and powder diffraction studies. Single-crystal X-ray diffraction (SXRD) data for all ZIFs were obtained by using as-synthesized crystals. Data for ZIF-412, 413, 414, 585, 640, 725, 726, 740 were collected at beamline 11.3.1 of Advanced Light Source (ALS) equipped with a Bruker Photon 100 CMOS area detector using synchrotron radiation (10-17 KeV); data for ZIF-418, 636 were collected on a Bruker MicroStart diffractometer equipped with a CCD area detector using rotating-anode Cu K$\alpha$ radiation ($\lambda$=1.54184 Å); data for ZIF-813 was collected on a Bruker D8 Venture diffractometer equipped with a CMOS area detector using micro-focus Cu K$\alpha$ radiation ($\lambda$=1.54184 Å). Additional structural figures with probability ellipsoids are provided. Powder X-ray diffraction (PXRD) analyses were conducted on a Bruker D8 Advance diffractometer with Cu K$\alpha$ radiation ($\lambda$=1.54056 Å).

ZIF-412 (ucb) crystallized in the cubic Fm$\bar{3}$m (No. 225) space group, a=b=c=72.205(2) Å, V=376445(31) Å$^3$. Total reflections, 270972; independent reflections, 4845; R$_1$=0.0434; wR$_2$=0.1503; S=1.081. A colorless block-shaped (100 μm×120 μm×130 μm) crystal of as-synthesized ZIF-412 was quickly picked up from mother liquor and mounted at beamline 11.3.1 at the ALS using radiation at $\lambda$=0.8265(1) Å.

TABLE A

Crystal Data Structure determination for ZIF-412 (ucb)

| Compound | ZIF-412 |
|---|---|
| Chemical formula | C$_{31.6}$H$_{22.95}$N$_{13.85}$O$_{3.7}$Zn$_3$ |
| Formula mass | 852.03 |
| Crystal system | cubic |
| Space group | Fm$\bar{3}$m |
| $\lambda$ (Å) | 0.8265 (1) |
| a (Å) | 72.205 (2) |
| Z | 192 |
| V (Å$^3$) | 376445 (31) |
| Temperature (K) | 100 (2) |
| Size/mm$^3$ | 0.100 × 0.120 × 0.130 |
| Density (g/cm$^{-3}$) | 0.722 |
| Measured reflections | 270972 |
| Unique reflections | 4845 |
| Parameters | 516 |
| Restraints | 79 |
| R$_{int}$ | 0.1418 |
| $\theta$ range (°) | 1.70-19.30 |
| R$_1$, wR$_2$ | 0.0434, 0.1503 |
| S (GOF) | 1.081 |
| Max/min res. dens. (e/Å$^3$) | 0.33/−0.39 |

$^a$R$_1$ = $\Sigma$||F$_o$| − |F$_c$||/$\Sigma$|F$_o$|;
$^b$wR$_2$ = [$\Sigma$w(F$_o^2$ − F$_c^2$)$^2$/$\Sigma$w(F$_o^2$)$^2$]$^{1/2}$;
$^c$S = [$\Sigma$w(F$_o^2$ − F$_c^2$)$^2$/(N$_{ref}$ − N$_{par}$)]$^{1/2}$.

ZIF-413 (ucb) crystallized in the cubic Fm$\bar{3}$m (No. 225) space group, a=b=c=72.3673(14) Å, V=378989(22) Å$^3$. Total reflections, 168049; independent reflections, 5478; R$_1$=0.1032; wR$_2$=0.3474; S=1.050. A yellow block-shaped (100 μm×100 μm×100 μm) crystal of as-synthesized ZIF-413 was quickly picked up from the mother liquor and mounted at beamline 11.3.1 at the ALS using radiation at $\lambda$=1.2399(1) Å.

TABLE B

Crystal Data Structure determination for ZIF-413 (ucb)

| Compound | ZIF-413 |
|---|---|
| Chemical formula | $C_{33.5}H_{19.88}26.49N_{13.81}O_{3.63}Zn_3$ |
| Formula mass | 876.74 |
| Crystal system | cubic |
| Space group | $Fm\bar{3}m$ |
| $\lambda$ (Å) | 1.2399 (1) |
| a (Å) | 72.3673 (14) |
| Z | 192 |
| V (Å$^3$) | 378989 (22) |
| Temperature (K) | 100 (2) |
| Size/mm$^3$ | 0.100 × 0.100 × 0.100 |
| Density (g/cm$^{-3}$) | 0.737 |
| Measured reflections | 168049 |
| Unique reflections | 5478 |
| Parameters | 561 |
| Restraints | 362 |
| $R_{int}$ | 0.0295 |
| θ range (°) | 1.96-31.06 |
| $R_1$, $wR_2$ | 0.1032, 0.3474 |
| S (GOF) | 1.050 |
| Max/min res. dens. (e/Å$^3$) | 0.81/−0.33 |

$^aR_1 = \Sigma||F_o| - |F_c||/\Sigma|F_o|$;
$^bwR_2 = [\Sigma w(F_o^2 - F_c^2)^2/\Sigma w(F_o^2)^2]^{1/2}$;
$^cS = [\Sigma w(F_o^2 - F_c^2)^2/(N_{ref} - N_{par})]^{1/2}$.

ZIF-414 (ucb) crystallized in the cubic $Fm\bar{3}m$ (No. 225) space group, a=b=c=72.2609(18) Å, V=377320(28) Å$^3$. Total reflections, 270972; independent reflections, 4062; $R_1$=0.0932; $wR_2$=0.2491; S=1.157. A colorless block-shaped (90 μm×90 μm×90 μm) crystal of as-synthesized ZIF-414 was quickly picked up from the mother liquor and mounted at beamline 11.3.1 at the ALS using radiation at λ=0.7749(1) Å. Due to the poor resolution of 1.33 Å as a result of weak diffraction from significant intrinsic disorder in the crystal, imidazolate and phenyl rings were treated with rigid group and bond constraints. The geometry of the functionalized imidazolates were modeled using the known geometry from other reported ZIFs.

TABLE C

Crystal data and structure determination for ZIF-414 (ucb)

| Compound | ZIF-414 |
|---|---|
| Chemical formula | $C_{29.08}H_{24.45}N_{14.30}O_{4.60}Zn_3$ |
| Formula mass | 843.95 |
| Crystal system | cubic |
| Space group | $Fm\bar{3}m$ |
| $\lambda$ (Å) | λ = 0.7749 (1) |
| a (Å) | 72.2609 (18) |
| Z | 192 |
| V (Å$^3$) | 377320 (28) |
| Temperature (K) | 100 (2) |
| Size/mm$^3$ | 0.090 × 0.090 × 0.090 |
| Density (g/cm$^{-3}$) | 0.713 |
| Measured reflections | 270972 |
| Unique reflections | 4062 |
| Parameters | 600 |
| Restraints | 500 |
| $R_{int}$ | 0.0928 |
| θ range (°) | 2.038-24.706 |
| $R_1$, $wR_2$ | 0.0932, 0.2491 |
| S (GOF) | 1.157 |
| Max/min res. dens. (e/Å$^3$) | 0.37/−0.29 |

$^aR_1 = \Sigma||F_o| - |F_c||/\Sigma|F_o|$;
$^bwR_2 = [\Sigma w(F_o^2 - F_c^2)^2/\Sigma w(F_o^2)^2]^{1/2}$;
$^cS = [\Sigma w(F_o^2 - F_c^2)^2/(N_{ref} - N_{par})]^{1/2}$ ZIF-418 (GME) crystallized in the hexagonal $P6_3$/mmc (No. 225) space group, a=b=25.9453(6) Å, c=19.5015(6), V=11368.8(6) Å$^3$. Total reflections, 19478; independent reflections, 1335; $R_1$=0.0692; $wR_2$=0.2506; S=1.138. A colorless block-shaped (80 μm×85 μm×120 μm) crystal of as-synthesized ZIF-418 was quickly picked up from the mother liquor and mounted on a Bruker MicroSTAR-H APEX II diffractometer with λ=0.71073 Å.

TABLE D

Crystal data and structure determination for ZIF-418 (GME)

| Compound | ZIF-418 |
|---|---|
| Chemical formula | $C_{11}H_7ClN_4OZn_3$ |
| Formula mass | 312.03 |
| Crystal system | hexagonal |
| Space group | $P6_3$/mmc |
| $\lambda$ (Å) | 1.54178 |
| a (Å) | 25.9453 (6) |
| c (Å) | 19.5015 (6) |
| Z | 24 |
| V (Å$^3$) | 11368.8 (6) |
| Temperature (K) | 100 (2) |
| Size/mm$^3$ | 0.120 × 0.085 × 0.080 |
| Density (g/cm$^{-3}$) | 1.094 |
| Measured reflections | 19478 |
| Unique reflections | 1335 |
| Parameters | 189 |
| Restraints | 35 |
| $R_{int}$ | 0.0502 |
| θ range (°) | 1.97-40.06 |
| $R_1$, $wR_2$ | 0.0692, 0.2506 |
| S (GOF) | 1.138 |
| Max/min res. dens. (e/Å$^3$) | 0.63/−0.28 |

$^aR_1 = \Sigma||F_o| - |F_c||/\Sigma|F_o|$;
$^bwR_2 = [\Sigma w(F_o^2 - F_c^2)^2/\Sigma w(F_o^2)^2]^{1/2}$;
$^cS = [\Sigma w(F_o^2 - F_c^2)^2/(N_{ref} - N_{par})]^{1/2}$ ZIF-585 (CHA) crystallized in the trigonal $R\bar{3}$ (No. 148) space group, a=b=26.9457 (15) Å, c=24.763(2) Å, V=16828 (2) Å$^3$. Total reflections, 2560; independent reflections, 2560; $R_1$=0.1247; $wR_2$=0.4031; S=1.189. A colorless block-shaped (100 μm×100 μm×150 μm) crystal of as-synthesized ZIF-585 was quickly picked up from the mother liquor, and placed in epoxy resin to minimize crystal degradation, and mounted at beamline 11.3.1 at the ALS using radiation at λ=0.7749(1) Å at room temperature. The crystal was found to be twinned and processed as such, with two domains with fractions of 0.563(10) and 0.437(10) found respectively. It is worth noting that although $R\bar{3}m$ was suggested by PLATON, a convergence could not be obtained after substantial trials of refinement in that higher symmetry. Due to low resolution and twinning, rigid group and bond constraints were applied to the imidazolate and phenyl rings. The geometry of the functionalized imidazoles was modeled using the known geometry from other reported ZIFs.

TABLE E

Crystal data and structure determination for ZIF-585 (CHA)

| Compound | ZIF-585 |
|---|---|
| Chemical formula | $C_{7.50}H_4Cl_{0.50}N_{4.25}O_{0.50}Zn$ |
| Formula mass | 244.74 |
| Crystal system | trigonal |
| Space group | $R\bar{3}$ |
| $\lambda$ (Å) | 0.7749 (1) |
| a (Å) | 26.9457 (15) |
| c (Å) | 26.763 (2) |
| Z | 36 |
| V (Å$^3$) | 16828 (2) |
| Temperature (K) | 298 (2) |
| Size/mm$^3$ | 0.150 × 0.100 × 0.100 |
| Density (g/cm$^{-3}$) | 0.869 |
| Measured reflections | 2560 |

TABLE E-continued

Crystal data and structure determination for ZIF-585 (CHA)

| Compound | ZIF-585 |
|---|---|
| Unique reflections | 2560 |
| Parameters | 284 |
| Restraints | 283 |
| $R_{int}$ | 0.1093 |
| θ range (°) | 2.08-18.34 |
| $R_1$, $wR_2$ | 0.1247, 0.4031 |
| S (GOF) | 1.189 |
| Max/min res. dens. (e/Å$^3$) | 0.85/-0.62 |

$^a R_1 = \Sigma ||F_o| - |F_c||/\Sigma|F_o|$;
$^b wR_2 = [\Sigma w(F_o^2 - F_c^2)^2/\Sigma w(F_o^2)^2]^{1/2}$;
$^c S = [\Sigma w(F_o^2 - F_c^2)^2/(N_{ref} - N_{par})]^{1/2}$ ZIF-636 (AFX) crystallized in the hexagonal P6$_3$/mmc (No. 194) space group, a=b=27.1315 (7) Å, c=34.405 (12) Å, V=21962.1(14) Å$^3$. Total reflections, 78188; independent reflections, 2908; R$_1$=0.0792; wR$_2$=0.2850; S=1.143. A colorless block-shaped (200 μm×200 μm×80 μm) crystal of as-synthesized ZIF-636 was quickly picked up from the mother liquor and on a Bruker MicroSTAR-H APEX II diffractometer with λ=0.71073 Å.

TABLE F

Crystal data and structure determination for ZIF-636 (AFX)

| Compound | ZIF-636 |
|---|---|
| Chemical formula | C$_{36}$H$_{23}$N$_{22}$O$_{12}$Zn$_4$ |
| Formula mass | 1217.24 |
| Crystal system | hexagonal |
| Space group | P6$_3$/mmc |
| λ (Å) | 1.54178 |
| a (Å) | 27.1315 (7) |
| c (Å) | 34.4505 (12) |
| Z | 12 |
| V (Å$^3$) | 21962.1 (14) |
| Temperature (K) | 100 (2) |
| Size/mm$^3$ | 0.200 × 0.200 × 0.080 |
| Density (g/cm$^{-3}$) | 1.104 |
| Measured reflections | 78188 |
| Unique reflections | 2908 |
| Parameters | 380 |
| Restraints | 95 |
| $R_{int}$ | 0.0505 |
| θ range (°) | 1.88-40.00 |
| $R_1$, $wR_2$ | 0.0792, 0.2850 |
| S (GOF) | 1.143 |
| Max/min res. dens. (e/Å$^3$) | 0.79/-0.39 |

$^a R_1 = \Sigma ||F_o| - |F_c||/\Sigma|F_o|$;
$^b wR_2 = [\Sigma w(F_o^2 - F_c^2)^2/\Sigma w(F_o^2)^2]^{1/2}$;
$^c S = [\Sigma w(F_o^2 - F_c^2)^2/(N_{ref} - N_{par})]^{1/2}$ ZIF-640 (GME) crystallized in the hexagonal P6$_3$/mmc (No. 194) space group, a=b=27.0807 (16) Å, c=16.7619(16) Å, V=10645.7(16) Å$^3$. Total reflections, 15269; independent reflections, 1469; R$_1$=0.1153; wR$_2$=0.3525; S=1.020. A colorless block-shaped (100 μm×100 μm×200 μm) crystal of as-synthesized ZIF-640 was quickly picked up from the mother liquor and mounted at beamline 11.3.1 at the ALS using radiation at λ=0.7749(1) Å. Due to weak diffraction from significant intrinsic disorder in the crystal, imidazolate and phenyl rings were treated with rigid group and bond constraints. The geometry of the functionalized imidazoles were modeled using the known geometry from other reported ZIFs.

TABLE G

Crystal data and structure determination for ZIF-640 (GME)

| Compound | ZIF-640 |
|---|---|
| Chemical formula | C$_{7.50}$H$_{7.40}$N$_{4.20}$O$_{0.40}$Zn |
| Formula mass | 228.15 |
| Crystal system | hexagonal |
| Space group | P6$_3$/mmc |
| λ (Å) | 0.7749 (1) |
| a (Å) | 27.0807 (16) |
| c (Å) | 16.7619 (16) |
| Z | 24 |
| V (Å$^3$) | 10645.7 (16) |
| Temperature (K) | 100 (2) |
| Size/mm$^3$ | 0.200 × 0.100 × 0.100 |
| Density (g/cm$^{-3}$) | 0.854 |
| Measured reflections | 15269 |
| Unique reflections | 1469 |
| Parameters | 132 |
| Restraints | 136 |
| $R_{int}$ | 0.0534 |
| θ range (°) | 2.31-20.04 |
| $R_1$, $wR_2$ | 0.1153, 0.3525 |
| S (GOF) | 1.020 |
| Max/min res. dens. (e/Å$^3$) | 1.09/-0.52 |

$^a R_1 = \Sigma ||F_o| - |F_c||/\Sigma|F_o|$;
$^b wR_2 = [\Sigma w(F_o^2 - F_c^2)^2/\Sigma w(F_o^2)^2]^{1/2}$;
$^c S = [\Sigma w(F_o^2 - F_c^2)^2/(N_{ref} - N_{par})]^{1/2}$ ZIF-725 (KFI) crystallized in the cubic Im$\bar{3}$m (No. 229) space group, a=b=c=35.943(3) Å, V=46436(13) Å$^3$. Total reflections, 64698; independent reflections, 1409; R$_1$=0.0597; wR$_2$=0.1875; S=1.095. A colorless block-shaped (120 μm×130 μm×150 μm) crystal of as-synthesized ZIF-725 was quickly picked up from the mother liquor and mounted at beamline 11.3.1 at the ALS using radiation at λ=1.2399(1) Å.

TABLE H

Crystal data and structure determination for ZIF-725 (KFI)

| Compound | ZIF-725 |
|---|---|
| Chemical formula | C$_{18}$H$_{13}$N$_{10}$O$_4$Zn$_2$ |
| Formula mass | 1217.24 |
| Crystal system | cubic |
| Space group | Im$\bar{3}$m |
| λ (Å) | 1.2399 (1) |
| a (Å) | 35.943 (3) |
| Z | 48 |
| V (Å$^3$) | 46436 (13) |
| Temperature (K) | 100 (2) |
| Size/mm$^3$ | 0.150 × 0.130 × 0.120 |
| Density (g/cm$^{-3}$) | 0.968 |
| Measured reflections | 64698 |
| Unique reflections | 1409 |
| Parameters | 199 |
| Restraints | 75 |
| $R_{int}$ | 0.0919 |
| θ range (°) | 2.42-31.20 |
| $R_2$, $wR_2$ | 0.0597, 0.1875 |
| S (GOF) | 1.095 |
| Max/min res. dens. (e/Å$^3$) | 1.37/-0.37 |

$^a R_1 = \Sigma ||F_o| - |F_c||/\Sigma|F_o|$;
$^b wR_2 = [\Sigma w(F_o^2 - F_c^2)^2/\Sigma w(F_o^2)^2]^{1/2}$;
$^c S = [\Sigma w(F_o^2 - F_c^2)^2/(N_{ref} - N_{par})]^{1/2}$ ZIF-726 (KFI) crystallized in cubic Im$\bar{3}$m (No. 229) space group, a=b=c=35.763(4) Å, V=45739(13) Å$^3$. Total reflections, 61149; independent reflections, 1297; R$_1$=0.0624; wR$_2$=0.2004; S=1.110. A colorless block-shaped (110 μm×130 μm×140 μm) crystal of as-synthesized ZIF-726 was quickly picked up from the mother liquor and mounted at beamline 11.3.1 at the ALS using radiation at λ=1.2399(1) Å.

TABLE I

Crystal data and structure determination for ZIF-726 (KFI)

| Compound | ZIF-726 |
|---|---|
| chemical formula | $C_{20}H_{12}Cl_2N_9O_2Zn_2$ |
| formula mass | 612.054 |
| crystal system | cubic |
| space group | $Im\bar{3}m$ |
| λ (Å) | 1.54178 |
| a (Å) | 35.763 (4) |
| Z | 48 |
| V (Å$^3$) | 45739 (13) |
| temperature (K) | 100 (2) |
| size/mm | 0.140 × 0.130 × 0.110 |
| density (g/cm$^{-3}$) | 1.067 |
| measured reflections | 61149 |
| unique reflections | 1297 |
| parameters | 203 |
| restraints | 51 |
| $R_{int}$ | 0.0688 |
| θ range (deg) | 2.43-30.36 |
| $R_1$, $wR_2$ | 0.0624, 0.2004 |
| S (GOF) | 1.110 |
| max/min res. dens. (e/Å$^3$) | 0.54/−0.29 |

$^a R_1 = \Sigma||F_o| - |F_c||/\Sigma|F_o|$;
$^b wR_2 = [\Sigma w(F_o^2 - F_c^2)^2/\Sigma w(F_o^2)^2]^{1/2}$;
$^c S = [\Sigma w(F_o^2 - F_c^2)^2/(N_{ref} - N_{par})]^{1/2}$ ZIF-740 (bam) is hexagonal: P6/mmm (No. 191), a=b=42.586(3) Å, c=19.8692(13) Å, V=31206(4) Å$^3$. Total reflections, 90065; independent reflections, 2411; $R_1$=0.1621; $wR_2$=0.4377; S=1.152. A colorless block-shaped (80 μm×100 μm×100 μm) crystal of as-synthesized ZIF-740 was quickly picked up from the mother liquor and mounted at beamline 11.3.1 at the ALS using radiation at λ=0.7749(1) Å. Due to the poor resolution of 1.38 Å as a result of weak diffraction from significant intrinsic disorder in the crystal, imidazolate and phenyl rings were treated with rigid group and bond constraints. The geometry of the functionalized imidazoles were modeled using the known geometry from other reported ZIFs.

TABLE J

Crystal data and structure determination for ZIF-740 (bam)

| Compound | ZIF-740 |
|---|---|
| Chemical formula | $C_{22}H_{13.50}Br_{2.50}N_9O_2Zn_2$ |
| Formula mass | 766.43 |
| Crystal system | hexagonal |
| Space group | P6/mmm |
| λ (Å) | 1.0332 (1) |
| a (Å) | 42.586 (3) |
| c (Å) | 19.8692 (13) |
| Z | 24 |
| V (Å$^3$) | 31206 (4) |
| Temperature (K) | 100 (2) |
| Size/mm$^3$ | 0.100 × 0.100 × 0.080 |
| Density (g/cm$^{-3}$) | 0.979 |
| Measured reflections | 90065 |
| Unique reflections | 2411 |
| Parameters | 348 |
| Restraints | 473 |
| $R_{int}$ | 0.2655 |
| θ range (°) | 2.12-21.97 |
| $R_1$, $wR_2$ | 0.1621, 0.4377 |
| S (GOF) | 1.1152 |
| Max/min res. dens. (e/Å$^3$) | 0.72/−0.57 |

$^a R_1 = \Sigma||F_o| - |F_c||/\Sigma|F_o|$;
$^b wR_2 = [\Sigma w(F_o^2 - F_c^2)^2/\Sigma w(F_o^2)^2]^{1/2}$;
$^c S = [\Sigma w(F_o^2 - F_c^2)^2/(N_{ref} - N_{par})]^{1/2}$ ZIF-813 (LTA) crystallized in the cubic $Pm\bar{3}m$ (No. 221) space group, a=b=c=22.688(3) Å, V=11679(4) Å$^3$. Total reflections, 7779; independent reflections, 765; $R_1$=0.1189; $wR_2$=0.3415; S=1.092. A colorless block-shaped (100 μm×100 μm×100 μm) crystal of as-synthesized ZIF-813 was quickly picked up from the mother liquor and mounted on a Bruker D8 Venture diffractometer with the Cu target selected (λ=1.54178 Å). Due to significant intrinsic disorder in the crystal, imidazolate and phenyl rings were treated with rigid bond constraints, and to keep the groups planar. The geometry of the functionalized imidazoles were modeled using the known geometry from other reported ZIFs.

TABLE K

Crystal data and structure determination for ZIF-813 (LTA)

| Compound | ZIF-813 |
|---|---|
| chemical formula | $C_{7.25}H_{5.75}N_{4.25}O_{0.50}Zn_2$ |
| formula mass | 225.78 |
| crystal system | cubic |
| space group | $Pm\bar{3}m$ |
| λ (Å) | 1.54178 |
| a (Å) | 22.688 (3) |
| Z | 24 |
| V (Å$^3$) | 11679 (4) |
| temperature (K) | 100 (2) |
| size/mm | 0.100 × 0.100 × 0.100 |
| density (g/cm$^{-3}$) | 0.770 |
| measured reflections | 7779 |
| unique reflections | 765 |
| parameters | 132 |
| restraints | 148 |
| $R_{int}$ | 0.0634 |
| θ range (deg) | 2.75-39.94 |
| $R_1$, $wR_2$ | 0.01189, 0.3415 |
| S (GOF) | 1.092 |
| max/min res. dens. (e/Å$^3$) | 0.64/−0.38 |

$^a R_1 = \Sigma||F_o| - |F_c||/\Sigma|F_o|$;
$^b wR_2 = [\Sigma w(F_o^2 - F_c^2)^2/\Sigma w(F_o^2)^2]^{1/2}$;
$^c S = [\Sigma w(F_o^2 - F_c^2)^2/(N_{ref} - N_{par})]^{1/2}$ ZIF-128 (hyk). A colorless block-shaped (80 μm×40 μm×40 μm) crystal of as-synthesized ZIF-128 was quickly picked up from mother liquor and mounted at beamline 11.3.1 at the ALS using radiation at λ=0.7749(1) Å. Only 1.33 Å resolution could be obtained for this sample, which precluded anisotropic refinement and individual atomic positions except for zinc atoms. Considering the geometry of imidazolate and its functionalized derivatives are known, a rigid body refinement was used to aid structure refinement by first modeling benzimidazolate groups, using Materials Studio 7.0, to improve phasing, then refining and inspecting Fourier difference map to locate the bromo- and methyl-functional groups. However, there were no clear crystallographically independent positions for either functional group, which may in part be due to the low resolution of the data and disordered nature of these groups, but also that 5-bromobenzimidazole and 5-methylbenzimidazole may occupy the same crystallographic sites due to their similar size and shape. Thus, although the NMR ratio is 0.77:1.23 5-bromobenzimidazole:5-methylbenzimidazole, the functional groups were modeled as equally disordered across all sites, thus being modeled in a 1:1 ratio.

TABLE L

Crystal data and structure determination for ZIF-128

| Compound | ZIF-128 |
|---|---|
| Chemical formula | $C_{195}H_{77}Br_{13}N_{52}Zn_{13}$ |
| Formula mass | 5036.72 |

TABLE L-continued

Crystal data and structure determination for ZIF-128

| Compound | ZIF-128 |
|---|---|
| Crystal system | tetragonal |
| Space group | P4₃2₁2 |
| λ (Å) | 0.7749 (1) |
| a (Å) | 29.157 (3) |
| c (Å) | 69.955 (9) |
| Z | 8 |
| V (Å³) | 59470 (15) |
| Temperature (K) | 100 (2) |
| Size/mm³ | 0.080 × 0.040 × 0.040 |
| Density (g/cm⁻³) | 1.125 |
| Measured reflections | 94423 |
| Unique reflections | 13193 |
| Parameters | 609 |
| Restraints | 271 |
| $R_{int}$ | 0.1308 |
| θ range (°) | 1.95-16.95 |
| $R_1$, $wR_2$ | 0.0972, 0.2730 |
| Flack parameter | 0.498 (6)* |
| S (GOF) | 1.047 |
| Max/min res. dens. (e/Å³) | 0.61/−0.65 |

$^a R_1 = \Sigma||F_o| - |F_c||/\Sigma|F_o|$;
$^b wR_2 = [\Sigma w(F_o^2 - F_c^2)^2/\Sigma w(F_o^2)^2]^{1/2}$;
$^c S = [\Sigma w(F_o^2 - F_c^2)^2/(N_{ref} - N_{par})]^{1/2}$.

ZIF-723 (cjh048). A colorless rod-shaped (50 μm×15 μm×15 μm) crystal of as-synthesized ZIF- was quickly picked up from mother liquor and mounted at beamline 5.0.2 at the ALS using radiation at λ=0.8999(1) Å. Only 1.4 Å resolution could be obtained for this sample, which precluded anisotropic refinement and individual atomic positions except for zinc atoms. Considering the geometry of imidazolate and its functionalized derivatives are known, a rigid body refinement was used to aid structure refinement by first modeling imidazolate groups with Materials Studio 7.0, since these groups are common to both linkers present in this framework to improve phasing, then refining these rigid bodies and inspecting Fourier difference map to locate the phenyl rings and disordered bromine groups 5-chlorobenzimidazole in order to distinguish this linker's position from that of 4-nitroimidazole. When the position of 5-chlorobenzimidazole was found, this moiety was incorporated into the rigid body refinement and the refinement and difference map inspection process was iterated with further improved phasing as more of the structure is modeled until all 5-bromobenzimidazole positions were located. The 4-nitroimidazole groups were then modeled, with the nitro group constrained as a 1:1 split occupancy between the 4- and 5-positions on the imidazole except in one case where the thermal ellipsoids failed to converge on the 5-position. Checking the framework confirmed that the nitro group would clash with a fully-occupied 5-chlorobenzimidazole, thus the 4-position on nitroimidazole was modeled with the nitro group at full occupancy.

TABLE M

Crystal data/structure determination of ZIF-723 (cjh048)

| Compound | ZIF-723 |
|---|---|
| Chemical formula | $C_{20}H_{11}Cl_2N_{10}O_4Zn_2$ |
| Formula mass | 657.03 |
| Crystal system | hexagonal |
| Space group | P6₃/mmc |
| λ (Å) | 0.8999 (1) |
| a (Å) | 31.731 (6) |
| c (Å) | 28.412 (6) |
| Z | 24 |
| V (Å³) | 24774 (11) |
| Temperature (K) | 100 (2) |
| Size/mm³ | 0.050 × 0.015 × 0.015 |
| Density (g/cm⁻³) | 1.057 |
| Measured reflections | 15250 |
| Unique reflections | 4924 |
| Parameters | 96 |
| Restraints | 24 |
| $R_{int}$ | 0.208 |
| θ range (°) | 1.63-18.75 |
| $R_1$, $wR_2$ | 0.1986, 0.5798 |
| S (GOF) | 1.056 |
| Max/min res. dens. (e/Å³) | 0.53/−0.65 |

$^a R_1 = \Sigma||F_o| - |F_c||/\Sigma|F_o|$;
$^b wR_2 = [\Sigma w(F_o^2 - F_c^2)^2/\Sigma w(F_o^2)^2]^{1/2}$;
$^c S = [\Sigma w(F_o^2 - F_c^2)^2/(N_{ref} - N_{par})]^{1/2}$.

Gas adsorption experiments. Ultrahigh-grade gases (99.999% for $N_2$, Ar, $CO_2$, $CH_4$, and He) and activated samples of ZIFs were used for measurements. The $N_2$ (77 K) isotherms for all ZIFs were measured on a Quadrasorb-SI and Ar (87 K) isotherms were measured on an Autosorb-1 (Quantachrome) volumetric gas adsorption analyzer. Apparent surface area of ZIFs were estimated by Langmuir and BET methods (see Table N). The $CO_2$, $CH_4$, and $N_2$ adsorption isotherms of reported ZIFs (except ZIF-813) were measured at 273 K and 298 K and at pressures up to 1.0 bar using Autosorb-1 (Quantachrome) volumetric gas adsorption analyzer. The $CO_2/CH_4$ separation of ZIFs were evaluated based on the Ideal-adsorbed solution theory (IAST), and the $CO_2/N_2$ separation of ZIFs were estimated based on an established method in the literature.

TABLE N

Chemical composition, topologies, SBUs and porosity data of presented ZIFs with hexagonal prism or cube SBUs.

| ZIF-n | Composition | Net | SBU | T/V (nm⁻³) | $d_p$* (Å) | $d_a$* (Å) | $A_{Lang}$ (m²/g) | $A_{BET}$ (m²/g) | $V_p$ (cm³/g) |
|---|---|---|---|---|---|---|---|---|---|
| 418 | Zn(alm)₀.₉₀(cblm)₁.₁₀ | GME | Hexagonal Prism | 2.11 | 9.1 | 5.2 | 985 | 795 | 0.35 |
| 640 | Zn(mlM)₀.₈₅(lM)₁.₁₅(nblM)₀.₂₀ | GME | Hexagonal Prism | 2.20 | 7.4 | 6.0 | 1404 | 1184 | 0.50 |
| 585 | Zn(nlM)₀.₃₀(lM)(cblM)₀.₇₀ | CHA | Hexagonal Prism | 2.07 | 4.4 | 4.0 | 1090 | 944 | 0.42 |
| 636 | Zn₂(nlM)₁.₄₀(lM)₀.₉₀(nblM)₁.₇₀ | AFX | Hexagonal Prism | 2.19 | 9.6 | 4.9 | 890 | 740 | 0.33 |
| 725 | Zn(nlM)₀.₇₀(lM)₀.₃₀(blM) | KFI | Hexagonal Prism | 2.08 | 15.6 | 4.8 | 1220 | 1050 | 0.45 |
| 726 | Zn(nlM)₀.₈(lM)₀.₄₅(cblM)₀.₉₅ | KFI | Hexagonal Prism | 2.10 | 10.0 | 5.0 | 1095 | 920 | 0.40 |
| 412 | ZN₃(nlM)₁.₈₅(lM)₀.₇₅(blM)₃.₄₀ | ucb | Hexagonal Prism + Cube | 1.53 | 33.4 | 8.2 | 2500 | 1520 | 0.96 |
| 413 | Zn₃(nlM)₁.₉₀(lM)(mblM)₃.₁₀ | ucb | Hexagonal Prism + Cube | 1.53 | 31.4 | 6.8 | 1990 | 1290 | 0.69 |

TABLE N-continued

Chemical composition, topologies, SBUs and porosity data of presented ZIFs with hexagonal prism or cube SBUs.

| ZIF-n | Composition | Net | SBU | T/V (nm$^{-3}$) | $d_p$* (Å) | $d_a$* (Å) | $A_{Lang}$ (m$^2$/g) | $A_{BET}$ (m$^2$/g) | $V_p$ (cm$^3$/g) |
|---|---|---|---|---|---|---|---|---|---|
| 414 | Zn$_3$(mIM)$_{1.85}$(IM)$_{1.40}$(nbIM)$_{2.75}$ | ucb | Hexagonal Prism + Cube | 1.54 | 31.0 | 4.6 | 2284 | 1440 | 0.80 |
| 740 | Zn$_2$(nIM)$_{0.80}$(IM)$_{0.50}$(brbIM)$_{2.70}$ | bam | Hexagonal Prism + Cube | 1.55 | 22.5 | 22.5 | 1618 | 780 | 0.52 |

*Calculated by fitting largest sphere from the centroid of the cage or aperture to the van der Waals surface of the framework In situ gas adsorption SAXS measurement. The in situ SAXS measurement for Ar adsorption on ZIF-412 was performed on combination of Rigaku Japan rotating anode (FR-E+ Super Bright), Rigaku America BioSAXS-1000 and gas adsorption instrument (BELSORP-max) with a specially designed cell on a cryostat (Japan Bel). X-ray diffractometer in a small chamber was connected to a gas adsorption instrument placed outside. In addition, a large area detector combined with Cu Kα radiation from a rotating anode X-ray source were used to provide precise measurement of both intensity and position of the diffraction peaks within a wide q ($=4\pi \sin \theta/\lambda$) range from 0.01 to 0.71 Å$^{-1}$. Measurements were carried out in the transmission mode with Confocal Max Flux Mirror, 2D Kratky block and a Pilatus type detector. The powder samples were mounted in two places next to each other at the same adsorbate-environmental condition; one is within the hollow part of the stainless steel rectangular plate covered by polyether ether ketone (PEEK) polymer films for diffraction and the other is for improving accuracy in measurement of gas adsorption/desorption isotherms. The assembled samples were connected thermally to the temperature cryostat system, where the temperature is controlled within ±0.01 K, and to the gas adsorption instrument. The position of the sample cell was adjusted to the X-ray pathway within the chamber of the SAXS instrument at low temperatures before starting measurements.

A known weight (~0.03 g) of the ZIF-412 sample was mounted in the sample cell and activated at 373 K for 6 hours under vacuum condition (~0.01 Pa) to remove the guest molecules. Ar gas was introduced into the sample cell at 87 K, and the gas pressure of the cell reached equilibrium within 30 min in all the measurements. The equilibrium was practically confirmed through the pressure fluctuation in the sample cell being smaller than 1 Pa for 5 min. The SAXS instrument was synchronized to the gas adsorption measurement and each SAXS pattern was collected at each equilibrium point of the sorption isotherms (exposure time for each measurements is 30 min). There was no pressure change after SAXS measurement, which confirms the sample with adsorbates in sample cell is totally equilibrium.

Twenty-six SAXS scattering profiles were collected at each equilibrium points in the adsorption process including the initial point in vacuum condition. The intensity of all SAXS profiles of ZIF-412 at different Ar pressures was normalized using the 10 reflection of silver benzoate as the internal standard. No structure transformation of the framework backbone of ZIF-412 throughout the whole gas adsorption process confirmed by the absence of obvious peak position changes in these SAXS patterns. Moreover, the sample did not show structural difference after in situ gas adsorption SAXS measurement confirmed by adsorption data and SAXS data at vacuum condition.

In Situ Small Angle X-ray Scattering Analyses. For the structural analysis of ZIF-412 at different gas pressures, Le Bail refinements were performed using the JANA program over the full sampled angular range based on the space group Fm$\bar{3}$m. The SAXS patterns of activated ZIF-412 at the vacuum condition were refined first as a reference. The reflection peaks were modeled by a Pseudo-Voigt peak-shape function modified for asymmetry, with six refinable coefficients. The background was treated using a Legendre polynomial with six refinable parameters. Structure factor amplitudes were calculated from the integrated intensities of reflections corrected for the polarization and Lorentz factors, and the scale factor, which was determined by comparing the intensities of vacuum data and the model structure factors calculated from the atomic coordinates of ZIF-412 derived from single crystal XRD data (Table N). As initial set of phases of structure factors at vacuum condition, phases of the model structure factors were adopted. Changes of phases of a structure factor as a result of adsorption were carefully analysed by plotting structure factor amplitude of each reflection against Ar pressures and finding a pressure at which the structure factor amplitude becomes minimum. Then the experimentally derived structure factors at each Ar-pressure were analysed by the maximum-entropy method (MEM) to determine electron density distributions in Ar-adsorbed ZIF-412. The MEM-analyses program Dysnomia was utilized with the L-BFGS algorithm and the so-called "G-constraint" was adopted for exactly overlapping reflections. The distribution of adsorbates was visualized by calculating difference electron densities between adsorbed and vacuum conditions. As a reference, the distribution of adsorbates was also visualized by the difference Fourier analyses between structure factors at elevated pressures and vacuum. The level of electron density (e$^-$/Å$^3$) is represented as the B-G-R color code. All electron density map data were visualized with atomic coordinates of ZIF-412 to clarify the relative position of adsorbate in ZIF framework by using the program VESTA.

TABLE O

Unit cell parameter of ZIF-412 at different Ar pressures.

| Pressure (kPa) | Unit cell parameter a (Å) | GOF | R$_{wp}$ |
|---|---|---|---|
| vacuum | 72.180 (5) | 0.13 | 4.45 |
| 0.05 | 72.153 (5) | 0.14 | 4.27 |
| 0.5 | 72.150 (4) | 0.15 | 4.57 |
| 1 | 72.152 (3) | 0.14 | 4.01 |
| 2 | 72.153 (2) | 0.14 | 3.99 |
| 3 | 72.156 (3) | 0.13 | 3.93 |
| 4 | 72.152 (2) | 0.13 | 3.86 |
| 5 | 72.145 (4) | 0.13 | 3.94 |
| 6 | 72.135 (3) | 0.14 | 4.06 |
| 6.5 | 72.112 (4) | 0.15 | 4.38 |
| 8 | 72.094 (7) | 0.16 | 5.10 |
| 10 | 72.096 (7) | 0.16 | 5.50 |
| 15 | 72.117 (8) | 0.15 | 4.92 |
| 20 | 72.142 (6) | 0.14 | 4.74 |
| 25 | 72.154 (4) | 0.12 | 4.62 |
| 28 | 72.164 (4) | 0.12 | 4.76 |
| 29 | 72.158 (8) | 0.14 | 5.92 |
| 30 | 72.159 (9) | 0.10 | 5.47 |

TABLE O-continued

Unit cell parameter of ZIF-412 at different Ar pressures.

| Pressure (kPa) | Unit cell parameter a (Å) | GOF | $R_{wp}$ |
|---|---|---|---|
| 31 | 72.152 (7) | 0.06 | 4.91 |
| 40 | 72.193 (5) | 0.05 | 4.94 |
| 50 | 72.223 (6) | 0.05 | 4.86 |
| 60 | 72.244 (5) | 0.05 | 4.75 |
| 70 | 72.265 (4) | 0.05 | 4.61 |
| 80 | 72.280 (5) | 0.05 | 4.37 |
| 90 | 72.291 (3) | 0.05 | 4.17 |
| 100 | 72.302 (3) | 0.04 | 3.96 |

A number of embodiments of the invention have been described. Nevertheless, it will be understood that various modifications may be made without departing from the spirit and scope of the invention. Accordingly, other embodiments are within the scope of the following claims.

What is claimed is:

1. A zeoltic imidazolate framework (ZIF) comprising interconnected prism and/or cube SBUs having the general structure of:

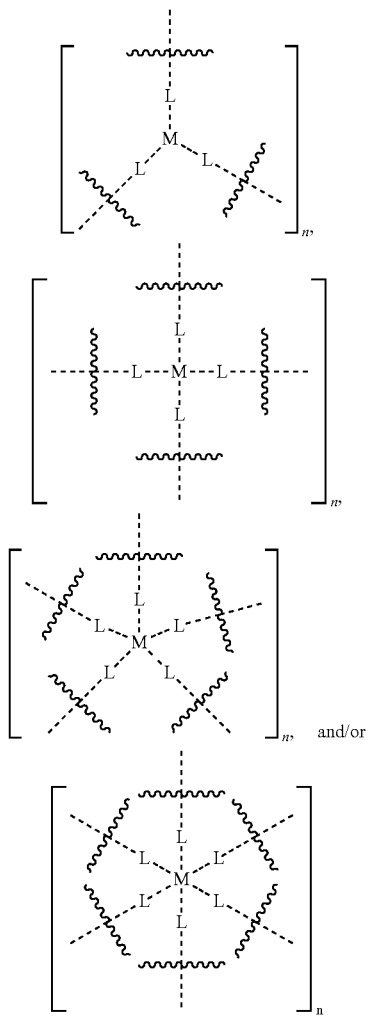

and/or wherein,

M comprises a metal, metal ion, or metal complex,

L is an imidazolate-comprising organic linker, n is an integer greater than 50, wherein the dash lines indicate a bond between a nitrogen atom of the imidazolate-comprising organic linker and a metal, metal ion, or metal complex; and wherein the ZIF comprises a plurality of L's obtained from reaction of M with an imidazolate-comprising organic linker having the structure of Formula I(a), and reaction of M with a plurality of imidazolate-comprising organic linkers having the structure of Formula II and Formula III:

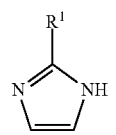

Formula I(a)

Formula (II)

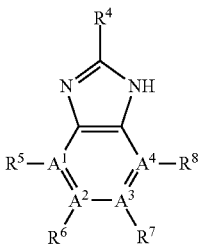

Formula (III)

wherein, $A^1$-$A^4$ are each independently C or N;

$R^1$ is an optionally substituted $(C_1$-$C_6)$alkyl, an optionally substituted $(C_1$-$C_6)$alkenyl, an optionally substituted $(C_1$-$C_6)$alkynyl, halo, nitro, aldehyde, carboxylic acid, amine, amide, cyano, ester, ketone, thiol, alkoxy, hydroxyl; and $R^4$-$R^8$ are each independently selected from H, an optionally substituted $(C_1$-$C_6)$alkyl, an optionally substituted $(C_1$-$C_6)$alkenyl, an optionally substituted $(C_1$-$C_6)$alkynyl, halo, nitro, aldehyde, carboxylic acid, amine, amide, cyano, ester, ketone, thiol, alkoxy, and hydroxyl;

wherein any of $R^5$-$R^8$ are absent if the appropriate member(s) of $A^1$-$A^4$ is N.

2. The ZIF of claim 1, wherein the ZIF comprises a plurality of L's obtained from the structure of Formula I(a), and a plurality of L's obtained from a structure of Formula II and Formula III(a):

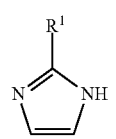

Formula I(a)

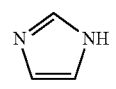

Formula (II)

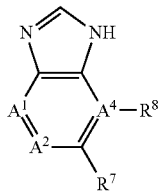

Formula III(a)

wherein,

A¹, A², and A⁴ are each independently C or N;

R¹ is an optionally substituted $(C_1-C_3)$alkyl, halo, nitro, aldehyde, amine, cyano, thiol, hydroxyl; and R⁷-R⁸ are each independently selected from H, an optionally substituted $(C_1-C_3)$alkyl, halo, nitro, aldehyde, carboxylic acid, amine, amide, cyano, ester, ketone, thiol, alkoxy, and hydroxyl;

wherein R⁸ is absent if A⁴ is a N.

3. The ZIF of claim 1, wherein the ZIF comprises a metal or metal ion selected from $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $Nb^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, $Cr$, $Mo^{6+}$, $Mo^{5+}$, $Mo^{4+}$, $Mo^{3+}$, $Mo^{2+}$, $Mo^+$, $Mo$, $W^{6+}$, $W^{5+}$, $W^{4+}$, $W^{3+}$, $W^{2+}$, $W^+$, $W$, $Mn^{7+}$, $Mn^{6+}$, $Mn^{5+}$, $Mn^{4+}$, $Mn^{3+}$, $Mn^{2+}$, $Mn^+$, $Re^{7+}$, $Re^{6+}$, $Re^{5+}$, $Re^{4+}$, $Re^{3+}$, $Re^{2+}$, $Re^+$, $Re$, $Fe^{6+}$, $Fe^{4+}$, $Fe^{3+}$, $Fe^{2+}$, $Fe^+$, $Fe$, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $Os^{4+}$, $Os^{3+}$, $Os^{2+}$, $Os^+$, $Os$, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^+$, $Ir$, $Ni^{3+}$, $Ni^{2+}$, $Ni^+$, $Ni$, $Pd^{6+}$, $Pd^{4+}$, $Pd^{2+}$, $Pd^+$, $Pd$, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au^+$, $Zn^{2+}$, $Zn^+$, $Zn$, $Cd^{2+}$, $Cd^+$, $Hg^{4+}$, $Hg^{2+}$, $Hg^+$, $B^{3+}$, $B^{2+}$, $B^+$, $Al^{3+}$, $Al^{2+}$, $Al^+$, $Ga^{3+}$, $Ga^{2+}$, $Ga^+$, $In^{3+}$, $In^{2+}$, $In^{1+}$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, $Ge$, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $Db^{3+}$, $Db^{2+}$, $Ho^{3+}$, $Er^{3+}$, $Tm^{4+}$, $Tm^{3+}$, $Tm^{2+}$, $Yb^{3+}$, $Yb^{2+}$, $Lu^{3+}$, $La^{3+}$, $La^{2+}$, $La^+$, and combinations thereof, including any complexes which contain the metals or metal ions, as well as any corresponding metal salt counter-anions.

4. The ZIF of claim 3, wherein the ZIF comprises one or more divalent metal ions selected from: $Be^{2+}$, $Mg^{2+}$, $Ca^{2+}$, $Sr^{2+}$, $Ba^{2+}$, $Sc^{2+}$, $Y^{2+}$, $Ti^{2+}$, $Zr^{2+}$, $V^{2+}$, $Nb^{2+}$, $Ta^{2+}$, $Cr^{2+}$, $Mo^{2+}$, $W^{2+}$, $Mn^{2+}$, $Re^{2+}$, $Fe^{2+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Ag^{2+}$, $Au^{2+}$, $Zn^{2+}$, $Cd^{2+}$, $Hg^{2+}$, $B^{2+}$, $Al^{2+}$, $Ga^{2+}$, $In^{2+}$, $Si^{2+}$, $Ge^{2+}$, $Sn^{2+}$, $Pb^{2+}$, $As^{2+}$, $Te^{2+}$, $La^{2+}$, $Ce^{2+}$, $Pr^{2+}$, $Nd^{2+}$, $Sm^{2+}$, $Eu^{2+}$, $Gd^{2+}$, $Tb^{2+}$, $Db^{2+}$, $Tm^{2+}$, $Yb^{2+}$, and $La^{2+}$, including any complexes which contain the metal ions, as well as any corresponding metal salt counter-anions.

5. The ZIF of claim 4, wherein the ZIF comprises a plurality of $Zn^{2+}$ metal ions.

6. The ZIF of claim 1, wherein the ZIF has a topology selected from GME, CHA, KFI, AFX, LTA, bam, and ucb.

7. The ZIF of claim 6, wherein the ZIF has a topology of bam or ucb.

8. The ZIF of claim 1, wherein the ZIF is selected from the group consisting of ZIF-128, ZIF-412, ZIF-413, ZIF-414, ZIF-418, ZIF-516, ZIF-585, ZIF-636, ZIF-640, ZIF-723, ZIF-725, ZIF-726, ZIF-740, and ZIF-813.

9. The ZIF of claim 8, wherein the ZIF is selected from ZIF-412 or ZIF-740.

10. The ZIF of claim 1, further comprising a one or more guest species.

11. The ZIF of claim 1, further comprising one or more absorbed or adsorbed chemical species.

12. The ZIF of claim 11, wherein the adsorbed or absorbed chemical species is selected from the group consisting of argon, ammonia, carbon dioxide, carbon monoxide, hydrogen, amines, oxygen, ozone, nitrogen, nitrous oxide, organic dyes, polycyclic organic molecules, hydrogen sulfide, carbonyl sulfide, carbon disulfide, mercaptans, hydrocarbons, formaldehyde, diisocyanates, trichloroethylene, fluorocarbons, and combinations thereof.

13. A method to separate or store one or more gases from a mixed gas mixture comprising contacting the gas mixture with the ZIF of claim 1.

14. The method of claim 13, wherein the one or more gases that are separated and stored is $CO_2$.

15. A method to separate or store $CO_2$ from a fuel gas stream or natural gas stream comprising contacting the fuel gas stream or natural gas stream with the ZIF of claim 1.

16. A method to separate or store one or more gases from the exhaust of a combustion engine comprising contacting the exhaust with the ZIF of claim 1.

17. A gas storage, gas detector or gas separation device comprising the ZIF of claim 1.

18. The device of claim 17, wherein the gas storage, gas detector or gas separation device is selected from the group consisting of purifiers, filters, scrubbers, pressure swing adsorption devices, molecular sieves, hollow fiber membranes, ceramic membranes, cryogenic air separation devices, carbon monoxide detector, car emissions detector and hybrid gas separation devices.

19. A catalyst comprising the ZIF of claim 1.

20. A chemical sensor comprising the ZIF of claim 1.

* * * * *